(12) United States Patent
Cotton

(10) Patent No.: US 11,151,645 B2
(45) Date of Patent: Oct. 19, 2021

(54) GENERATING CUSTOMER-SPECIFIC VEHICLE PROPOSALS FOR POTENTIAL VEHICLE CUSTOMERS

(71) Applicant: AutoAlert, LLC, Irvine, CA (US)

(72) Inventor: Jeffrey S. Cotton, Laguna Hills, CA (US)

(73) Assignee: AutoAlert, LLC, Irvine, CA (US)

(*) Notice: Subject to any disclaimer, the term of this patent is extended or adjusted under 35 U.S.C. 154(b) by 99 days.

(21) Appl. No.: 16/436,852

(22) Filed: Jun. 10, 2019

(65) Prior Publication Data

US 2020/0005392 A1   Jan. 2, 2020

Related U.S. Application Data

(63) Continuation of application No. 14/506,550, filed on Oct. 3, 2014, now Pat. No. 10,319,031, which is a
(Continued)

(51) Int. Cl.
| | |
|---|---|
| *G06Q 30/00* | (2012.01) |
| *G06Q 40/02* | (2012.01) |
| *G06Q 40/00* | (2012.01) |
| *G06Q 30/02* | (2012.01) |
| *G06Q 30/06* | (2012.01) |

(52) U.S. Cl.
CPC ........... *G06Q 40/025* (2013.01); *G06Q 30/02* (2013.01); *G06Q 30/0201* (2013.01); *G06Q 30/0278* (2013.01); *G06Q 30/06* (2013.01); *G06Q 40/00* (2013.01)

(58) Field of Classification Search
CPC .................................................. G06Q 40/025

USPC .... 705/38, 1.1, 10, 37, 39, 35, 30, 26.1, 57, 705/40; 364/400, 408, 715; 235/379
See application file for complete search history.

(56) References Cited

U.S. PATENT DOCUMENTS

| | | | |
|---|---|---|---|
| 4,554,418 A | 11/1985 | Toy | |
| 4,736,294 A | * 4/1988 | Gill ..................... | G06Q 40/025 |
| | | | 235/379 |

(Continued)

FOREIGN PATENT DOCUMENTS

| | | |
|---|---|---|
| EP | 1146459 | 10/2001 |
| EP | 1220131 | 7/2002 |

(Continued)

OTHER PUBLICATIONS

NPL Search History.*

(Continued)

*Primary Examiner* — John H. Holly
(74) *Attorney, Agent, or Firm* — Knobbe, Martens, Olson & Bear, LLP

(57) ABSTRACT

Methods, systems and computer program products for generating customer-specific vehicle proposals that may be based on ongoing vehicle finance payment information and/or information received from a third party entity. Embodiments of inventions herein disclosed provide for efficient identification of potential customers based on their current vehicle and/or ongoing financial obligations related to the current vehicle. A replacement vehicle is identified and a vehicle proposal, such as a sales or lease proposal, is generated for one or more of the identified potential customers.

21 Claims, 47 Drawing Sheets

Related U.S. Application Data continuation of application No. 13/789,510, filed on Mar. 7, 2013, now abandoned, which is a continuation of application No. 13/299,293, filed on Nov. 17, 2011, now Pat. No. 8,396,791, which is a continuation of application No. 13/076,203, filed on Mar. 30, 2011, now Pat. No. 8,095,461, which is a continuation of application No. 12/911,552, filed on Oct. 25, 2010, now Pat. No. 8,005,752, which is a continuation of application No. 10/996,122, filed on Nov. 23, 2004, now Pat. No. 7,827,099.

(60) Provisional application No. 60/525,233, filed on Nov. 25, 2003.

(56) References Cited

U.S. PATENT DOCUMENTS

| | | | |
|---|---|---|---|
| 4,774,664 A | 9/1988 | Campbell et al. | |
| 5,414,621 A | 5/1995 | Hough | |
| 5,493,490 A | 2/1996 | Johnson | |
| 5,500,793 A | 3/1996 | Deming et al. | |
| 5,664,115 A | 9/1997 | Fraser | |
| 5,724,573 A | 3/1998 | Agrawal et al. | |
| 5,742,769 A | 4/1998 | Lee et al. | |
| 5,774,883 A | 6/1998 | Andersen et al. | |
| 5,884,305 A | 3/1999 | Kleinberg et al. | |
| 5,893,075 A | 4/1999 | Plainfield et al. | |
| 5,930,764 A | 7/1999 | Melchione et al. | |
| 5,933,818 A | 8/1999 | Kasravi et al. | |
| 5,940,812 A | 8/1999 | Tengel et al. | |
| 5,966,695 A | 10/1999 | Melchione et al. | |
| 5,987,434 A | 11/1999 | Libman et al. | |
| 6,023,687 A | 2/2000 | Weatherly et al. | |
| 6,026,370 A | 2/2000 | Jermyn | |
| 6,041,310 A | 3/2000 | Green et al. | |
| 6,061,682 A | 5/2000 | Agrawal et al. | |
| 6,073,112 A | 6/2000 | Geerlings | |
| 6,161,103 A | 12/2000 | Rauer et al. | |
| 6,236,978 B1 | 5/2001 | Tuzhilin | |
| 6,266,668 B1 | 7/2001 | Vanderveldt et al. | |
| 6,285,983 B1 | 9/2001 | Jenkins | |
| 6,332,126 B1 | 12/2001 | Peirce et al. | |
| 6,334,110 B1 | 12/2001 | Walter et al. | |
| 6,418,419 B1 | 7/2002 | Nieboer et al. | |
| 6,480,105 B2 | 11/2002 | Edwards | |
| 6,493,722 B1 | 12/2002 | Daleen et al. | |
| 6,502,080 B1 | 12/2002 | Eichorst et al. | |
| 6,526,335 B1 | 2/2003 | Treyz et al. | |
| 6,603,487 B1 | 8/2003 | Bennett et al. | |
| 6,629,095 B1 | 9/2003 | Wagstaff et al. | |
| 6,658,390 B1 | 12/2003 | Walker | |
| 6,925,411 B1 | 8/2005 | Drost et al. | |
| 6,941,305 B2 | 9/2005 | Magouirk et al. | |
| 6,950,807 B2 | 9/2005 | Brock | |
| 6,965,874 B2 | 11/2005 | Joseph | |
| 7,065,555 B2 | 6/2006 | Foulger et al. | |
| 7,072,848 B2 | 7/2006 | Boyd et al. | |
| 7,089,588 B2 | 8/2006 | Schaefer | |
| 7,130,821 B1 | 10/2006 | Connors et al. | |
| 7,177,822 B2 | 2/2007 | Mahmood et al. | |
| 7,213,023 B2 | 5/2007 | Hadzikadic | |
| 7,216,102 B2 * | 5/2007 | Nabe | G06Q 30/08 705/37 |
| 7,239,234 B2 | 7/2007 | Cina | |
| 7,249,322 B2 | 7/2007 | Jones et al. | |
| 7,305,364 B2 | 12/2007 | Nabe et al. | |
| 7,343,406 B1 | 3/2008 | Buonanno | |
| 7,346,537 B2 | 3/2008 | Kraft et al. | |
| 7,386,485 B1 | 6/2008 | Mussman et al. | |
| 7,386,594 B2 | 6/2008 | Foulger et al. | |
| 7,392,221 B2 | 6/2008 | Nabe | |
| 7,406,436 B1 | 7/2008 | Reisman | |
| 7,444,304 B2 | 10/2008 | Mellinger et al. | |
| 7,472,072 B2 | 12/2008 | Kowalchuk | |
| 7,483,846 B1 | 1/2009 | Kumar et al. | |
| 7,487,110 B2 | 2/2009 | Bennett | |
| 7,529,694 B2 | 5/2009 | Crites | |
| 7,546,273 B2 | 6/2009 | Blanchard et al. | |
| 7,555,443 B2 | 6/2009 | Chandran et al. | |
| 7,571,128 B1 | 8/2009 | Brown et al. | |
| 7,827,099 B1 | 11/2010 | Cotton | |
| 8,005,752 B1 | 8/2011 | Cotton | |
| 8,086,529 B2 | 12/2011 | Cotton | |
| 8,095,461 B2 | 1/2012 | Cotton | |
| 8,315,911 B2 | 11/2012 | Callow et al. | |
| 8,374,894 B2 | 2/2013 | Weinstock et al. | |
| 8,396,791 B2 | 3/2013 | Cotton | |
| 9,047,616 B2 | 6/2015 | Schnabel et al. | |
| 10,319,031 B2 | 6/2019 | Cotton | |
| 2001/0034700 A1 | 10/2001 | Foss et al. | |
| 2001/0044769 A1 | 11/2001 | Chaves | |
| 2001/0049653 A1 | 12/2001 | Sheets | |
| 2002/0010643 A1 | 1/2002 | Chaves | |
| 2002/0013711 A1 | 1/2002 | Ahuja et al. | |
| 2002/0023051 A1 | 2/2002 | Kunzle et al. | |
| 2002/0024537 A1 | 2/2002 | Jones et al. | |
| 2002/0035520 A1 | 3/2002 | Weiss | |
| 2002/0042752 A1 | 4/2002 | Chaves | |
| 2002/0065707 A1 | 5/2002 | Lancaster | |
| 2002/0082860 A1 | 6/2002 | Johnson | |
| 2002/0099618 A1 | 7/2002 | Stiberman | |
| 2002/0103715 A1 | 8/2002 | Bennett | |
| 2002/0188506 A1 | 12/2002 | Smith | |
| 2002/0194050 A1 | 12/2002 | Nabe et al. | |
| 2002/0198820 A1 | 12/2002 | Mills | |
| 2003/0105728 A1 | 6/2003 | Hirobe et al. | |
| 2003/0154094 A1 | 8/2003 | Bredemeier et al. | |
| 2003/0154129 A1 | 8/2003 | Goff | |
| 2003/0172016 A1 | 9/2003 | Chandran et al. | |
| 2003/0212619 A1 | 11/2003 | Jain et al. | |
| 2003/0212628 A1 | 11/2003 | Kuttan et al. | |
| 2003/0216995 A1 | 11/2003 | DePauw | |
| 2003/0229528 A1 | 12/2003 | Nitao et al. | |
| 2004/0039690 A1 | 2/2004 | Brown et al. | |
| 2004/0103041 A1 | 5/2004 | Alston | |
| 2004/0148181 A1 | 7/2004 | McKnight et al. | |
| 2004/0167897 A1 | 8/2004 | Kuhlmann et al. | |
| 2004/0181480 A1 | 9/2004 | Greenberg et al. | |
| 2004/0254819 A1 | 12/2004 | Halim et al. | |
| 2005/0021378 A1 | 1/2005 | Weinstock et al. | |
| 2005/0049911 A1 | 3/2005 | Engelking et al. | |
| 2005/0091087 A1 | 4/2005 | Smith et al. | |
| 2005/0165639 A1 | 7/2005 | Ross et al. | |
| 2005/0171896 A1 | 8/2005 | Seretti et al. | |
| 2006/0004626 A1 | 1/2006 | Holmen et al. | |
| 2006/0020477 A1 | 1/2006 | Retzbach et al. | |
| 2006/0064340 A1 | 3/2006 | Cook | |
| 2006/0085283 A1 | 4/2006 | Griffiths | |
| 2006/0129423 A1 | 6/2006 | Sheinson et al. | |
| 2006/0143112 A1 | 6/2006 | Donarski et al. | |
| 2006/0155439 A1 | 7/2006 | Slawinski et al. | |
| 2006/0184379 A1 | 8/2006 | Tan et al. | |
| 2006/0229981 A1 | 10/2006 | Crites | |
| 2007/0129954 A1 | 6/2007 | Dessureault | |
| 2007/0136163 A1 | 6/2007 | Bell | |
| 2007/0179798 A1 | 8/2007 | Inbarajan | |
| 2007/0282712 A1 | 12/2007 | Ullman et al. | |
| 2007/0282713 A1 | 12/2007 | Ullman et al. | |
| 2008/0103785 A1 | 5/2008 | Logan | |
| 2008/0120155 A1 | 5/2008 | Pliha | |
| 2008/0183616 A1 | 7/2008 | Hankey et al. | |
| 2008/0201163 A1 | 8/2008 | Barker et al. | |
| 2008/0201184 A1 | 8/2008 | Rose et al. | |
| 2008/0288332 A1 | 11/2008 | Altounian et al. | |
| 2008/0294996 A1 | 11/2008 | Hunt et al. | |
| 2008/0300962 A1 | 12/2008 | Cawston et al. | |
| 2010/0082780 A1 | 4/2010 | Muilenburg et al. | |
| 2010/0217616 A1 | 8/2010 | Colson et al. | |
| 2010/0274571 A1 | 10/2010 | McFall et al. | |
| 2010/0274631 A1 | 10/2010 | McFall et al. | |
| 2010/0278318 A1 | 11/2010 | Flockhart et al. | |
| 2010/0287058 A1 | 11/2010 | Rosskamm et al. | |
| 2011/0173111 A1 | 7/2011 | Cotton | |

(56) References Cited

U.S. PATENT DOCUMENTS

| | | | |
|---|---|---|---|
| 2011/0173112 | A1 | 7/2011 | Cotton |
| 2011/0270659 | A1 | 11/2011 | Crites |
| 2012/0036033 | A1 | 2/2012 | Serrgy et al. |
| 2012/0059725 | A1 | 3/2012 | Colson et al. |
| 2012/0116890 | A1 | 5/2012 | Colson et al. |
| 2012/0136775 | A1 | 5/2012 | Cotton |
| 2013/0185190 | A1 | 7/2013 | Cotton |
| 2013/0211865 | A1 | 8/2013 | Cotton |
| 2013/0218636 | A1 | 8/2013 | Colson et al. |
| 2014/0006108 | A1 | 1/2014 | Cotton |
| 2014/0081751 | A1 | 3/2014 | Hogan et al. |
| 2014/0236655 | A1 | 8/2014 | Warner et al. |
| 2014/0324531 | A1 | 10/2014 | Cotton |
| 2014/0324536 | A1 | 10/2014 | Cotton et al. |
| 2015/0019407 | A1 | 1/2015 | Cotton |
| 2015/0235241 | A1 | 8/2015 | Schnabl et al. |
| 2016/0110804 | A1 | 4/2016 | Cotton |

FOREIGN PATENT DOCUMENTS

| | | |
|---|---|---|
| EP | 1278140 | 1/2003 |
| EP | 1288822 | 3/2003 |
| EP | 1298561 | 4/2003 |
| JP | 10143564 | 5/1998 |
| JP | 2002041876 | 2/2002 |
| JP | 2003242338 | 8/2003 |
| JP | 2004094702 | 3/2004 |
| WO | WO 92/12488 | 7/1992 |
| WO | WO 97/15023 | 4/1997 |
| WO | WO 01/18704 | 3/2001 |
| WO | WO 01/18728 | 3/2001 |
| WO | WO 01/17458 | 9/2001 |
| WO | WO 01/67210 | 9/2001 |
| WO | WO 01/91010 | 11/2001 |
| WO | WO 02/057967 | 7/2002 |
| WO | WO 03/083603 | 10/2003 |
| WO | WO 2004/008367 | 1/2004 |
| WO | WO 2008/110939 | 9/2008 |

OTHER PUBLICATIONS

ProQuestDialogNPL Search History.*
U.S. Appl. No. 13/506,550, filed Oct. 3, 2014.
U.S. Appl. No. 13/789,510, filed Mar. 7, 3013.
U.S. Appl. No. 13/299,293, filed Nov. 17, 2011.
U.S. Appl. No. 13/076,203, filed Mar. 30, 2011.
U.S. Appl. No. 12/911,552, filed Oct. 25, 2010.
U.S. Appl. No. 10/996,122, filed Nov. 23, 2004.
Aizcorbe, Ana; Starr, Martha; Hickman, James. T. "Vehicle purchases, leasing, and replacement demand: evidence from the Federal Reserve's Survey of Consumer Finances"; Apr. 1, 2004.
Alvarez et al., "The Development of an Expert System for Credit Control, Integrated with a Transactional Accounting System", AICA Annual Conference Proceedings, vol. 2, 1990, pp. 865-870.
Arend, M., "New Automated" Experts Ready for Lenders, ABA Bank Journal, Jan. 1992.
AutoExcavations web site from the Internet Archive, http://web.archive.org/web/20090206035139/http://autoexcavations.com/, captured Feb. 6, 2009.
Bulldog Marketing web site from the Internet Archive, http://web.archive.org/web/20091216052319/http://www.bdogm.com/Products.html, captured Dec. 16, 2009.
Clarke Jim, "Move Over ATM, Automated Loan Officer is Here," Associated Press, Times Advocate, 1995.
Danis et al., Issues and Concerns in Internet Based Financial Applications: An Example from an Auto Finance System. Proceedings of the 32nd Hawaii International Conference on System Sciences—1999.
DealerSocket MoneyMaker web site from the Internet Archive, http://web.archive.org/web/20110703215521/http://www.dealersocket.com/dsdev/products/money-maker, captured Jul. 3, 2011.

DealerWizard web site from the Internet Archive, http://web.archive.org/web/20101217225909/http://dealerwizard.com/publicFiles/faq.htm, captured Dec. 17, 2010.
Eisemann et al., "Sharp Dealer Practices Could Menance Bank Lenders", Journal of Retail Banking, vol. 15, No. 2, pp. 21-23. Summer 1993.
E-Lead web site, www1.eleadcrm.com/fresh/elead_sales/products/golddigger.html, last modified Nov. 9, 2010.
Gazis, "Real Estate Investment Analysis System," IBM Technical Disclosure Bulletin, 04-71, Apr. 1, 1971, pp. 3274-3275.
Hart Peter E., "Syntel: An Architecture for Financial Applications," Innovative Applications of Artificial Intelligence, pp. 63-70 1989.
Hutson, "Analyst: An Advisor for Financial Analysis of Automobile Dealerships," Innovative Applications of Artificial Intelligence, Mar. 1989, pp. 27-42.
Kindle et al., "PFPS: Personal Financial Planning System," Innovative Applications of Artificial Intelligence, 1989, pp. 51-61.
"Leasing versus Buying That New Car," Web pp. printout from http://www.infoplease.com/ipa/A0193143.html, printed on Sep. 1, 2011.
Mortgageware Resource Guide, Release 5.4d, 1992, Chapter Get, QUA, Pro.
Morton, Fiona Scott et al. Internet Car Retailing. 34 pages. Sep. 2000.
OneCommand web site from the Internet Archive, http://web.archive.org/web/20110128200926/http://www.onecommand.com/solutions/index.php, captured Jan. 28, 2011.
Power, Richard, "A System for Assessing Credit-Worthiness", 8th International Workshop of Expert Systems & Their Applications, vol. 3, 1988, pp. 619.
ProspectVision web site from the Internet Archive, http://web.archive.org/web/20100606060554/http://prospectvision.com/products.asp, captured Jun. 6, 2006.
"Replacing Vehicle on Existing Policy," Webpp. printout from https://www.weimerover.com/autoreplace-vehicle.php, printed Sep. 1, 2011.
Reynolds and Reynolds, "Equity Calculator for ERA Contact Management," flyer from http://www.reyrey.com/solutions/era/internet_crm/eq_calc.asp, dated Oct. 20, 2008.
"Reynolds and Reynolds Introduces New Tools to Help Dealers Make Most of Vehicle Value Data," article from www.thefreelibrary.com/_/print/PrintArticle.aspx?id=155431488, dated Dec. 4, 2006.
Rusnak, Raymond, "Consumer Credit-Scoring: Are There Lessons for Commercial Lenders?", Journal of Commercial Lending, vol. 76, No. 11, pp. 37-42, Jul. 1994.
Sivasankaran et al., "An Expert System for Analysis of Credit Profiles," The Journal of Computer Information Systems, vol. XXX, No. 4, pp. 31-38, Summer 1990.
Screen shots of 1992 Lotus 1-2-3 spreadsheet program in 4 pp.
Tyson, David, "Interlinq Mortgage Software Hits Big:", American Banker, 1987, vol. 152, No. 226.
Vehicle purchases, leasing, and replacement demand: evidence from the Federal Reserve's Survey of Consumer Finances, Apr. 1, 2004.
Vu, Hao, "Potential Applications of Artificial Intelligence and Expert Systems in Financial and Banking Institutions," Proceedings of the 2nd Annual Artificial Intelligence & Advanced Computer Technology Conference, pp. 28-33, May 1986.
Warner, Boyd H., "AutoAlert® for New Dealerships," Presentation to Potential Customers, created Apr. 2, 2007.
Xtream web site from the Internet Archive, http://web.archive.org/web/20100112093637/http://www.xtreamsales.com, captured Jan. 12, 2010.
"AutoAlert, Inc.'s Notice of Motion and Motion for Preliminary Injunction," AutoAlert v. DealerSocket, Case No. 8:13-CV-00657 (U.S. District Court for the Central District of California), Doc. 12, filed Sep. 13, 2013.
"Memorandum of Points and Authorities in Support of Plaintiff AutoAlert, Inc.'s Motion for Preliminary Injunction," AutoAlert v. DealerSocket, Case No. 8:13-CV-00657 (U.S. District Court for the Central District of California), Doc. 13, filed Sep. 13, 2013.
"DealerSocket, Inc.'s Opposition to AutoAlert, Inc.'s Motion for Preliminary Injunction," AutoAlert v. DealerSocket, Case No. 8:13-

(56) References Cited

OTHER PUBLICATIONS

CV-00657 (U.S. District Court for the Central District of California), Doc. 60, filed Dec. 2, 2013.
Allan, "Declaration of Brian Allan in Opposition to AutoAlert, Inc.'s Motion for Preliminary Injunction," *AutoAlert v. DealerSocket*, Case No. 8:13-CV-00657 (U.S. District Court for the Central District of California), Doc. 43-1, filed Nov. 18, 2013.
Codd, "Declaration of Brad Codd in Opposition to AutoAlert, Inc.'s Motion for Preliminary Injunction," *AutoAlert v. DealerSocket*, Case No. 8:13-CV-00657 (U.S. District Court for the Central District of California), Dkt. No. 43-2, filed Nov. 18, 2013.
Fichter, "Declaration of Joshua Fichter in Opposition to AutoAlert, Inc.'s Motion for Preliminary Injunction," *AutoAlert v. DealerSocket*, Case No. 8:13-CV-00657 (U.S. District Court for the Central District of California), Dkt. No. 43-3, filed Nov. 18, 2013.
Vancleave, "Declaration of Darren VanCleave in Opposition to AutoAlert, Inc.'s Motion for Preliminary Injunction," *AutoAlert v. DealerSocket*, Case No. 8:13-CV-00657 (U.S. District Court for the Central District of California), Doc. 43-5, filed Nov. 18, 2013.
Wilson, "Declaration of David A. Wilson, Ph.D., in Opposition to AutoAlert, Inc.'s Motion for Preliminary Injunction," *AutoAlert v. DealerSocket*, Case No. 8:13-CV-00657 (U.S. District Court for the Central District of California), Doc. 43-6, filed Nov. 18, 2013.
"First Amended Complaint for Patent Infringement," *AutoAlert v. DealerSocket*, Case No. 8:13-CV-00657 (U.S. District Court for the Central District of California), Doc. 51, filed Nov. 21, 2013.
"DealerSocket, Inc.'s Answer to AutoAlert, Inc.'s First Amended Complaint; and Counterclaims," *AutoAlert v. DealerSocket*, Case No. 8:13-CV-00657 (U.S. District Court for the Central District of California), Doc. 62, filed Dec. 5, 2013.
"AutoAlert, Inc.'s Reply in Support of Its Motion for Preliminary Injunction," *AutoAlert v. DealerSocket*, Case No. 8:13-CV-00657 (U.S. District Court for the Central District of California), Doc. 65, filed Dec. 16, 2013.
Wilson, "Second Declaration of David A. Wilson, Ph.D., in Opposition to AutoAlert, Inc.'s Motion for Preliminary Injunction," *AutoAlert v. DealerSocket*, Case No. 8:13-CV-00657 (U.S. District Court for the Central District of California), Doc. 89, filed Jan. 6, 2014.
"Redacted Order Denying Plaintiffs Motion for Preliminary Injunction," *AutoAlert v. DealerSocket*, Case No. 8:13-CV-00657 (U.S. District Court for the Central District of California), Doc. 96, filed Feb. 4, 2014.
Paszek, "Deposition of Robert Paszek" (Redacted Transcript), *AutoAlert v. DealerSocket*, Case No. 8:13-CV-00657 (U.S. District Court for the Central District of California), Dec. 19, 2013.
"Docket Report," *AutoAlert v. DealerSocket*, Case No. 8:13-CV-00657 (U.S. District Court for the Central District of California), retrieved May 9, 2014.
"Second Amended Complaint for Patent Infringement," *AutoAlert v. Dominion Dealer Solutions et al.*, Case No. 8:12-CV-01661 (U.S. District Court for the Central District of California), Doc. 61, filed Mar. 13, 2014.
"AutoAlert, Inc.'s Answer to Dominion Dealer Solutions, LLC's Amended Counterclaims," *AutoAlert v. Dominion Dealer Solutions et al.*, Case No. 8:12-CV-01661 (U.S. District Court for the Central District of California), Doc. 63, filed Mar. 14, 2014.
"Answer to Second Amended Complaint," *AutoAlert v. Dominion Dealer Solutions et al.*, Case No. 8:12-CV-01661 (U.S. District Court for the Central District of California), Doc. 64, filed Mar. 31, 2014.
"Dominion Dealer Solutions, LLC's Second Amended Counterclaims for Declaratory Judgment," *AutoAlert v. Dominion Dealer Solutions et al.*, Case No. 8:12-CV-01661 (U.S. District Court for the Central District of California), Doc. 65, filed Mar. 31, 2014.
"Docket Report," *AutoAlert v. Dominion Dealer Solutions et al.*, Case No. 8:12-CV-01661 (U.S. District Court for the Central District of California), retrieved May 9, 2014.

"Petition for Inter Partes Review," *Dominion Dealer Solutions v. AutoAlert*, Case No. IPR2013-00222 (USPTO Patent Trial and Appeal Board), Paper 1, filed Mar. 28, 2013.
"Petition for Inter Partes Review," *Dominion Dealer Solutions v. AutoAlert*, Case No. IPR2013-00220 (USPTO Patent Trial and Appeal Board), Paper 1, filed Mar. 28, 2013.
"Petition for Inter Partes Review," *Dominion Dealer Solutions v. AutoAlert*, Case No. IPR2013-00223 (USPTO Patent Trial and Appeal Board), Paper 1, filed Mar. 28, 2013.
"Petition for Inter Partes Review," *Dominion Dealer Solutions v. AutoAlert*, Case No. IPR2013-00224 (USPTO Patent Trial and Appeal Board), Paper 1, filed Mar. 28, 2013.
"Petition for Inter Partes Review," *Dominion Dealer Solutions v. AutoAlert*, Case No. IPR2013-00225 (USPTO Patent Trial and Appeal Board), Paper 1, filed Mar. 28, 2013.
"AutoAlert, Inc.'s Preliminary Response to Petition," *Dominion Dealer Solutions v. AutoAlert*, Case No. IPR2013-00222 (USPTO Patent Trial and Appeal Board), Paper 11, filed Jul. 3, 2013.
"AutoAlert, Inc.'s Preliminary Response to Petition," *Dominion Dealer Solutions v. AutoAlert*, Case No. IPR2013-00220 (USPTO Patent Trial and Appeal Board), Paper 7, filed Jul. 3, 2013.
"AutoAlert, Inc.'s Preliminary Response to Petition," *Dominion Dealer Solutions v. AutoAlert*, Case No. IPR2013-00223 (USPTO Patent Trial and Appeal Board), Paper 8, filed Jul. 3, 2013.
"AutoAlert, Inc.'s Preliminary Response to Petition," *Dominion Dealer Solutions v. AutoAlert*, Case No. IPR2013-00224 (USPTO Patent Trial and Appeal Board), Paper 9, filed Jul. 3, 2013.
"AutoAlert, Inc.'s Preliminary Response to Petition," *Dominion Dealer Solutions v. AutoAlert*, Case No. IPR2013-00225 (USPTO Patent Trial and Appeal Board), Paper 9, filed Jul. 3, 2013.
"Decision Denying Institution of Inter Partes Review," *Dominion Dealer Solutions v. AutoAlert*, Case No. IPR2013-00222 (USPTO Patent Trial and Appeal Board), Paper 12, filed Aug. 12, 2013.
"Decision Denying Institution of Inter Partes Review," *Dominion Dealer Solutions v. AutoAlert*, Case No. IPR2013-00220 (USPTO Patent Trial and Appeal Board), Paper 8, filed Aug. 15, 2013.
"Decision Denying Institution of Inter Partes Review," *Dominion Dealer Solutions v. AutoAlert*, Case No. IPR2013-00223 (USPTO Patent Trial and Appeal Board), Paper 9, filed Aug. 15, 2013.
"Decision Denying Institution of Inter Partes Review," *Dominion Dealer Solutions v. AutoAlert*, Case No. IPR2013-00224 (USPTO Patent Trial and Appeal Board), Paper 10, filed Aug. 15, 2013.
"Decision Denying Institution of Inter Partes Review," *Dominion Dealer Solutions v. AutoAlert*, Case No. IPR2013-00225 (USPTO Patent Trial and Appeal Board), Paper 10, filed Aug. 15, 2013.
"Decision Denying Request for Rehearing," *Dominion Dealer Solutions v. AutoAlert*, Case No. IPR2013-00222 (USPTO Patent Trial and Appeal Board), Paper 17, filed Oct. 10, 2013.
"Decision Denying Request for Rehearing," *Dominion Dealer Solutions v. AutoAlert*, Case No. IPR2013-00220 (USPTO Patent Trial and Appeal Board), Paper 13, filed Oct. 10, 2013.
"Decision Denying Request for Rehearing," *Dominion Dealer Solutions v. AutoAlert*, Case No. IPR2013-00223 (USPTO Patent Trial and Appeal Board), Paper 14, filed Oct. 10, 2013.
"Decision Denying Request for Rehearing," *Dominion Dealer Solutions v. AutoAlert*, Case No. IPR2013-00224 (USPTO Patent Trial and Appeal Board), Paper 15, filed Oct. 10, 2013.
"Decision Denying Request for Rehearing," *Dominion Dealer Solutions v. AutoAlert*, Case No. IPR2013-00225 (USPTO Patent Trial and Appeal Board), Paper 15, filed Oct. 10, 2013.
"Petition for Inter Partes Review," *Dominion Dealer Solutions v. AutoAlert*, Case No. IPR2014-00684 (USPTO Patent Trial and Appeal Board), Paper 1, filed Apr. 23, 2014.
"Docket Report," *Dominion Dealer Solutions, LLC v. Michelle K. Lee* (Director of the USPTO), Case No. 3:13-CV-00699 (U.S. District Court for the Eastern District of Virginia), retrieved May 15, 2014.
"Docket," in *re Dominion Dealer Solutions, LLC*, Case No. 14-109 (U.S. Court of Appeals for the Federal Circuit), retrieved May 15, 2014.
"Docket Entries," *Dominion Dealer Solutions v. AutoAlert*, Case No. IPR2013-00222 (USPTO Patent Trial and Appeal Board), retrieved May 16, 2014.

(56) References Cited

OTHER PUBLICATIONS

"Docket Entries," *Dominion Dealer Solutions* v. *AutoAlert*, Case No. IPR2013-00220 (USPTO Patent Trial and Appeal Board), retrieved May 16, 2014.
"Docket Entries," *Dominion Dealer Solutions* v. *AutoAlert*, Case No. IPR2013-00223 (USPTO Patent Trial and Appeal Board), retrieved May 16, 2014.
"Docket Entries," *Dominion Dealer Solutions* v. *AutoAlert*, Case No. IPR2013-00224 (USPTO Patent Trial and Appeal Board), retrieved May 16, 2014.
"Docket Entries," *Dominion Dealer Solutions* v. *AutoAlert*, Case No. IPR2013-00225 (USPTO Patent Trial and Appeal Board), retrieved May 16, 2014.
"Docket Entries," *Dominion Dealer Solutions* v. *AutoAlert*, Case No. IPR2014-00684 (USPTO Patent Trial and Appeal Board), retrieved May 16, 2014.
"Docket Entries," *Dominion Dealer Solutions* v. *AutoAlert*, Case No. IPR2014-00684 (USPTO Patent Trial and Appeal Board), retrieved Oct. 9, 2014.
"Patent Owner's Preliminary Response," *Dominion Dealer Solutions* v. *AutoAlert*, Case No. IPR2014-00684 (USPTO Patent Trial and Appeal Board), Paper 8, filed Jul. 25, 2014.
"Decision: Institution of Inter Partes Review," *Dominion Dealer Solutions* v. *AutoAlert*, Case No. IPR2014-00684 (USPTO Patent Trial and Appeal Board), Paper 9, filed Oct. 6, 2014.
"Docket Entries," *DealerSocket* v. *AutoAlert*, Case No. CBM2014-00132 (USPTO Patent Trial and Appeal Board), retrieved Oct. 6, 2014.
"Petition for Covered Business Method Patent Review of U.S. Pat. No. 8,095,461," *DealerSocket* v. *AutoAlert*, Case No. CBM2014-00132 (USPTO Patent Trial and Appeal Board), Paper 1, filed May 19, 2014.
"Patent Owner AutoAlert LLC's Preliminary Response," *DealerSocket* v. *AutoAlert*, Case No. CBM2014-00132 (USPTO Patent Trial and Appeal Board), Paper 6, filed Aug. 29, 2014.
"Docket Entries," *DealerSocket* v. *AutoAlert*, Case No. CBM2014-00139 (USPTO Patent Trial and Appeal Board), retrieved Oct. 6, 2014.
"Petition for Covered Business Method Patent Review of U.S. Pat. No. 8,396,791," *DealerSocket* v. *AutoAlert*, Case No. CBM2014-00139 (USPTO Patent Trial and Appeal Board), Paper 1, filed May 26, 2014.
"Patent Owner AutoAlert LLC's Preliminary Response," *DealerSocket* v. *AutoAlert*, Case No. CBM2014-00139 (USPTO Patent Trial and Appeal Board), Paper 8, filed Sep. 4, 2014.
"Docket Entries," *DealerSocket* v. *AutoAlert*, Case No. CBM2014-00142 (USPTO Patent Trial and Appeal Board), retrieved Oct. 6, 2014.
"Corrected and Amended Petition for Covered Business Method Patent Review of U.S. Pat. No. 7,827,099," *DealerSocket* v. *AutoAlert*, Case No. CBM2014-00142 (USPTO Patent Trial and Appeal Board), Paper 6, filed Aug. 29, 2014.
"Order: Late Filing and Dismissal of Petition," *DealerSocket* v. *AutoAlert*, Case No. CBM2014-00142 (USPTO Patent Trial and Appeal Board), Paper 10, filed Sep. 8, 2014.
"Docket Entries," *DealerSocket* v. *AutoAlert*, Case No. CBM2014-00146 (USPTO Patent Trial and Appeal Board), retrieved Oct. 6, 2014.
"Corrected Petition for Covered Business Method Patent Review of U.S. Pat. No. 8,086,529," *DealerSocket* v. *AutoAlert*, Case No. CBM2014-00146 (USPTO Patent Trial and Appeal Board), Paper 4, filed Jul. 2, 2014.
"Patent Owner AutoAlert LLC's Preliminary Response," *DealerSocket* v. *AutoAlert*, Case No. CBM2014-00146 (USPTO Patent Trial and Appeal Board), Paper 8, filed Sep. 25, 2014.
"Docket Entries," *DealerSocket* v. *AutoAlert*, Case No. CBM2014-00147 (USPTO Patent Trial and Appeal Board), retrieved Oct. 6, 2014.
"Corrected Petition for Covered Business Method Patent Review of U.S. Pat. No. 8,005,752," *DealerSocket* v. *AutoAlert*, Case No. CBM2014-00147 (USPTO Patent Trial and Appeal Board), Paper 6, filed Sep. 2, 2014.
"Order: Late Filing and Dismissal of Petition," *DealerSocket* v. *AutoAlert*, Case No. CBM2014-00147 (USPTO Patent Trial and Appeal Board), Paper 8, filed Sep. 8, 2014.
"Docket Entries," *DealerSocket* v. *AutoAlert*, Case No. CBM2014-00201 (USPTO Patent Trial and Appeal Board), retrieved Oct. 6, 2014.
"Petition for Covered Business Method Patent Review of U.S. Pat. No. 7,827,099," *DealerSocket* v. *AutoAlert*, Case No. CBM2014-00201 (USPTO Patent Trial and Appeal Board), Paper 1, filed Sep. 26, 2014.
"Docket Entries," *DealerSocket* v. *AutoAlert*, Case No. CBM2014-00202 (USPTO Patent Trial and Appeal Board), retrieved Oct. 6, 2014.
"Petition for Covered Business Method Patent Review of U.S. Pat. No. 7,827,099," *DealerSocket* v. *AutoAlert*, Case No. CBM2014-00202 (USPTO Patent Trial and Appeal Board), Paper 1, filed Sep. 26, 2014.
"Docket Entries," *DealerSocket* v. *AutoAlert*, Case No. CBM2014-00203 (USPTO Patent Trial and Appeal Board), retrieved Oct. 6, 2014.
"Petition for Covered Business Method Patent Review of U.S. Pat. No. 8,005,752," *DealerSocket* v. *AutoAlert*, Case No. CBM2014-00203 (USPTO Patent Trial and Appeal Board), Paper 1, filed Sep. 26, 2014.
"Docket Report," *AutoAlert* v. *Dominion Dealer Solutions et al.*, Case No. 8:12-CV-01661 (U.S. District Court for the Central District of California), retrieved Oct. 6, 2014.
"AutoAlert's Opening Brief on Claim Construction," *AutoAlert* v. *Dominion*, Case No. 8:12-CV-01661 (U.S. District Court for the Central District of California), Doc. 77, filed Jul. 31, 2014.
"Appendix a to AutoAlert's Opening Brief on Claim Construction," *AutoAlert* v. *Dominion*, Case No. 8:12-CV-01661 (U.S. District Court for the Central District of California), Doc. 77-1, filed Jul. 31, 2014.
Carbonell, "Declaration of Dr. Jamie G. Carbonell in Support of AutoAlert's Opening Brief on Claim Construction," *AutoAlert* v. *Dominion*, Case No. 8:12-CV-01661 (U.S. District Court for the Central District of California), Doc. No. 82, filed Jul. 31, 2014.
"Dominion Defendants' Joint Opening Brief on Claim Construction," *AutoAlert* v. *Dominion*, Case No. 8:12-CV-01661 (U.S. District Court for the Central District of California), Doc. 80, filed Jul. 31, 2014.
"Memorandum in Support of Motion of 110 Reynolds, LLC for Summary Judgment or, in the Alternative, for Partial Summary Judgment, of Invalidity under 35 USC 112 for Indefiniteness," *AutoAlert* v. *Dominion*, Case No. 8:12-CV-01661 (U.S. District Court for the Central District of California), Doc. 83-1, filed Aug. 12, 2014.
Minotti, "Declaration of Dominick A. Minotti, Jr. in Support of 110 Reynolds, LLC's Motion for Summary Judgment of Indefiniteness," *AutoAlert* v. *Dominion*, Case No. 8:12-CV-01661 (U.S. District Court for the Central District of California), Doc. No. 86, filed Aug. 12, 2014.
"AutoAlert's Responsive Brief on Claim Construction," *AutoAlert* v. *Dominion*, Case No. 8:12-CV-01661 (U.S. District Court for the Central District of California), Doc. 88, filed Aug. 14, 2014.
"Dominion Defendants' Joint Responsive Brief on Claim Construction," *AutoAlert* v. *Dominion*, Case No. 8:12-CV-01661 (U.S. District Court for the Central District of California), Doc. 89, filed Aug. 14, 2014.
Minotti, "Declaration of Dominick a. Minotti, Jr. in Support of Dominion Defendants' Joint Responsive Claim Construction Brief," *AutoAlert* v. *Dominion*, Case No. 8:12-CV-01661 (U.S. District Court for the Central District of California), Doc. No. 89-4, filed Aug. 12, 2014.
"AutoAlert, LLC's Opposition to 110 Reynolds, LLC's Motion for Summary Judgment or, in Alternative, Partial Summary Judgment, of Invalidity under 35 USC 112 for Indefiniteness," *AutoAlert* v.

(56) References Cited

OTHER PUBLICATIONS

*Dominion*, Case No. 8:12-CV-01661 (U.S. District Court for the Central District of California), Doc. 95, filed Sep. 5, 2014.
"Reply in Support of Motion of 110 Reynolds, LLC for Summary Judgment or, in Alternative, Partial Summary Judgment, of Invalidity under 35 USC 112 for Indefiniteness," *AutoAlert v. Dominion*, Case No. 8:12-CV-01661 (U.S. District Court for the Central District of California), Doc. 98, filed Sep. 12, 2014.
Carbonell, "Declaration of Jamie G. Carbonell in Support of AutoAlert, Inc.'s Opening Claim Construction Brief," *AutoAlert v. DealerSocket*, Case No. 8:13-CV-00657 (U.S. District Court for the Central District of California), Doc. 116, filed Apr. 14, 2014.
"AutoAlert, Inc.'s Corrected Opening Claim Construction Brief," *AutoAlert v. DealerSocket*, Case No. 8:13-CV-00657 (U.S. District Court for the Central District of California), Doc. 120, filed Apr. 14, 2014.
"Appendix A to AutoAlert, Inc.'s Corrected Opening Claim Construction Brief," *AutoAlert v. DealerSocket*, Case No. 8:13-CV-00657 (U.S. District Court for the Central District of California), Doc. 120-1, filed Apr. 14, 2014.
"AutoAlert, Inc.'s Updated Opening Claim Construction Brief," *AutoAlert v. DealerSocket*, Case No. 8:13-CV-00657 (U.S. District Court for the Central District of California), Doc. 131, filed Apr. 21, 2014.
"Appendix A to AutoAlert, Inc.'s Updated Opening Claim Construction Brief," *AutoAlert v. DealerSocket*, Case No. 8:13-CV-00657 (U.S. District Court for the Central District of California), Doc. 131-1, filed Apr. 21, 2014.
"DealerSocket, Inc.'s Responsive Claim Construction Brief," *AutoAlert v. DealerSocket*, Case No. 8:13-CV-00657 (U.S. District Court for the Central District of California), Doc. 134, filed May 5, 2014.
Stapleton, "Declaration of Melody J. Stapleton in Support of DealerSocket, Inc.'s Responsive Claim Construction Brief," *AutoAlert v. DealerSocket*, Case No. 8:13-CV-00657 (U.S. District Court for the Central District of California), Doc. 134-3, filed May 5, 2014.
"AutoAlert, Inc.'s Reply Brief on Claim Construction," *AutoAlert v. DealerSocket*, Case No. 8:13-CV-00657 (U.S. District Court for the Central District of California), Doc. 147, filed May 19, 2014.
"Order Construing Claim Terms Following Markman Hearing," *AutoAlert v. DealerSocket*, Case No. 8:13-CV-00657 (U.S. District Court for the Central District of California), Doc. 180, filed Jun. 18, 2014.
"DealerSocket, Inc.'s Amended Preliminary Election of Asserted Prior Art," *AutoAlert v. DealerSocket*, Case No. 8:13-CV-00657 (U.S. District Court for the Central District of California), served Jul. 16, 2014.
"Docket Report," *AutoAlert v. Dominion Dealer Solutions et al.*, Case No. 8:12-CV-01661 (U.S. District Court for the Central District of California), retrieved Dec. 26, 2014.
"Memorandum in Support of Autobase's Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), Doc. 109-1, filed Oct. 31, 2014.
"Statement of Undisputed Facts and Conclusions of Law in Support of Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), Doc. 110, filed Oct. 31, 2014.
"AutoAlert, LLC's Opposition to Autobase, Inc.'s Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), Doc. 118, filed Nov. 14, 2014.
"AutoAlert, LLC's Statement of Genuine Disputes in Opposition to Autobase, Inc.'s Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), Doc. 119, filed Nov. 14, 2014.
"Reply re Autobase's Motion for Summary Judgment of Invalidity Under 35 U.S.C. 101 for Lack of Patent Eligibility," *AutoAlert v. Dominion*, Case No. 8:12-CV-01661 (U.S. District Court for the Central District of California), Doc. 121, filed Nov. 21, 2014.
"Order Denying 110 Reynolds, LLC's Motion for Summary Judgment (Doc. 83)," *AutoAlert v. Dominion*, Case No. 8:12-CV-01661 (U.S. District Court for the Central District of California), Doc. 138, filed Dec. 23, 2014.
"Order Granting Autobase's Motion for Summary Judgment," *AutoAlert v. Dominion*, Case No. 8:12-CV-01661 (U.S. District Court for the Central District of California), Doc. 140, filed Dec. 23, 2014.
"Docket Report," *AutoAlert v. DealerSocket*, Case No. 8:13-CV-00657 (U.S. District Court for the Central District of California), retrieved Dec. 26, 2014.
"Docket Entries," *Dominion Dealer Solutions v. AutoAlert*, Case No. IPR2014-00684 (USPTO Patent Trial and Appeal Board), retrieved Dec. 29, 2014.
"Patent Owner's Response Pursuant to 37 C.F.R. 42.120," *Dominion Dealer Solutions v. AutoAlert*, Case No. IPR2014-00684 (USPTO Patent Trial and Appeal Board), Paper 18, filed Dec. 22, 2014.
"Declaration of Jaime G. Carbonell in Support of AutoAlert, LLC's Patent Owner's Response," *Dominion Dealer Solutions v. AutoAlert*, Case No. IPR2014-00684 (USPTO Patent Trial and Appeal Board), Exhibit 2004, filed Dec. 22, 2014.
"Declaration of Michael Brairton in Support of AutoAlert, LLC's Patent Owner's Response," *Dominion Dealer Solutions v. AutoAlert*, Case No. IPR2014-00684 (USPTO Patent Trial and Appeal Board), Exhibit 2007, filed Dec. 22, 2014.
"Declaration of James Maxwell in Support of AutoAlert, LLC's Patent Owner's Response," *Dominion Dealer Solutions v. AutoAlert*, Case No. IPR2014-00684 (USPTO Patent Trial and Appeal Board), Exhibit 2009, filed Dec. 22, 2014.
"Transcript of the Deposition of Dominick A. Minotti Jr., Taken Dec. 9, 2014," *Dominion Dealer Solutions v. AutoAlert*, Case No. IPR2014-00684 (USPTO Patent Trial and Appeal Board), Exhibit 2016, filed Dec. 22, 2014.
"Docket Entries," *DealerSocket v. AutoAlert*, Case No. CBM2014-00132 (USPTO Patent Trial and Appeal Board), retrieved Jan. 15, 2014.
"Decision: Institution of Covered Business Method Patent Review," *DealerSocket v. AutoAlert*, Case No. CBM2014-00132 (USPTO Patent Trial and Appeal Board), Paper 11, filed Oct. 29, 2014.
"AutoAlert, LLC's Patent Owner Response," *DealerSocket v. AutoAlert*, Case No. CBM2014-00132 (USPTO Patent Trial and Appeal Board), Paper 21, filed Dec. 29, 2014.
"Docket Entries," *DealerSocket v. AutoAlert*, Case No. CBM2014-00139 (USPTO Patent Trial and Appeal Board), retrieved Dec. 29, 2014.
"Decision: Institution of Covered Business Method Patent Review," *DealerSocket v. AutoAlert*, Case No. CBM2014-00139 (USPTO Patent Trial and Appeal Board), Paper 12, filed Oct. 23, 2014.
"Patent Owner AutoAlert LLC's Response," *DealerSocket v. AutoAlert*, Case No. CBM2014-00139 (USPTO Patent Trial and Appeal Board), Paper 22, filed Dec. 22, 2014.
"Declaration of Jaime G. Carbonell in Support of AutoAlert, LLC's Patent Owner's Response," *Dominion Dealer Solutions v. AutoAlert*, Case No. CBM2014-00139 (USPTO Patent Trial and Appeal Board), Exhibit 2004, filed Dec. 22, 2014.
"Docket Entries," *DealerSocket v. AutoAlert*, Case No. CBM2014-00146 (USPTO Patent Trial and Appeal Board), retrieved Dec. 29, 2014.
"Decision: Institution of Covered Business Method Patent Review," *DealerSocket v. AutoAlert*, Case No. CBM2014-00146 (USPTO Patent Trial and Appeal Board), Paper 19, filed Dec. 9, 2014.
"Docket Entries," *DealerSocket v. AutoAlert*, Case No. CBM2014-00201 (USPTO Patent Trial and Appeal Board), retrieved Jan. 15, 2014.
"Docket Entries," *DealerSocket v. AutoAlert*, Case No. CBM2014-00202 (USPTO Patent Trial and Appeal Board), retrieved Jan. 15, 2014.
"Docket Entries," *DealerSocket v. AutoAlert*, Case No. CBM2014-00203 (USPTO Patent Trial and Appeal Board), retrieved Jan. 15, 2014.

(56) References Cited

OTHER PUBLICATIONS

"Minute Order in Chambers: Order on Claim Construction," *AutoAlert v. Dominion*, Case No. 8:12-CV-01661 (U.S. District Court for the Central District of California), Doc. 139, filed Dec. 23, 2014.
"Docket Entries," *Dominion Dealer Solutions v. AutoAlert*, Case No. IPR2014-00684 (USPTO Patent Trial and Appeal Board), retrieved Jun. 15, 2015.
"Joint Motion to Terminate Inter Partes Review," *Dominion Dealer Solutions v. AutoAlert*, Case No. IPR2014-00684 (USPTO Patent Trial and Appeal Board), Paper 26, filed Mar. 11, 2015.
"Judgment: Termination of Proceeding," *Dominion Dealer Solutions v. AutoAlert*, Case No. IPR2014-00684 (USPTO Patent Trial and Appeal Board), Paper 28, entered Mar. 16, 2015.
"Docket Entries," *DealerSocket v. AutoAlert*, Case No. CBM2014-00132 (USPTO Patent Trial and Appeal Board), retrieved Jun. 15, 2015.
"Declaration of Dr. Jaime G. Carbonell in Support of AutoAlert, LLC's Patent Owner's Response," *DealerSocket v. AutoAlert*, Case No. CBM2014-00132 (USPTO Patent Trial and Appeal Board), Exhibit 2004, filed Dec. 29, 2014.
"Petitioner's Reply to Patent Owner's Response," *DealerSocket v. AutoAlert*, Case No. CBM2014-00132 (USPTO Patent Trial and Appeal Board), Paper 25, filed Mar. 2, 2015.
"Corrected Motion to Terminate Proceeding," *DealerSocket v. AutoAlert*, Case No. CBM2014-00132 (USPTO Patent Trial and Appeal Board), Paper 39, filed May 22, 2015.
"Judgment: Termination of Proceeding After Institution," *DealerSocket v. AutoAlert*, Case No. CBM2014-00132 (USPTO Patent Trial and Appeal Board), Paper 41, entered May 28, 2015.
"Docket Entries," *DealerSocket v. AutoAlert*, Case No. CBM2014-00139 (USPTO Patent Trial and Appeal Board), retrieved Jun. 15, 2015.
"Petitioner's Reply to Patent Owner's Response," *DealerSocket v. AutoAlert*, Case No. CBM2014-00139 (USPTO Patent Trial and Appeal Board), Paper 26, filed Feb. 23, 2015.
"Petitioner's and Patent Owner's Corrected Joint Motion to Terminate Proceeding," *DealerSocket v. AutoAlert*, Case No. CBM2014-00139 (USPTO Patent Trial and Appeal Board), Paper 40, filed May 22, 2015.
"Judgment: Termination of Proceeding After Institution," *DealerSocket v. AutoAlert*, Case No. CBM2014-00139 (USPTO Patent Trial and Appeal Board), Paper 42, entered May 28, 2015.
"Docket Entries," *DealerSocket v. AutoAlert*, Case No. CBM2014-00146 (USPTO Patent Trial and Appeal Board), retrieved Jun. 15, 2015.
"AutoAlert, LLC's Patent Owner Response," *DealerSocket v. AutoAlert*, Case No. CBM2014-00146 (USPTO Patent Trial and Appeal Board), Paper 25, filed Feb. 9, 2015.
"Declaration of Dr. Jaime G. Carbonell in Support of AutoAlert, LLC's Patent Owner Response," *DealerSocket v. AutoAlert*, Case No. CBM2014-00146 (USPTO Patent Trial and Appeal Board), Exhibit 2005, filed Feb. 9, 2015.
"Petitioner's Reply to Patent Owner's Response," *DealerSocket v. AutoAlert*, Case No. CBM2014-00146 (USPTO Patent Trial and Appeal Board), Paper 27, filed Apr. 8, 2015.
"Petitioner's and Patent Owner's Corrected Joint Motion to Terminate Proceeding," *DealerSocket v. AutoAlert*, Case No. CBM2014-00146 (USPTO Patent Trial and Appeal Board), Paper 38, filed May 22, 2015.
"Judgment: Termination of Proceeding After Institution," *DealerSocket v. AutoAlert*, Case No. CBM2014-00146 (USPTO Patent Trial and Appeal Board), Paper 40, entered May 28, 2015.
"Docket Entries," *DealerSocket v. AutoAlert*, Case No. CBM2014-00201 (USPTO Patent Trial and Appeal Board), retrieved Jun. 15, 2015.
"Institution of Covered Business Method Patent Review," *DealerSocket v. AutoAlert*, Case No. CBM2014-00201 (USPTO Patent Trial and Appeal Board), Paper 11, entered Feb. 17, 2015.
"AutoAlert, LLC's Patent Owner Response," *DealerSocket v. AutoAlert*, Case No. CBM2014-00201 (USPTO Patent Trial and Appeal Board), Paper 16, filed Apr. 13, 2015.
"Declaration of Jaime G. Carbonell in Support of AutoAlert, LLC's Patent Owner Response," *DealerSocket v. AutoAlert*, Case No. CBM2014-00201 (USPTO Patent Trial and Appeal Board), Exhibit 2004, filed Apr. 13, 2015.
"Petitioner's and Patent Owner's Corrected Joint Motion to Terminate Proceeding," *DealerSocket v. AutoAlert*, Case No. CBM2014-00201 (USPTO Patent Trial and Appeal Board), Paper 24, filed May 22, 2015.
"Judgment: Termination of Proceeding After Institution," *DealerSocket v. AutoAlert*, Case No. CBM2014-00201 (USPTO Patent Trial and Appeal Board), Paper 26, entered May 28, 2015.
"Docket Entries," *DealerSocket v. AutoAlert*, Case No. CBM2014-00202 (USPTO Patent Trial and Appeal Board), retrieved Jun. 15, 2015.
"Institution of Covered Business Method Review," *DealerSocket v. AutoAlert*, Case No. CBM2014-00202 (USPTO Patent Trial and Appeal Board), Paper 11, entered Feb. 17, 2015.
"AutoAlert, LLC's Patent Owner's Response," *DealerSocket v. AutoAlert*, Case No. CBM2014-00202 (USPTO Patent Trial and Appeal Board), Paper 16, filed Apr. 13, 2015.
"Declaration of Jaime G. Carbonell in Support of AutoAlert, LLC's Patent Owner's Response," *DealerSocket v. AutoAlert*, Case No. CBM2014-00202 (USPTO Patent Trial and Appeal Board), Exhibit 2004, filed Apr. 13, 2015.
"Petitioner's and Patent Owner's Corrected Joint Motion to Terminate Proceeding," *DealerSocket v. AutoAlert*, Case No. CBM2014-00202 (USPTO Patent Trial and Appeal Board), Paper 24, filed May 22, 2015.
"Judgment: Termination of Proceeding After Institution," *DealerSocket v. AutoAlert*, Case No. CBM2014-00202 (USPTO Patent Trial and Appeal Board), Paper 26, entered May 28, 2015.
"Docket Entries," *DealerSocket v. AutoAlert*, Case No. CBM2014-00203 (USPTO Patent Trial and Appeal Board), retrieved Jun. 15, 2015.
"Institution of Covered Business Method Review," *DealerSocket v. AutoAlert*, Case No. CBM2014-00203 (USPTO Patent Trial and Appeal Board), Paper 11, entered Apr. 2, 2015.
"Petitioner's and Patent Owner's Corrected Joint Motion to Terminate Proceeding," *DealerSocket v. AutoAlert*, Case No. CBM2014-00203 (USPTO Patent Trial and Appeal Board), Paper 19, filed May 22, 2015.
"Judgment: Termination of Proceeding After Institution," *DealerSocket v. AutoAlert*, Case No. CBM2014-00203 (USPTO Patent Trial and Appeal Board), Paper 21, entered May 28, 2015.
"Docket Report," *AutoAlert v. Dominion Dealer Solutions et al.*, Case No. 8:12-CV-01661 (U.S. District Court for the Central District of California), retrieved Jun. 15, 2015.
"Stipulated Voluntary Dismissal," *AutoAlert v. Dominion Dealer Solutions et al.*, Case No. 8:12-CV-01661 (U.S. District Court for the Central District of California), Doc. 148, filed Mar. 4, 2015.
"Order Granting Voluntary Dismissal With Prejudice," *AutoAlert v. Dominion Dealer Solutions et al.*, Case No. 8:12-CV-01661 (U.S. District Court for the Central District of California), Doc. 149, entered Mar. 6, 2015.
"Docket Report," *AutoAlert v. DealerSocket Inc.*, Case No. 8:13-CV-00657 (U.S. District Court for the Central District of California), retrieved Jun. 15, 2015.
"Stipulated Voluntary Dismissal," *AutoAlert v. DealerSocket Inc.*, Case No. 8:13-CV-0657 (U.S. District Court for the Central District of California), Doc. 199, filed May 15, 2015.
"Order of Voluntary Dismissal of Entire Action with Prejudice," *AutoAlert v. DealerSocket Inc.*, Case No. 8:13-CV-0657 (U.S. District Court for the Central District of California), Doc. 200, entered May 15, 2015.
AutoAlert Complaint for Patent Infringement and Jury Demand versus DealerSocket, Inc., Case No. SACV13-00657, Apr. 25, 2013.
AutoAlert Complaint for Patent Infringement and Jury Demand versus Dominion Dealer Solutions et al., Case No. SACV12-01661, Oct. 1, 2012 (Part I—pp. 1 to 136).

(56) References Cited

OTHER PUBLICATIONS

AutoAlert Complaint for Patent Infringement and Jury Demand versus Dominion Dealer Solutions et al., Case No. SACV12-01661, Oct. 1, 2012 (Part II—pp. 137 to 260).
AutoAlert's Answer to Dominion's Counter Claims, Feb. 27, 2013.
AutoAlert's First Amended Complaint for Patent Infringement, Apr. 23, 2013.
Declaration of Ward Hanson in Support of Petitions for Inter Partes Review, Mar. 28, 2013.
Dominion et al.'s Answer to First Amended Complaint, May 10, 2013.
Dominion's Amended Counterclaims for Declaratory Judgment, May. 10, 2013.
Dominion's Counterclaims for Declaratory Judgment, Feb. 8, 2013.
Hanson Detailed Claim Charts for '099 Patent, Mar. 28, 2013.
Hanson Detailed Claim Charts for '461 Patent, Mar. 28, 2013.
Hanson Detailed Claim Charts for '529 Patent, Mar. 28, 2013.
Hanson Detailed Claim Charts for '752 Patent, Mar. 28, 2013.
Hanson Detailed Claim Charts for '791 Patent, Mar. 28, 2013.
Joint Answer from Dominion et al., Feb. 7, 2013.
List of Documents Considered by Ward Hanson for Declaration, Mar. 28, 2013 (Part I—pp. 1 to 180).
List of Documents Considered by Ward Hanson for Declaration, Mar. 28, 2013 (Part II—pp. 181 to 329).
Petition for Inter Partes Review of '099 Patent, filed Mar. 28, 2013.
Petition for Inter Partes Review of '461 Patent, filed Mar. 28, 2013.
Petition for Inter Partes Review of '529 Patent, filed Mar. 28, 2013.
Petition for Inter Partes Review of '752 Patent, filed Mar. 28, 2013.
Petition for Inter Partes Review of '791 Patent, filed Mar. 28, 2013.
Redacted and Unfiled Petition for Inter Partes Review of U.S. Pat. No. 7,827,099 (which was issued Nov. 2, 2010), (Part I—pp. 1 to 49).
Redacted and Unfiled Petition for Inter Partes Review of U.S. Pat. No. 7,827,099 (which was issued Nov. 2, 2010), (Part II—p. 50 to 104).
Redacted and Unfiled Petition for Inter Partes Review of U.S. Pat. No. 7,827,099 (which was issued Nov. 2, 2010), unfiled as of Feb. 1, 2013.
Redacted and Unfiled Petition for Inter Partes Review of U.S. Pat. No. 8,005,752 (which was issued Aug. 23, 2011), (Part I—pp. 1 to 40).
Redacted and Unfiled Petition for Inter Partes Review of U.S. Pat. No. 8,005,752 (which was issued Aug. 23, 2011), (Part II—pp. 41 to 80).
Redacted and Unfiled Petition for Inter Partes Review of U.S. Pat. No. 8,005,752 (which was issued Aug. 23, 2011), unfiled as of Feb. 1, 2013.
Redacted and Unfiled Petition for Inter Partes Review of U.S. Pat. No. 8,086,529 (which was issued Dec. 27, 2011).
Redacted and Unfiled Petition for Inter Partes Review of U.S. Pat. No. 8,086,529 (which was issued Dec. 27, 2011), unfiled as of Feb. 1, 2013.
Redacted and Unfiled Petition for Inter Partes Review of U.S. Pat. No. 8,095,461 (which was issued Dec. 27, 2011).
Redacted and Unfiled Petition for Inter Partes Review of U.S. Pat. No. 8,095,461 (which was issued Dec. 27, 2011), unfiled as of Feb. 1, 2013.

\* cited by examiner

| Joe's Dealership, Inc. | 05/12/2003 | Alert Sheet |
|---|---|---|
| John Smith | | Demo Sales Associate |

| Client Information | | Existing Vehicle | |
|---|---|---|---|
| Alert # | 177037 | Class Description | Q-Class |
| Client | John Smith | Series Description | Q155 Wagon 4D |
| Address | 1111 First Street | Year | 2000 |
| Address 2 | | VIN | ABC345 |
| City | Big City | Deal Recap | |
| State | CA | Contract Start Date | 6/10/2000 |
| Zip | 90803 | Capitalized Cost | $53,258 |
| Phone Work | (555) 555-5959 | Residual Amount | $34,160 |
| Phone Mobile | | Contract Term | 39 |
| Phone Home | (555) 555-7878 | Base Payment | $856 |
| | | Total Payment | $922 |
| | | Payoff Amount | $37,136 |
| | | Trade-in Amount | $30,050 |
| New Vehicle | | Trade Equity | $7,086- |
| | | Security Deposit | $0 |
| Class Description | Q-Class | Balance To Maturity | |
| Series Description | Q155 Wagon 4D | Payments Made | 35 |
| Average Selling Price | $52,175 | Payments Remaining | 4 |
| Subsidy Amount | $0 | Payment History | 30 - 0, 60 - 0, 90 - 0 |
| | | Balance To Maturity | $4,039- |
| New Cap Cost | $56,214 | Preferred Equity | |
| | | Equity | $4,039- |

| Dealer Credit | | | |
|---|---|---|---|
| Contract Term | 36 | 48 | 60 |
| Residual Amount | $27,131 | $23,479 | $19,305 |
| Money Factor | 0.00275 | 0.00275 | 0.00275 |
| Capitalized Cost | $56,214 | $56,214 | $56,214 |
| Rental | $229 | $219 | $208 |
| Depreciation | $808 | $682 | $615 |
| Payment | $1,037 | $901 | $823 |
| Difference | $181 | $45 | $33- |

| Big Bank, Inc. | | | |
|---|---|---|---|
| Contract Term | 36 | 48 | 60 |
| Residual Amount | $29,740 | $26,609 | $23,479 |
| Money Factor | 0.002 | 0.002 | 0.002 |
| Capitalized Cost | $56,214 | $56,214 | $56,214 |
| Rental | $172 | $166 | $159 |
| Depreciation | $735 | $617 | $546 |
| Payment | $907 | $783 | $705 |
| Difference | $51 | $73- | $151- |

*AutoAlert*

*FIG. 1A*

| Existing Vehicle | |
|---|---|
| Class Description | Q-Class |
| Series Description | Q155 Wagon 4D |
| Year | 2000 |
| VIN | ABC345 |
| Deal Recap | |
| Contract Start Date | 6/10/2000 |
| Capitalized Cost | $53,258 |
| Residual Amount | $34,160 |
| Contract Term | 39 |
| Base Payment | $856 |
| Total Payment | $922 |
| Payoff Amount | $37,136 |
| Trade-in Amount | $30,050 |
| Trade Equity | $7,086– |
| Security Deposit | $0 |
| Balance To Maturity | |
| Payments Made | 35 |
| Payments Remaining | 4 |
| Payment History | 30 - 0, 60 - 0, 90 - 0 |
| Balance To Maturity | $4,039– |
| Preferred Equity | |
| Equity | $4,039– |

FIG. 1B

Client Information

| | |
|---|---|
| Alert # | 177037 |
| Client | John Smith |
| Address | 1111 First Street |
| Address 2 | |
| City | Big City |
| State | CA |
| Zip | 90803 |
| Phone Work | (555) 555-5959 |
| Phone Mobile | |
| Phone Home | (555) 555-7878 |

New Vehicle

| | |
|---|---|
| Class Description | Q-Class |
| Series Description | Q155 Wagon 4D |
| Average Selling Price | $52,175 |
| Subsidy Amount | $0 |
| New Cap Cost | $56,214 |

*FIG. 1C*

| Dealer Credit | | | |
|---|---|---|---|
| Contract Term | 36 | 48 | 60 |
| Residual Amount | $27,131 | $23,479 | $19,305 |
| Money Factor | 0.00275 | 0.00275 | 0.00275 |
| Capitalized Cost | $56,214 | $56,214 | $56,214 |
| Rental | $229 | $219 | $208 |
| Depreciation | $808 | $682 | $615 |
| Payment | $1,037 | $901 | $823 |
| Difference | $181 | $45 | $33- |
| Big Bank, Inc. | | | |
| Contract Term | 36 | 48 | 60 |
| Residual Amount | $29,740 | $26,609 | $23,479 |
| Money Factor | 0.002 | 0.002 | 0.002 |
| Capitalized Cost | $56,214 | $56,214 | $56,214 |
| Rental | $172 | $166 | $159 |
| Depreciation | $735 | $617 | $546 |
| Payment | $907 | $783 | $705 |
| Difference | $51 | $73- | $151- |

*FIG. 1D*

11/17/2003 Alert — Manager Lease

Jeff Cotton

Existing Vehicle
| | |
|---|---|
| Class Description | V-Class |
| Series Description | V123 Coupe 2D |
| Year | 2002 |
| VIN | WDBRN12345J02A |

Deal Recap
| | |
|---|---|
| Contract Start | 8/18/2001 |
| Contract End | 8/18/2004 |
| Capitalized Cost | $33,133 |
| Residual Amount | $20,303 |
| Contract Term | 36 |
| Base Payment | $527 |
| Monthly Payment | $568 |
| | |
| Payoff Amount | $23,565 |
| Payoff Good Through | 11/27/2003 |
| Trade-in Amount | $16,580 |
| Trade Equity | ($6,985) |
| Security Deposit | $6,000 |

Balance To Maturity
| | |
|---|---|
| Payments Made | 28 |
| Payments Remaining | 8 |
| Payment History | 30 - 0, 60 - 0, 90 - 0 |
| Balance To Maturity | ($4,896) |

Joe's Dealership, Inc.

MARY DOE — *124*

*122*

Client Information

| | |
|---|---|
| Alert # | 180082 |
| Client | MARY DOE |
| Address | 1234 MAIN ST |
| Address 2 | |
| City | BIG CITY |
| State | CA |
| Zip | 90248 |
| Phone Work | (555) 555-9809 |
| Phone Mobile | |
| Phone Home | (555) 555-4321 |

New Vehicle — *126*

| | |
|---|---|
| Class Description | V-Class |
| Series Description | V123 Coupe 2D |
| Year | 2003 |
| Average Selling Price | $28,865 |
| Trade Equity | ($4,896) |
| Subsidy Amount | $3,000 |
| Capitalized Cost | $30,761 |
| Sales Tax 7.75% | $2,384 |
| Amount Financed | $33,145 |

Lease Payment

CAPITALIZED COST CALCULATION

| | | | |
|---|---|---|---|
| 1 | Agreed upon value of the vehicle | | $ |
| 2 | Sales/Use Tax (if capitalized) | + | $ |
| 3 | Luxury Tax (calculation A) | + | $ |
| 4 | Other (explain) | + | $ |
| 5 | Prior credit or lease balance (negative equity) | + | $ |
| 6 | Subtotal | = | $ |
| 7 | Acquisition fee (if capitalized) | + | $ |
| 8 | Scheduled Maintenance Cost | + | $ |
| 9 | Additional Wear & Usage | + | $ |
| 10 | Other (explain) | + | $ |
| 11 | Gross Capitalized Cost | = | $ |
| 12 | Gross Capitalized Cost Reduction Trade $ \_\_\_\_ Cash $ \_\_\_\_ | − | $ |
| 13 | Adjusted Capitalized Cost | | $ |

LEASE PAYMENT CALCULATION

| | | | |
|---|---|---|---|
| 14 | Residual Value (calculation C) | | $ |
| 15 | Depreciation (lines 13−14) | | $ |
| 16 | Money Factor | | .0 |
| 17 | Add Lines 13+14 | | $ |
| 18 | Rent Charge (lines 16x17) x Term | | $ |
| 19 | Total Base Single Payment (lines 15+18) | | $ |
| 20 | Base Monthly Payment/Base Single Pymnt (19/# of payments) | | $ |
| 21 | Sales/Use Tax \_\_\_\_ % x line 20 | | $ |
| 22 | Total Monthly Payment (or total single payment) | | $ |

B. Residual Value Calculation

| | | |
|---|---|---|
| TSRP | | \_\_\_\_ |
| Residualized Options | + | \_\_\_\_ |
| Subtotal | = | \_\_\_\_ |
| Gas Guzzler Tax | − | \_\_\_\_ |
| Basis for Residual Value | = | \_\_\_\_ |
| Residual Value % | X | \_\_\_\_ % |
| Residual Value | = | \_\_\_\_ |
| Prepaid Mileage (15¢ per mile) | − | \_\_\_\_ |
| Adjusted Residual Value (line 14) | = | \_\_\_\_ |

Deferred Payment $$A = ((P*(1+i)^n - B)*i)/((1+i)^{n-1})$$

A=Payment
P=Principle
i=Interest rate
B=Differed Amount or Balloon

*FIG. 1I*

Purchase Payment $$A = p + i/n$$

A=Payment
P=Principle
i=Interest amount
n=number

JANE M. CLIENT

Description: Jane M. Client, 1998 Y123 Coupe
Owner: Demo Sales Associate
Stage: Appointment
Priority: Normal
Status: Call - Left Message

- Call - Left Message
- Call - Left Message on Machine
- Call - Left Message with Person
- Call - Left Message at Home
- Call - Left Message at Work
- Call - No Answer
- Call - Not Available
- Call - Bad Phone #'s
- Call - Follow-up Call
- Call - Return Call
- Call - Not Interested
- Call - Waiting for Specific Car
- Call - Waiting for Bank Approval
- Call - Credit Declined
- Call - Deposit Taken
- Call - Already Sold/Placed Deposit
- Call - Bought an Extra Car
- Call - Out of State
- Call - Turn Over
- Call - Email Sent
- Call - Email Received
- Call - Promoted to Appointment
- Call - Promoted to Sold
- Call - Client Wants to Return Vehicle
- Appointment - Waiting for Meeting
- Appointment - Kept
- Appointment - Missed
- Appointment - Rescheduled
- Appointment - Bought an Extra Car
- Appointment - Promoted to Sold

500

601

...ing to an end may wait for new model Wagon
"03/19/2003" changed to ""
Progress" changed to "Left Message"
...lated
...lated
...lated
...lated
...lated
to call
Date "03/20/2003" changed to "03/19/2003"
t Started" changed to "In Progress"
...lated
...lated
...rated

JANE M. CLIENT

| Description | Jane M. Client, 1998 V123 Coupe | | |
|---|---|---|---|
| Owner | Jeff Cotton | | |
| Stage | Sold | | |
| Priority | Normal | | |
| Status | New - Not Started | | |
| Date & Time | | Calendar | |
| Remark | | | |
| | Save | | |
| History | 10/06/2003 12:30AM house | Alert Calculated | View Print |
| | 09/29/2003 12:30AM house | Alert Calculated | View Print |
| | 09/22/2003 12:30AM house | Alert Calculated | View Print |
| | 09/15/2003 12:30AM house | Deal Calculated | View Print |
| | 09/10/2003 3:19AM house | Deal Calculated | View Print |
| | 09/01/2003 1:00AM house | Deal Calculated | View Print |
| | 08/25/2003 1:00AM house | Deal Calculated | View Print |
| | 08/18/2003 1:00AM house | Deal Calculated | View Print |
| | 08/11/2003 1:00AM house | Deal Calculated | View Print |
| | 08/04/2003 1:00AM house | Deal Calculated | |

| | Mercedes-Benz Credit | | |
|---|---|---|---|
| Contract Term | 36 | 48 | 60 |
| Residual Amount | $27,131 | $23,479 | $19,305 |
| Money Factor | 0.00275 | 0.00275 | 0.00275 |
| Capitalized Cost | $56,214 | $56,214 | $56,214 |
| Rental | $229 | $219 | $208 |
| Depreciation | $808 | $682 | $615 |
| Payment | $1,037 | $901 | $823 |
| Difference | $181 | $45 | $93– |

| | Chase | | |
|---|---|---|---|
| Contract Term | 36 | 48 | 60 |
| Residual Amount | $29,740 | $26,609 | $23,479 |
| Money Factor | 0.002 | 0.002 | 0.002 |
| Capitalized Cost | $56,214 | $56,214 | $56,214 |
| Rental | $172 | $166 | $159 |
| Depreciation | $735 | $617 | $546 |
| Payment | $907 | $783 | $705 |
| Difference | $51 | $73– | $161– |

902

*AutoAlert*

| Joe's Dealership, Inc. | | 05/12/2003 | Alert | Associate Sheet |
|---|---|---|---|---|
| JOHN CLIENT | | | Jeff Cotton | |
| Alert # | 177443 | | | |
| Client Information | | | | |
| Client | JOHN CLIENT | | | |
| Address | 1234 55TH ST | | | |
| Address 2 | | | | |
| City | BIG CITY | | | |
| State | CA | | | |
| Zip | 92882 | | | |
| PhoneWork | (555) 555-9087 | | | |
| PhoneMobile | | | | |
| PhoneHome | (555) 555-4353 | | | |
| EmailAddress | | | | |
| Existing Vehicle | | | | |
| Class | Q-Class | | | |
| Series | QL459 Sport Sedan | | | |
| Year | 2000 | | | |
| VIN | JKL999999 | | | |
| Contract Detail | | | | |
| Contract Term | 48 | | | |
| Payments Remaining | 16 | | | |
| Payment History | 30 - 0, 60 - 0, 90 - 0 | | | |
| Total Payment | $607 | | | |
| Balance To Maturity | ($10,060) | | | |
| New Vehicle | | | | |
| Class | Q-Class | | | |
| Series | QL459 Sport Sedan | | | |
| Follow-up Detail | | | | |

Assigned to: [          ]

|  | Yes | No | Comments |
|---|---|---|---|
| Call: | ☐ | ☐ | _____ |
| Appointment: | ☐ | ☐ | _____ |
| Sold: | ☐ | ☐ | _____ |

*FIG. 10*

JANE M. CLIENT

| | |
|---|---|
| Description | Jane M. Client, 1998 V123 Coupe |
| Owner | Jeff Cotton |
| Stage | Sold |
| Priority | Normal |
| Status | New - Not Started |
| Date & Time | [Calendar] |
| Remark | |

[Save]

| History | | | | |
|---|---|---|---|---|
| | 10/06/2003 | 12:30AM house | Alert Calculated | View Print |
| | 09/29/2003 | 12:30AM house | Alert Calculated | View Print |
| | 09/22/2003 | 12:30AM house | Alert Calculated | View Print |
| | 09/15/2003 | 12:30AM house | Deal Calculated | View Print |
| | 09/10/2003 | 3:19AM house | Deal Calculated | View Print |
| | 09/01/2003 | 1:00AM house | Deal Calculated | View Print |
| | 08/25/2003 | 1:00AM house | Deal Calculated | View Print |
| | 08/18/2003 | 1:00AM house | Deal Calculated | View Print |
| | 08/11/2003 | 1:00AM house | Deal Calculated | View Print |
| | 08/04/2003 | 1:00AM house | Deal Calculated | View Print |

Joe's Dealership, Inc.
AutoAlert
Average Selling Price by Series
Wednesday, July 30, 2003 7:42:54 PM

| Series ID | Series Description | Average Selling Price | Base Price | Delivery Charge | Sunroof Package | Automatic Transmission | Metallic Paint |
|---|---|---|---|---|---|---|---|
| 47 | Q111 Sedan | $28,865 | $24,950 | $720 | $1,215 | $1,325 | $655 |
| 1 | Q111 Coupe | $32,290 | $27,990 | $720 | $1,600 | $1,325 | $655 |
| 26 | Q551 Coupe | $33,700 | $29,400 | $720 | $1,600 | $1,325 | $655 |
| 976 | Q551 Sedan | $35,575 | $31,400 | $720 | $1,475 | $1,325 | $655 |
| 52 | QL459 Sport Sedan | $51,775 | $50,400 | $720 | - | - | $655 |

Joe's Dealership, Inc.
AutoAlert
Bank Rate by Series
Wednesday, July 30, 2003 7:45:13 PM Bank: Big Bank

2002

| Bank Rate ID | Series ID | Series | Term ID | Term | Money Factor | Residual % | MRM |
|---|---|---|---|---|---|---|---|
| 404 | 47 | Q111 Sedan | 2 | 36 | 0.00240 | 47 | $36,500 |
| 405 | | | 5 | 48 | 0.00240 | 40 | $36,500 |
| 406 | | | 8 | 60 | 0.00240 | 34 | $36,500 |
| 407 | 1 | Q111 Coupe | 2 | 36 | 0.00240 | 56 | $40,800 |
| 408 | | | 5 | 48 | 0.00240 | 47 | $40,800 |
| 409 | | | 8 | 60 | 0.00240 | 40 | $40,800 |
| 410 | 26 | Q551 Coupe | 2 | 36 | 0.00240 | 53 | $42,500 |
| 411 | | | 5 | 48 | 0.00240 | 45 | $42,500 |
| 412 | | | 8 | 60 | 0.00240 | 38 | $42,500 |
| 413 | 976 | Q551 Sedan | 2 | 36 | 0.00240 | 51 | $41,300 |
| 414 | | | 5 | 48 | 0.00240 | 43 | $41,300 |
| 415 | | | 8 | 60 | 0.00240 | 37 | $41,300 |
| 416 | 52 | QL459 Sport Sedan | 2 | 36 | 0.00240 | 59 | $57,900 |
| 417 | | | 5 | 48 | 0.00240 | 50 | $57,900 |
| 418 | | | 8 | 60 | 0.00240 | 44 | $57,900 |

Joe's Dealership, Inc.
AutoAlert
Contact Mailing List by Sales Associate
Wednesday, July 30, 2003 7:50:50 PM Category: Alert, Lease E
Stage: New, Call, Appointment, Sold, Mc

| First Name | Middle Name | Last Name | Address | Address 2 | City | State | Zip |
|---|---|---|---|---|---|---|---|
| Jeff | | Customer | 1111 22nd ST | | Smallville | CA | 92715 |
| Jennifer | | Brown | 3333 44th ST | | Big City | CA | 92630- |
| John | | Buyer | 2222 11th ST | | Smallville ST | CA | 92630- |
| Joseph | | Sales | 4444 55th AVE | | Big City | CA | 92606- |

Joe's Dealership, Inc.
AutoAlert
Sales Associate
Wednesday, July 30, 2003 7:52:26 PM

2402

| Associate ID | Sales Associate | User Name | Password | Email Address |
|---|---|---|---|---|
| 926 | Jeff Cotton | jcott | 12345 | |
| 149 | Jennifer Johnson | jjohnson | 54231 | |
| 169 | John Williams | jwill | abcde | |

Joe's Dealership, Inc.
AutoAlert
Trade-in History by Model
Wednesday, July 30, 2003 7:55:02 PM

| VIN | Series | Year | 7/25/2003 Trade-in | Adjust | % | 7/18/2003 Trade-in | Adjust | % | 7/11/2003 Trade-in | Adjust | % |
|---|---|---|---|---|---|---|---|---|---|---|---|
| LMNO654 | Q111 Sedan | 1993 | $4,296 | - | 6.4% | $4,038 | - | 0.0% | $4,038 | - | 100.0% |
| ABCDE987 | Q111 Coupe | 1995 | $10,828 | ($1,000) | -21.7% | $13,825 | ($1,000) | 0.0% | $13,825 | ($1,000) | 100.0% |
| ZYX12345 | Q551 Coupe | 1994 | $11,365 | - | 28.1% | $8,875 | - | 0.0% | $8,875 | - | 100.0% |
| 23FGHI34 | Q551 Sedan | 1993 | $7,294 | - | -2.7% | $7,494 | - | 0.0% | $7,494 | - | 100.0% |
| WDBJF20F V | Q111 Sedan | 1997 | $17,330 | - | -1.1% | $17,521 | - | 0.0% | $17,521 | - | 100.0% |
| STR45XYZ | Q111 Coupe | 1993 | $5,447 | - | 9.6% | $4,970 | - | 0.0% | $4,970 | - | 100.0% |
| ZYX12390 | Q551 Coupe | 1995 | $9,902 | - | -2.0% | $10,100 | - | 0.0% | $10,100 | - | 100.0% |
| IJKLM987 | Q551 Sedan | 1994 | $8,231 | - | -8.0% | $8,948 | - | 0.0% | $8,948 | - | 100.0% |
| GHI897 | QL459 Sport Sedan | 1993 | $6,887 | - | -29.5% | $9,770 | - | 0.0% | $9,770 | - | 100.0% |

Joe's Dealership, Inc.
AutoAlert
Bank Rate
Monday, November 17, 2003 3:38:33 PM

Bank: Big Bank
Bank Region: California/Florida
Sale Type: Lease
Model Year: 2004

| Series ID | Series | Term | Money Factor | Residual % | Effective Date |
|---|---|---|---|---|---|
| 47 | Q111 Sedan | 36 | 0.00235 | 47 | 10/01/2003 |
|  |  | 48 | 0.00235 | 41 | 10/01/2003 |
|  |  | 60 | 0.00235 | 35 | 10/01/2003 |
| 1 | Q111 Coupe | 36 | 0.00235 | 59 | 10/01/2003 |
|  |  | 48 | 0.00235 | 50 | 10/01/2003 |
|  |  | 60 | 0.00235 | 43 | 10/01/2003 |
| 26 | Q551 Coupe | 36 | 0.00235 | 56 | 10/01/2003 |
|  |  | 48 | 0.00235 | 48 | 10/01/2003 |
|  |  | 60 | 0.00235 | 41 | 10/01/2003 |
| 976 | Q551 Sedan | 36 | 0.00235 | 53 | 10/01/2003 |
|  |  | 48 | 0.00235 | 45 | 10/01/2003 |
|  |  | 60 | 0.00235 | 39 | 10/01/2003 |

FIG. 31

| Joe's Dealership, Inc. AutoAlert Associate Performance (Stage) Monday, November 17, 2003 3:55:02 PM | | | | | | |
|---|---|---|---|---|---|---|
| Associate/Month | New | Call | Apt | Sold | No Sale | Total |
| Joe's Dealership, Inc. | 4090 | 652 | 257 | 103 | 67 | 5169 |
| January | 0 | 0 | 0 | 0 | 0 | 0 |
| February | 0 | 0 | 0 | 0 | 0 | 0 |
| March | 3699 | 3 | 20 | 10 | 0 | 3732 |
| April | 1 | 1 | 60 | 18 | 0 | 80 |
| May | 197 | 42 | 56 | 30 | 25 | 350 |
| June | 31 | 15 | 33 | 7 | 4 | 90 |
| July | 19 | 58 | 9 | 3 | 5 | 94 |
| August | 15 | 95 | 23 | 6 | 13 | 152 |
| September | 80 | 113 | 17 | 7 | 3 | 220 |
| October | 33 | 242 | 30 | 18 | 13 | 336 |
| November | 15 | 83 | 9 | 4 | 4 | 115 |
| December | 0 | 0 | 0 | 0 | 0 | 0 |
| House | 2371 | 36 | 86 | 5 | 7 | 2505 |
| January | 0 | 0 | 0 | 0 | 0 | 0 |
| February | 0 | 0 | 0 | 0 | 0 | 0 |
| March | 2107 | 0 | 1 | 1 | 0 | 2109 |
| April | 1 | 0 | 23 | 0 | 0 | 24 |
| May | 136 | 22 | 37 | 3 | 1 | 199 |
| June | 22 | 2 | 22 | 0 | 0 | 46 |
| July | 12 | 0 | 1 | 0 | 1 | 14 |
| August | 12 | 0 | 0 | 0 | 0 | 12 |
| September | 51 | 0 | 0 | 0 | 0 | 51 |
| October | 20 | 12 | 2 | 1 | 5 | 40 |
| November | 10 | 0 | 0 | 0 | 0 | 10 |
| December | 0 | 0 | 0 | 0 | 0 | 0 |
| Jeff Cotton | 2 | 0 | 0 | 1 | 0 | 3 |
| January | 0 | 0 | 0 | 0 | 0 | 0 |
| February | 0 | 0 | 0 | 0 | 0 | 0 |
| March | 1 | 0 | 0 | 0 | 0 | 1 |
| April | 0 | 0 | 0 | 1 | 0 | 1 |
| May | 0 | 0 | 0 | 0 | 0 | 0 |
| June | 0 | 0 | 0 | 0 | 0 | 0 |
| July | 0 | 0 | 0 | 0 | 0 | 0 |
| August | 0 | 0 | 0 | 0 | 0 | 0 |
| September | 1 | 0 | 0 | 0 | 0 | 1 |
| October | 0 | 0 | 0 | 0 | 0 | 0 |

FIG. 33

| Joe's Dealership, Inc. | | 11/03/2003 | Manager Lease |
|---|---|---|---|
| JOSEPH JOHNSON | | | Jeff Cotton |
| Client Information | | Existing Vehicle | |
| Alert # | 181742 | Class Description | Q-Class |
| Client | JOSEPH JOHNSON | Series Description | Q155 Wagon |
| Address | 9999 1ST AVE | Year | 1996 |
| Address 2 | | VIN | 1234QRS1111 |
| City | BIG CITY | Deal Recap | |
| State | CA | Contract Start | 2/12/2002 |
| Zip | 99999 | Contract End | 2/12/2006 |
| Phone Work | (555) 555-0909 | Capitalized Cost | $25,862 |
| Phone Mobile | (555) 555-4321 | Residual Amount | $12,690 |
| Phone Home | | Contract Term | 48 |
| New Vehicle | | Base Payment | $448 |
| Class Description | Q-Class | Monthly Payment | $483 |
| Series Description | Q155 Wagon | | |
| Year | 2003 | Payoff Amount | $21,501 |
| | | Payoff Good Through | 11/13/2003 |
| Average Selling Price | $49,875 | Trade-in Amount | $11,277 |
| Trade Equity | ($10,224) | Trade Equity | ($10,224) |
| Subsidy Amount | $2,000 | Security Deposit | $0 |
| Capitalized Cost | $58,099 | Balance To Maturity | |
| Sales Tax 7.75% | $4,503 | Payments Made | 22 |
| Amount Financed | $62,602 | Payments Remaining | 26 |
| | | Payment History | 30 - 0, 60 - 0, 90 - 0 |
| | | Balance To Maturity | ($12,900) |

| DEALERSHIP CREDIT | | | |
|---|---|---|---|
| Contract Term | 36 | 48 | 60 |
| Lease | | | |
| Residual Amount | $29,925 | $25,935 | $22,444 |
| Capitalized Cost | $58,099 | $58,099 | $58,099 |
| Money Factor | 0.0029 | 0.0029 | 0.0036 |
| Payment | $1,038 | $914 | $884 |
| Difference | $590 | $466 | $436 |
| Balloon | | | |
| Deferred Payment | $37,561 | $32,553 | $28,171 |
| Amount Financed | $62,602 | $62,602 | $62,602 |
| Interest Rate | 7.04% | 7.04% | 7.04% |
| Payment | $994 | $911 | $848 |
| Difference | $511 | $428 | $365 |
| Retail | | | |
| Amount Financed | $62,602 | $62,602 | $62,602 |
| Interest Rate | 3.05% | 3.05% | 3.05% |
| Payment | $1,822 | $1,387 | $1,126 |
| Difference | $1,339 | $904 | $644 |

| BIG BANK, INC. | | | |
|---|---|---|---|
| Contract Term | 36 | 48 | 60 |
| Lease | | | |
| Residual Amount | $26,933 | $23,441 | $19,950 |
| Capitalized Cost | $58,099 | $58,099 | $58,099 |
| Money Factor | 0.00235 | 0.00235 | 0.00235 |
| Payment | $1,066 | $914 | $819 |
| Difference | $618 | $466 | $371 |
| Balloon | | | |
| Deferred Payment | $33,805 | $29,423 | $29,423 |
| Amount Financed | $62,602 | $62,602 | $62,602 |
| Interest Rate | 7.24% | 7.24% | 7.24% |
| Payment | $1,096 | $976 | $838 |
| Difference | $614 | $493 | $356 |
| Retail | | | |
| Amount Financed | $62,602 | $62,602 | $62,602 |
| Interest Rate | 4.24% | 4.24% | 4.24% |
| Payment | $1,855 | $1,420 | $1,160 |
| Difference | $1,372 | $938 | $677 |

GENERATING CUSTOMER-SPECIFIC VEHICLE PROPOSALS FOR POTENTIAL VEHICLE CUSTOMERS

REFERENCE TO RELATED APPLICATIONS

This application is a continuation of U.S. patent application Ser. No. 14/506,550, filed Oct. 3, 2014, which is a continuation of U.S. patent application Ser. No. 13/789,510, filed Mar. 7, 2013, which is a continuation of U.S. patent application Ser. No. 13/299,293, filed Nov. 17, 2011, now U.S. Pat. No. 8,396,791, which is a continuation of U.S. patent application Ser. No. 13/076,203, filed Mar. 30, 2011, now U.S. Pat. No. 8,095,461, which is a continuation of U.S. patent application Ser. No. 12/911,552, filed Oct. 25, 2010, now U.S. Pat. No. 8,005,752, which is a continuation of U.S. patent application Ser. No. 10/996,122, filed Nov. 23, 2004, now U.S. Pat. No. 7,827,099, which claims priority to U.S. Provisional Patent Application No. 60/525,233, which was filed Nov. 25, 2003. The entire disclosures of each of the foregoing applications are hereby made part of this specification as if set forth fully herein and incorporated by reference for all purposes, for all that each contain.

BACKGROUND

Field

Embodiments of the system and method described herein relate to alerting dealers when favorable financial terms are available to customers.

Description of Related Art

Rather than paying cash for a product, a person may enter a financial agreement (e.g., a purchase agreement, a lease agreement, deferred or balloon payment agreement, or the like) in which the person makes a series of payments for a specified term. Often, these payments are periodic, such as weekly, monthly, quarterly, yearly, or the like. For example, if a person purchases an automobile, the person may expect to pay a series of substantially similar monthly payments for one or more years.

During the term of the financial agreement (the "current agreement") covering the first product ("the current product"), a person may desire to use a second product (a "replacement product") in lieu of the current product. In such an instance, to obtain the replacement product, a person may be willing to return the current product and enter a second financial agreement (a "replacement agreement") that satisfies the first financial agreement. For example, a person having two years of payments remaining on his automobile lease may be willing to return the automobile to a dealership and enter a new lease for a latest model. The replacement agreement may be any suitable type of financial agreement (e.g., a purchase contract, a lease, deferred payment, or the like), including the same type as the current agreement or a different type. In some instances, a person will agree to enter a replacement agreement if the replacement product and payments are acceptable. For example, a person may find the replacement product and the payments under the terms of the replacement agreement acceptable if they are sufficiently similar to the current product and payments under the current agreement.

If a seller of products, such as an automobile dealership, knows when a customer is able to enter into a new financial arrangement under terms favorable to the customer, the seller can take advantage of this knowledge by offering a deal to the customer that includes the favorable terms. Accordingly, such knowledge, if possessed by the dealer, can drive increased sales. Nevertheless, no system or method has existed for alerting a seller when a customer is able to enter a new financial arrangement under terms favorable to the customer.

SUMMARY

Embodiments of the system and method described herein systematically generate and send alerts to dealers when customers are able to enter new financial arrangements under terms favorable to the customer. Advantageously, the knowledge that embodiments of the system and method make available to dealers can significantly increase the dealers' sales.

In one embodiment, a financial terms alert generation system comprises an information retrieval module, a financial terms comparison module, and an alert transmission module. The information retrieval module is configured to retrieve financing information, customer information, and product information from one or more sources accessible on a network. Such information can be retrieved, for example, from websites located on the World Wide Web. The financial terms comparison module is configured to compare a customer's current financial arrangement to a potential new financial arrangement to determine whether the customer is able to enter into a new financial arrangement on terms favorable to the customer. In one embodiment, the financial terms comparison module performed at least one calculation based on the retrieved information in order to make this comparison. The alert transmission module is configured to transmit an alert to a dealer in cases in which the financial terms comparison module determines that a customer is able to enter into a new financial arrangement on terms favorable to the customer. Such alerts identify to the dealer the customer that is able to enter into a new financial arrangement on terms favorable to the customer and identify to the dealer the terms of the new financial arrangement.

Embodiments of the system disclosed herein perform a number of processes for alerting a dealer when a customer can enter into a new financial arrangement with terms favorable to the customer. For example, one such process includes (1) retrieving financing, customer, and product information, (2) comparing, for each of a plurality of customers, the customer's current financial terms for a financial arrangement related to a first product currently owned or leased by the customer with potential financial terms related to a second product comparable to the first product that would be available to the customer under a new financial arrangement in order to determine whether the new financial arrangement has terms favorable to the customer, (3) generating, for each customer for which the comparing shows that the new financial arrangement has terms favorable to the customer, an alert comprising information identifying the customer and indicating the terms favorable to the customer under the new arrangement, and (4) transmitting the alerts to at least one dealer.

Another process that can be performed by an embodiment of the system includes (1) receiving a modified financial variable, (2) comparing, for each of a plurality of customers, the customer's current financial terms for a financial arrangement related to a first product currently owned or leased by the customer with potential financial terms related to a second product comparable to the first product that would be available to the customer under a new financial arrangement, taking into account the modified financial variable, in order to determine whether the new financial arrangement has terms favorable to the customer, (3) generating, for each customer for which the comparing shows that the new financial arrangement has terms favorable to the customer, an alert comprising information identifying the customer and indicating the terms favorable to the customer under the new arrangement, and (4) transmitting the alerts to at least one dealer.

Advantageously, by performing the foregoing process, embodiments of the system are able to determine how changed financial variables affect whether customers can enter new financial arrangements with favorable terms. For example, this process can be used to generate alerts when a new financial incentive, such as a manufacturer rebate or a dealership incentive, allows customers to enter new financial arrangements with favorable terms.

Advantageously, embodiments of the system are able to generate alerts related to a particular customer in real-time. This advantageous capability can be used to generate an alert when a customer enters a dealership, such as when a customer has taken his car to a dealership for service. Advantageously, in this embodiment, the alerts are generated in real-time, such that if favorable financial terms are available to the customer, the dealer can attempt to sell a new product to the customer while the customer is still at the dealership. Accordingly, this embodiment can be used to drive increased sales. In accordance with the foregoing embodiment, the system performs a process including (1) receiving an identification of a customer, (2) retrieving, in real-time, financial information regarding a current financial arrangement of the customer identified by the identification, wherein the current financial arrangement relates to a first product currently owned or leased by the identified customer, (3) comparing current financial terms of the current financial arrangement with potential financial terms related to a second product comparable to the first product that would be available to the identified customer under a new financial arrangement in order to determine whether the new financial arrangement has terms favorable to the identified customer, (4) generating an alert comprising information identifying terms favorable to the identified customer under the new financial arrangement if the comparing shows that the new financial arrangement has terms favorable to the identified customer, and (5) transmitting the alert in real-time to at least one dealer.

Accordingly, the foregoing embodiments timely alert dealers regarding opportunities to sell new products to customers by identifying circumstances under which a customer can enter a new financial arrangement with terms favorable to the customer. This and other advantages of the foregoing embodiments will be apparent to a skilled artisan in light of this disclosure.

BRIEF DESCRIPTION OF THE DRAWINGS

FIGS. 1A-1G illustrate an example deal sheet generated by one embodiment of a financial terms alert generation system.

FIGS. 1H-1J illustrate formulae for calculating certain terms of financial arrangements, as used by one embodiment of a financial terms alert generation system.

FIGS. 1K-8 are example screen shots illustrating functionality of various embodiments of a financial terms alert generation system.

FIGS. 9 and 10 illustrate an example deal sheet generated by one embodiment of a financial terms alert generation system.

FIGS. 11-33 are example screen shots illustrating functionality of various embodiments of a financial terms alert generation system.

FIG. 35 illustrates an example deal sheet generated by one embodiment of a financial terms alert generation system.

FIG. 40 is an example screen shot that illustrates a class selection feature of one embodiment of a financial terms alert generation system.

DETAILED DESCRIPTION

Figure 1G:
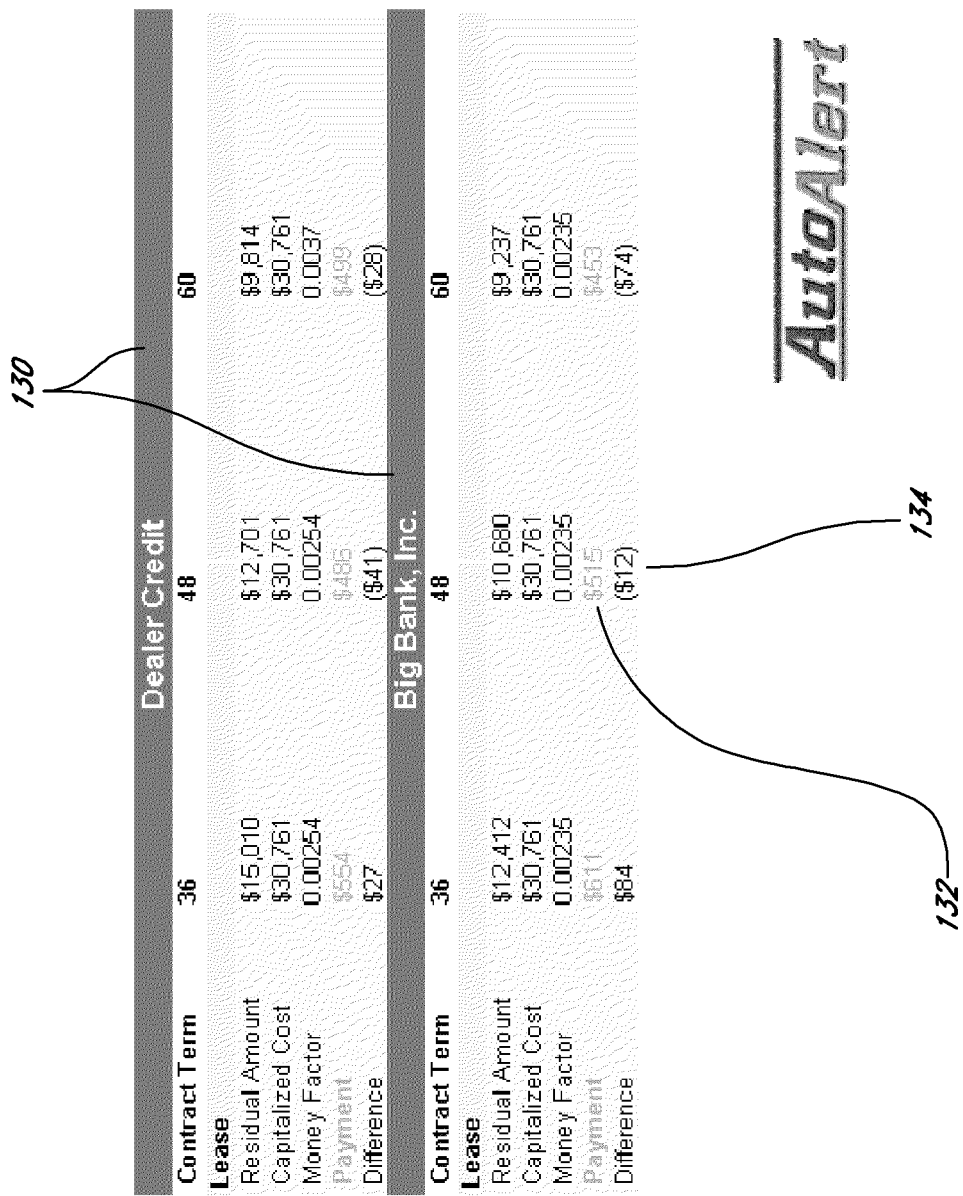

Embodiments of the system described herein may be used to assess the desirability of a new financial arrangement such as a replacement agreement. For example, in response to a customer's inquiry, a salesperson may use certain embodiments of the system to generate a deal sheet to determine whether replacement product and payments are acceptable to the client. In another example, certain embodiments of the system may generate notifications or alerts, which may advantageously indicate a potential replacement agreement satisfies certain parameters that indicate that the potential replacement agreement has terms favorable to the customer. Using these alerts, a person (such as a salesperson) may proactively contact a customer to offer the potential replacement agreement. To help manage client-contact-related tasks, certain embodiments may advantageously include contact management features.

Details regarding several illustrative preferred embodiments for implementing the system and method described herein are described below with reference to the figures. At times, features of certain embodiments are described below in accordance with that which will be understood or appreciated by a person of ordinary skill in the art to which the system and method described herein pertain. For conciseness and readability, such a "person of ordinary skill in the art" is often referred to as a "skilled artisan."

It will be apparent to a skilled artisan, in light of this disclosure, that the system and method described herein can advantageously be implemented using computer software, hardware, firmware, or any combination of software, hardware, and firmware. In one embodiment, the system is implemented as a number of software modules that comprise computer executable code for performing the functions described herein. In one embodiment, the computer-executable code is executed on one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

It will also be apparent to a skilled artisan, in light of this disclosure, that the modules described herein can be combined or divided. For example, a skilled artisan will appreciate, in light of this disclosure, that any two or more modules can be combined into one module. Thus, referring to FIG. 39, the information retrieval module 3930 and the financial terms comparison module 3935 can be combined into a single module that performs the functions of both modules. Conversely, any one module can be divided into multiple modules. For example, the information retrieval module 3930 can be divided into multiple modules such that each individual module performs part of the functions of the information retrieval module 3930 and all of the modules collectively perform all such functions.

Similarly, a number of databases are described herein. A skilled artisan will appreciate, in light of this disclosure, that any two or more databases can be combined into one database and that any one database can be divided into multiple databases.

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices.

The foregoing and other variations understood by a skilled artisan can be made to the embodiments described herein without departing from the invention. With the understanding therefore, that the described embodiments are illustrative and that the invention is not limited to the described embodiments, certain embodiments are described below with reference to the drawings.

FIG. 1A illustrates an embodiment of a deal sheet 102, which may advantageously include a description of a client's current agreement (FIG. 1B), the client's contact information and a description of the replacement product (FIG. 1C), and a comparison between the client's current agreement and one or more replacement agreements (FIG. 1D). Any suitable number of replacement agreements may be displayed, including but not limited to one, two, three, four, five, six, or more replacement agreements. Any suitable number of lenders for replacement agreements may be displayed, including but not limited to one, two, or more lenders. The replacement agreements may be for any suitable term, including but not limited to 36 months, 48 months, 60 months, or any other period. As illustrated, a replacement agreement's payment is advantageously shown along with the difference between the client's current financial agreement's payment and the replacement agreement's payment. Thus, using the deal sheet, a salesperson may advantageously review a plurality of replacement agreements from a plurality of lenders.

FIGS. 1E, 1F, and 1G illustrate portions of an embodiment of a deal sheet. As illustrated in FIG. 1E, the text 104 indicates that the deal sheet is associated with an alert. Text 106 advantageously identifies information about the deal sheet. As illustrated, text 106 illustrates that it is a manager-level view of a lease. In one embodiment, varying levels of detail from the detail sheet are shown to different persons accessing the system. Accordingly, the system may be advantageously used to customize varying views for the persons accessing the system to an appropriate level of detail. For example, a salesperson may need less detail than a manager. In one embodiment, the system determines the identity, the employment position, or both to ascertain the level of detail to display to a user of the system. Although a lease is illustrated, the information displayed may be use for other agreements, such as a purchase agreement. Text 108 may indicate that the alert is associated with a particular person (e.g., a salesperson) or a group of persons (e.g., a "house account" for some or all salespersons).

As illustrated in FIG. 1E, section 110 of the deal sheet includes information about the current product. The information about the current product may include any suitable information, including but not limited to a product identifier that preferably uniquely identifies the product (e.g., a vehicle identification number or VIN or the like), a class identifier identifying a group of models, a series identifier identifying a particular model, a model year, a make, a model, or the like. The information about the current product may be obtained from any suitable resource, including but not limited to a governmental agency (e.g., a department of motor vehicles), the current product's manufacturer, a local distributor of the current product (e.g., the local car dealership that sold the current product or the like), an online database of transactions, or the like. The information about the current product may be added to the system in any suitable manner (e.g., including but not limited to manual entry, automated entry, manual importation, automatic importation, static addition, dynamic addition, or the like) and using any suitable form of data (e.g., database, flat file, or the like). In some instances, the local car dealership that sold the current product may have some or all of the information about the current product in a software system from which the information may be obtained. In some instances, the current product's manufacturer may have some or all of the information about the current agreement in a website from which the information may be obtained.

As illustrated in FIG. 1E, section 112 includes information about the current agreement, which may include any suitable information, including but not limited to the date the agreement started, the date the agreement ends, the original capitalized cost (or amount financed), the end of term residual (or deferred) payment, the term of the agreement, a base periodic payment (which may be pre tax in certain states), an actual periodic payment (which may be post-tax in certain states), the payoff amount (e.g., the amount owed to the lender to satisfy the agreement), a date until which the lender will accept the payoff amount in satisfaction of the agreement (e.g., a date representing the end of a ten-day period or other suitable period), a trade-in value associated with the product under the agreement, a trade equity (e.g., the trade-in value less the payoff amount), and a security deposit (if any) held by the lender. In one embodiment, the trade-in value is an average of trade-in values over a suitable period, which values may be obtained from one or more suitable sources. In one embodiment, values over a ten-year period are obtained from an online auction website and grouped by a suitable geographic region. In one embodiment, the trade-in value is manually adjustable. Trade-in values may be selected from any suitable location, including but not limited to one or more car dealerships. In one embodiment, trade-in values may have associated assumptions (e.g., mileage, condition, or the like). Of course, any suitable method for calculating a trade-in value may be used. The term "trade-in value" is a broad term and is used herein in its ordinary sense and further includes without limitation aspects of some embodiments disclosed herein. As illustrated in FIG. 1E, section 114 includes additional information concerning the current agreement, including the number of payments the client has made under the agreement, the number of payments remaining under the agreement, the number of times (if any) the client has made late payments (including payments 30 days late, 60 days late, 90 days late, or the like), and the total of remaining payments and any additional fees to conclude the agreement as scheduled under the agreement.

The information about the current agreement (e.g., FIG. 1E) may be obtained from any suitable resource, including but not limited to the lender that financed the current agreement, a governmental agency (e.g., a department of motor vehicles), the current product's manufacturer, a local distributor of the current product (e.g., the local car dealership that sold the current product or the like), an online database of transactions, or the like. The information about the current agreement may be added to the system in any suitable manner (e.g., including but not limited to manual entry, automated entry, manual importation, automatic importation, static addition, dynamic addition, or the like) and using any suitable form of data (e.g., database, flat file, or the like). In some instances, the local car dealership that sold the current product may have some or all of the information about the current agreement in a software system from which the information may be obtained. In some instances, the current product's manufacturer may have some or all of the information about the current product in a website from which the information may be obtained.

As illustrated in FIG. 1F, the text 120 indicates that the deal sheet is provided by a particular car dealership. Text 122 indicates the client for whom the deal sheet was created. Section 124 includes information contact information for the client, such as the client's name, address, and telephone numbers. The information about the client may be obtained from any suitable resource, including but not limited to a governmental agency (e.g., a department of motor vehicles), the current product's manufacturer, a local distributor of the current product (e.g., the local car dealership that sold the current product or the like), an online database of transactions, or the like. The information about the client may be added to the system in any suitable manner (e.g., including but not limited to manual entry, automated entry, manual importation, automatic importation, static addition, dynamic addition, or the like) and using any suitable form of data (e.g., database, flat file, or the like). In some instances, the local car dealership that sold the current product may have some or all of the information about the client in a software system from which the information may be obtained. In some instances, the current product's manufacturer may have some or all of the information about the client in a website from which the information may be obtained.

As illustrated in FIG. 1F, section 126 may include any suitable information about the replacement product, including but not limited to a class identifier identifying a group of models, a series identifier identifying a particular model, a model year, a make, a model, a selling price associated with the product (e.g., an average selling price), the trade equity value illustrated in section 112 (FIG. 1E), a subsidy amount (if any) the seller of the replacement product would be willing to accept below the selling price associated with the product, the total selling price (or capitalized cost) on the replacement product including any equity and including sales tax (if any), sales tax (if any), and the total amount financed including trade equity and sales tax. The information about the replacement product may be obtained from any suitable resource, including but not limited to a governmental agency (e.g., a department of motor vehicles), to the replacement product's manufacturer, a local distributor of the replacement product (e.g., a local dealership), an online database of transactions, or the like. The information about the replacement product may be added to the system in any suitable manner (e.g., including but not limited to manual entry, automated entry, manual importation, automatic importation, static addition, dynamic addition, or the like) and using any suitable form of data (e.g., database, flat file, or the like). In some instances, a local car dealership may have some or all of the information about the replacement product in a software system from which the information may be obtained. In some instances, the replacement product's manufacturer may have some or all of the information about the replacement product in a website from which the information may be obtained.

As illustrated in FIG. 1G, the section headings 130 indicate the names of the lenders associated with the replacement agreements shown under the section headings 130. Any suitable information about the replacement agreements may be displayed, including but not limited to a contract term (e.g., 36 months, 48 months, 60 months, or the like), the type of agreement (e.g., lease, purchase, deferred payment), a residual or deferred payment amount, a capitalized cost or amount financed, a money factor or interest rate charged on the replacement agreement, a periodic payment associated with the replacement agreement, and difference (e.g., text 134) between the client's periodic payment under the current agreement (e.g., text 116 in FIG. 1E) and the payment under the replacement agreement (e.g., text 132). For one of the illustrated replacements agreements, text 134 indicates that the replacement agreement's payment is twelve dollars less than the current agreement's payment. In one embodiment, the actual replacement agreement that the client enters may differ from those displayed in the FIG. 1G; for example, upon review of the current product, particular values (e.g., a trade-in value or selling price) may be adjusted higher or lower for any suitable reason. Accordingly, a deal sheet may advantageously display an indication that the values on the deal sheet are estimates.

The information about the replacement agreements (FIG. 1G) may be obtained from any suitable resource, including but not limited to the lenders offering financing for the replacement agreement, the replacement product's manufacturer, a local distributor of the replacement product (e.g., a local dealership), an online database of transactions, or the like. The information about the replacement agreement may be added to the system in any suitable manner (e.g., including but not limited to manual entry, automated entry, manual importation, automatic importation, static addition, dynamic addition, or the like) and using any suitable form of data (e.g., database, flat file, or the like). In some instances, a local car dealership may have some or all of the information about the replacement agreement in a software system from which the information may be obtained. In some instances, the replacement product's manufacturer may have some or all of the information about the replacement agreement in a website from which the information may be obtained.

In the example illustrated in FIG. 1G, the replacement agreements are leases; however, replacement agreements may be any suitable type of agreement, including but not limited to a lease agreement, a deferred or balloon agreement, a purchase agreement, or the like. The term "agreement" is a broad term and is used herein in its ordinary sense and further includes without limitation aspects of some embodiments disclosed herein. FIG. 1H illustrates one embodiment of a lease payment formula; however, any suitable lease payment formula may be used. The term "lease" is a broad term and is used herein in its ordinary sense and further includes without limitation aspects of some embodiments disclosed herein. FIG. 1I illustrates one embodiment of a deferred or balloon payment formula; however, any suitable deferred or balloon payment formula may be used. The term "deferred" is a broad term and is used herein in its ordinary sense and further includes without limitation aspects of some embodiments disclosed herein. The term "balloon" is a broad term and is used herein in its ordinary sense and further includes without limitation aspects of some embodiments disclosed herein. FIG. 1J illustrates one embodiment of a purchase payment formula; however, any suitable purchase payment formula may be used. The term "purchase" is a broad term and is used herein in its ordinary sense and further includes without limitation aspects of some embodiments disclosed herein.

A general architecture that implements the various features of embodiments of the invention will now be described with reference to drawings. The drawings and the associated descriptions are provided to illustrate embodiments of the invention and not to limit the scope of the invention.

Certain figures illustrate various views of a system, which may be displayed to a user of the system and which the user may access, review, use, or any suitable combination thereof. Some or all of these views may be used with any other suitable views. In one embodiment, the system uses a hypertext interface, such as HTML, MICROSOFT™ Active Server Pages, or the like. In one embodiment, the system is accessed via a secure system, such as a local area network or the like. For example, the system may be hosted using an in-house server with one or more local computers. However, any network may be used, including wide area networks, the Internet, or the like. Further, the system may be implemented using one or more computers.

As described with respect to some embodiments herein, persons employed at an automobile dealership use the system; however, other suitable uses are contemplated outside of the automobile context. Further, although in some embodiments particular features are described with reference to a salesperson and a management person, any persons may use some or all aspects of the embodiments of the system.

Figure 1K:
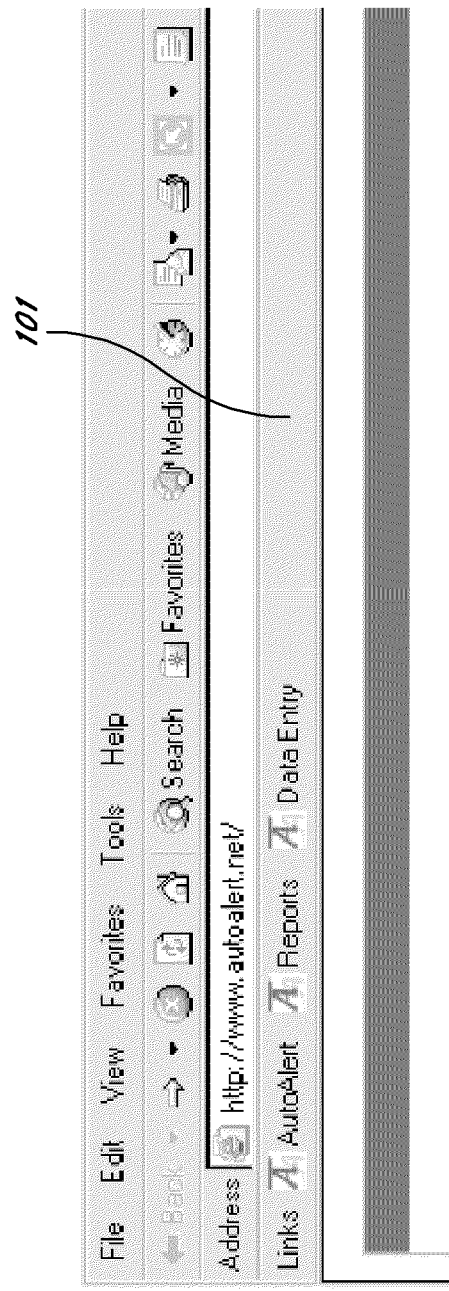

FIG. 1K illustrates an internet browser that has buttons 101 advantageously used to access functions of various embodiments.

Figure 2:
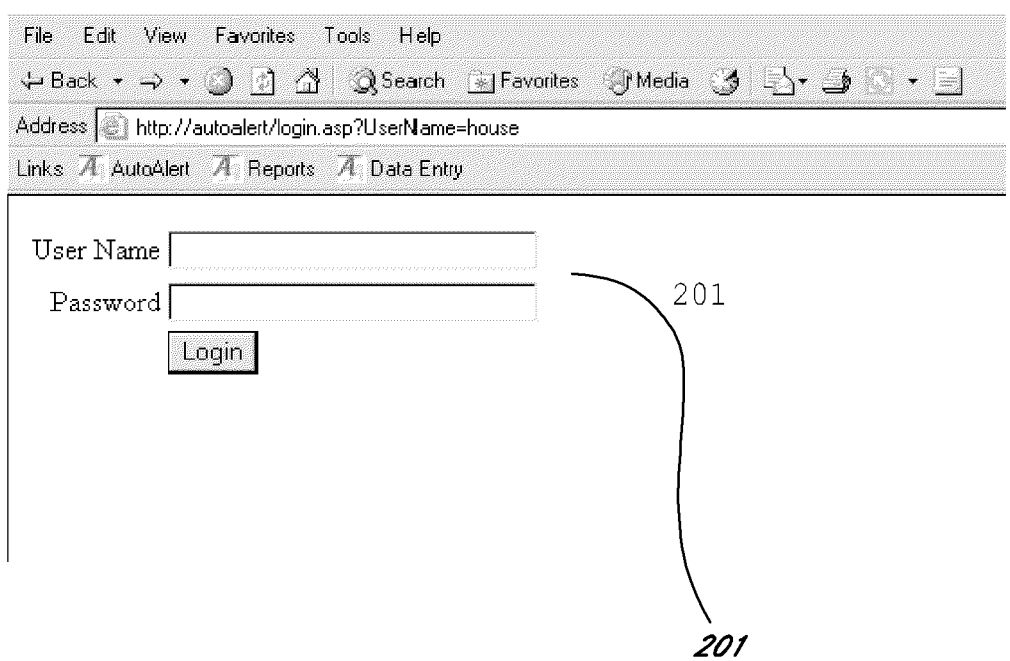

FIG. 2 illustrates an initial log in screen in which a user enters a username and password into fields 201 to gain authorized access to the system.

Figure 3:
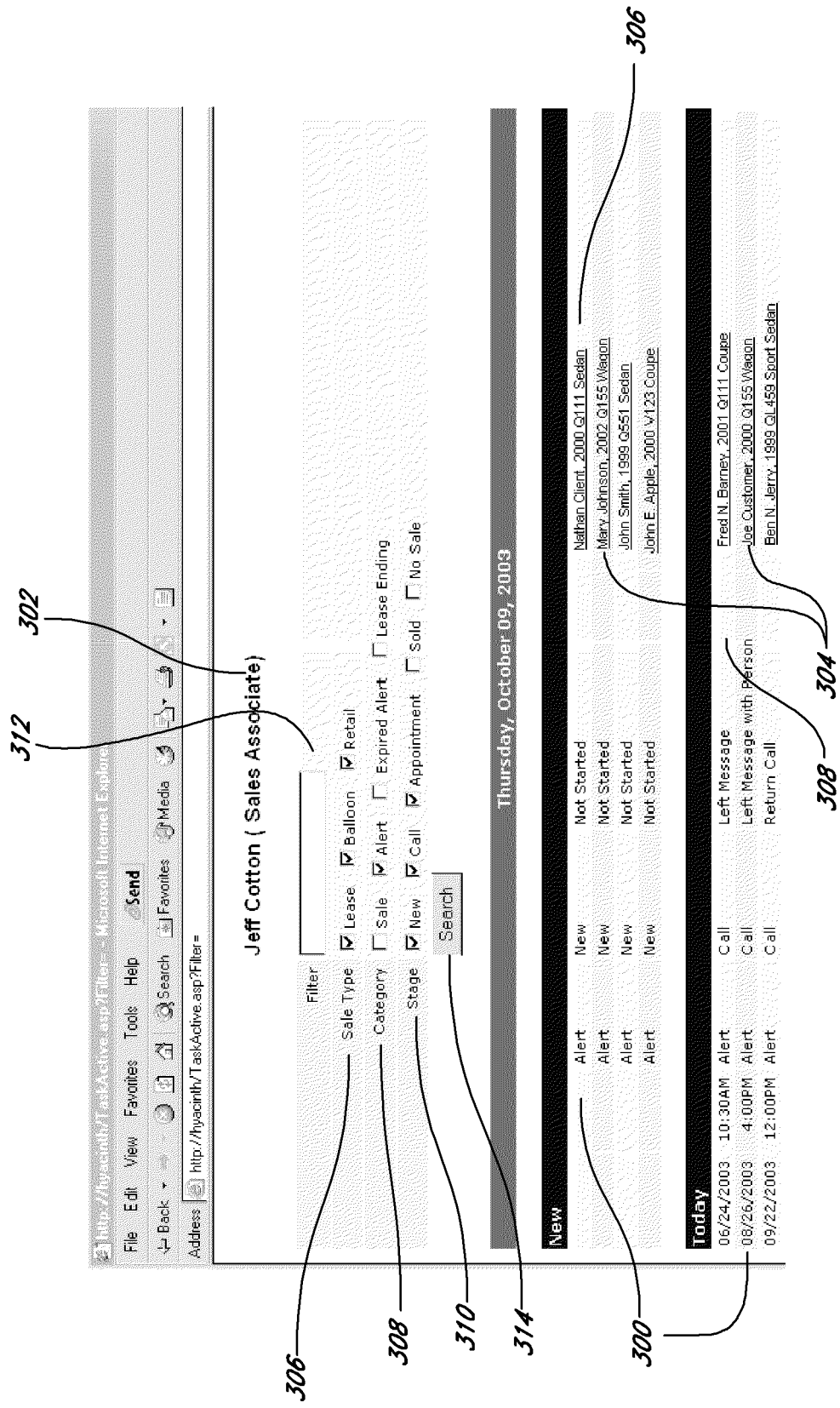

When the user accesses the system, an initial view screen is advantageously displayed as illustrated in FIG. 3. The screen advantageously displays the name 302 of the person associated with the username and password. In the instance illustrated in FIG. 3, the person is a salesperson. The system may advantageously associate the salesperson with clients. Any suitable association with clients may be used. For example, the clients may include but are not limited to persons to whom the salesperson may have sold an automobile, persons to whom the salesperson has been assigned by a supervisor, other persons, or any suitable combination thereof. Thus, by managing the salesperson-client associations, the system may advantageously be used to limit the client data that a salesperson may view to the associated clients.

FIG. 3 illustrates contact management entries 300, which advantageously may include client information, transaction information, or any other suitable information associated with clients. A client may have an entry associated with the client's current automobile transaction, as illustrated by hyperlinks 304 that display the client name and one or more associated automobile identifiers (e.g., make, model, year, or the like). In response to selecting one of the hyperlinks 304, a contact management view associated with the client is displayed, as described below. In one embodiment, contact management entries may advantageously be associated with a particular date. Contract management entries may advantageously be displayed and grouped according to one or more dates. In another embodiment, new contact management entries are displayed. The displayed entries may display any suitable parameter in the system, including but not limited to a stage in the contact management process, items associated with a particular date, tasks associated with a particular date, actions taken during the contact management process, or the like. In one embodiment, the contact management entries may be used to schedule and track tasks associated with contact management. The user may advantageously scroll down through this area and view tasks that have scheduled for future follow up. In one embodiment, a contact management entry is associated with a deal sheet. In one embodiment, when a new deal sheet is generated, an associated contact management entry is also created. The system may generate deal sheets or contact management entries at any suitable time. In one embodiment, the system generates a deal sheet and an associated contact management entry when the system receives an update of information used to calculate replacement agreements that are advantageously displayed in deal sheets. In one embodiment, deal sheets are generated periodically (e.g., weekly). In one embodiment, deal sheets are generated dynamically. In one embodiment, deal sheets are generated substantially continuously. In one embodiment, when a new deal sheet is calculated, the prior deal sheet is retained and accessible through the client's history accessible through a contact management entry or the like. In one embodiment, deal sheets are generated in response to a user request. In an embodiment wherein one or more deal sheet parameters are customizable (e.g., a rebate amount or the like), a person may alter the one or more parameters and review the number and types of deal sheets generated (e.g., how many alerts). Categories of deal sheets include, but are not limited to, an "alert," a "sale," an "expired alert," and a "lease ending."

As illustrated in FIG. 3, a user may choose to customize the display of the contact management entries by filtering entries, sorting entries, ordering entries, ranking entries, or any suitable combination thereof. Although particular parameters are illustrated in FIG. 3, any suitable parameter in the system may be used as a reference for customization. Selecting one or more of checkboxes 306 may be used to limit the displayed contact management entries to a particular combination of sale or transaction types associated with a client, such as a lease, a retail sale, a balloon, or the like. For example, a client may have an existing lease of an automobile or may have purchased an automobile and is currently making payments. Selecting one or more of checkboxes 308 may be used to limit the displayed contact management entries to a category of deal sheets associated with a client, such as a sale, an alert, an expired alert, a lease ending, or the like. In one embodiment, an alert comprises a deal sheet that fits into one or more parameters. For example, in one embodiment, an alert comprises a deal sheet in which a replacement agreement for an associated replacement product has an associated payment within 10% of a payment associated with the client's current agreement. Any suitable range may be used. For example, the range could be set from at any value from 1% to 200% or more than 200%. In one embodiment, a lease ending deal sheet comprises a deal sheet for a client whose current agreement is a lease and that lease will end within a specified time (e.g., near the end of the lease). In one embodiment, a lease ending deal sheet comprises a deal sheet for a client whose lease will end in 6 months, 180 days, or the like. Any suitable time prior to the end of the client's lease may be used to identify a lease ending deal sheet. Accordingly, the contact management entries may be queried for leases ending within a specific period. In one embodiment, the display of entries may be ordered to view contact management entries associated with lease ending deal sheets beginning with those furthest from maturity or beginning with the leases which will end soonest. In one embodiment, an "expired alert" deal sheet comprises a deal sheet that was previously within one or more parameters associated with an alert, but no longer is because one or more parameter values changed. The expired alert deal sheet advantageously provides a reference point as sales associates continue to communicate with their clients. In one embodiment, a "sale" deal sheet comprises a deal sheet that is a default category that is not an alert, a lease ending, or an expired alert. Selecting one or more of checkboxes 310 may be used to limit the displayed contact management entries to those at one or more particular stages in the contact management process, such as where the entry is new, where a telephone call has been made, where an appointment has been made, where a sale occurred, where no sale occurred, or any other stage suitable for managing contacts with persons. Entering one or more words into field 312 may be used to limit the displayed contact management entries to those including those words. For example, if the user wanted to see only entries associated with a particular model of car, the user could enter the particular model of car into field 312. Similarly, to view entries associated with a client having a particular name, the user could enter the name into field 312. In one embodiment, to view the customized display of contact management entries, button 314 is selected. In one embodiment, radio buttons or other suitable graphical user interface elements (not shown) associated with data fields in the system may be used to sort the contact management entries.

Figure 4:
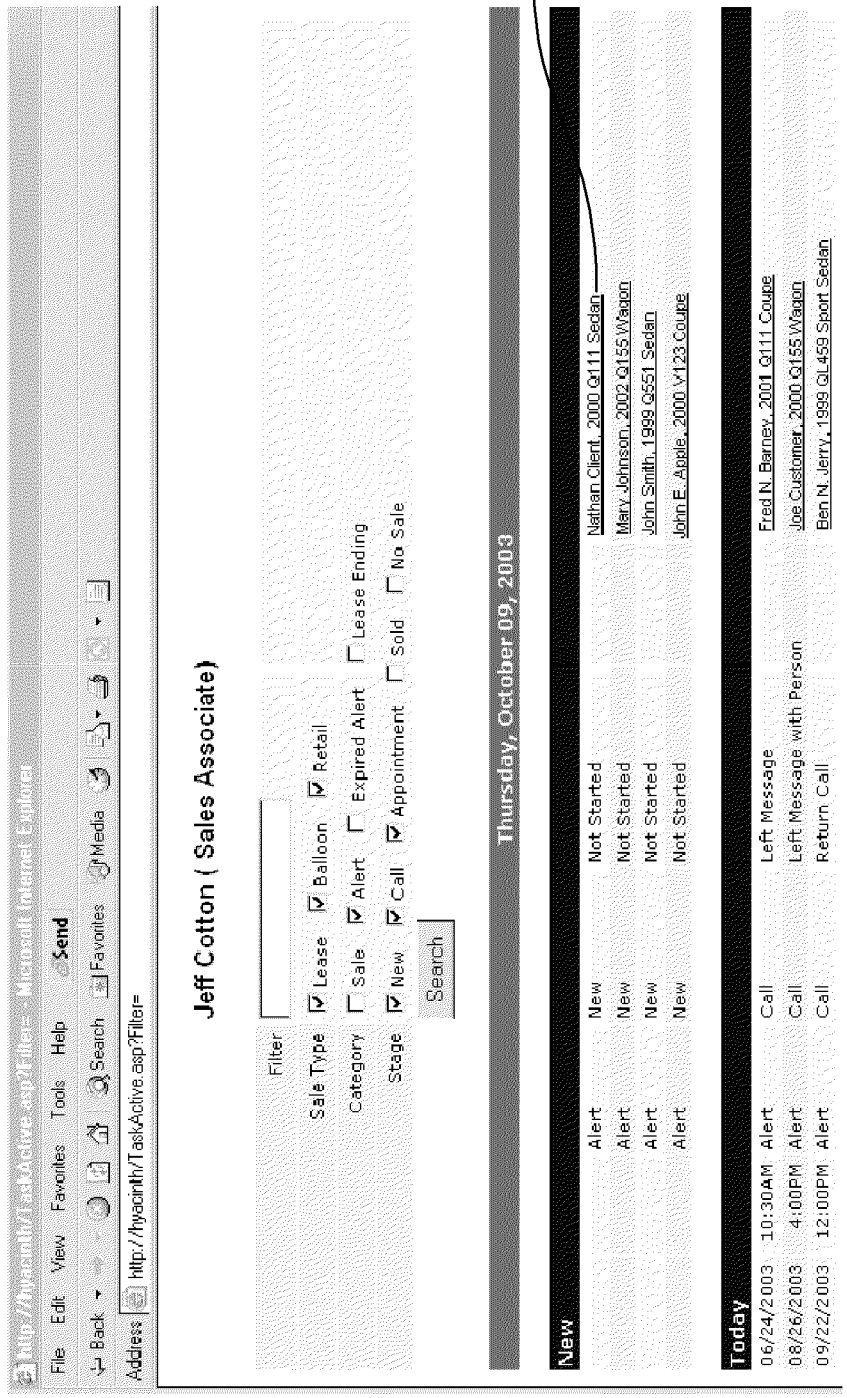
Figure 5:
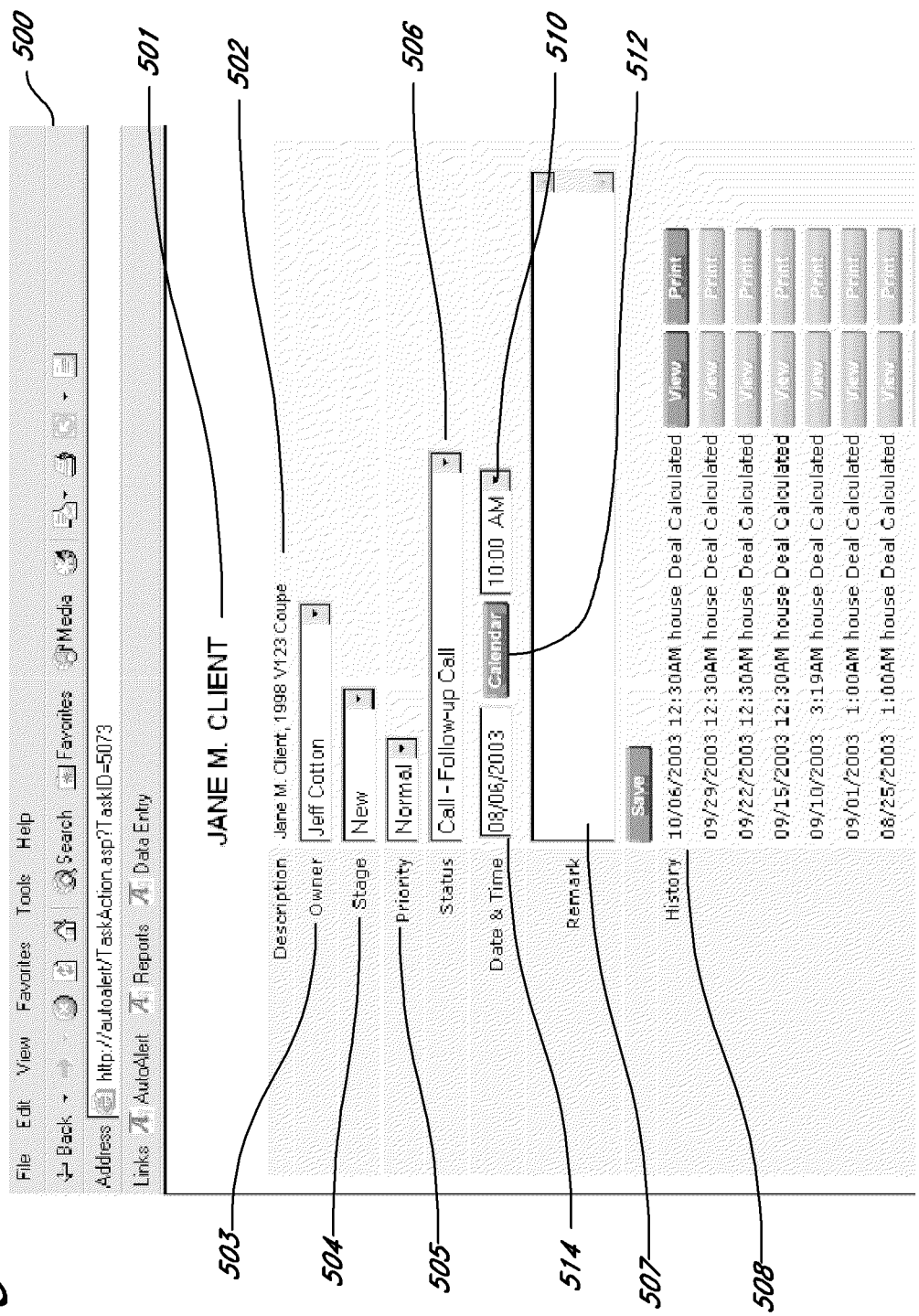
Figure 7A:
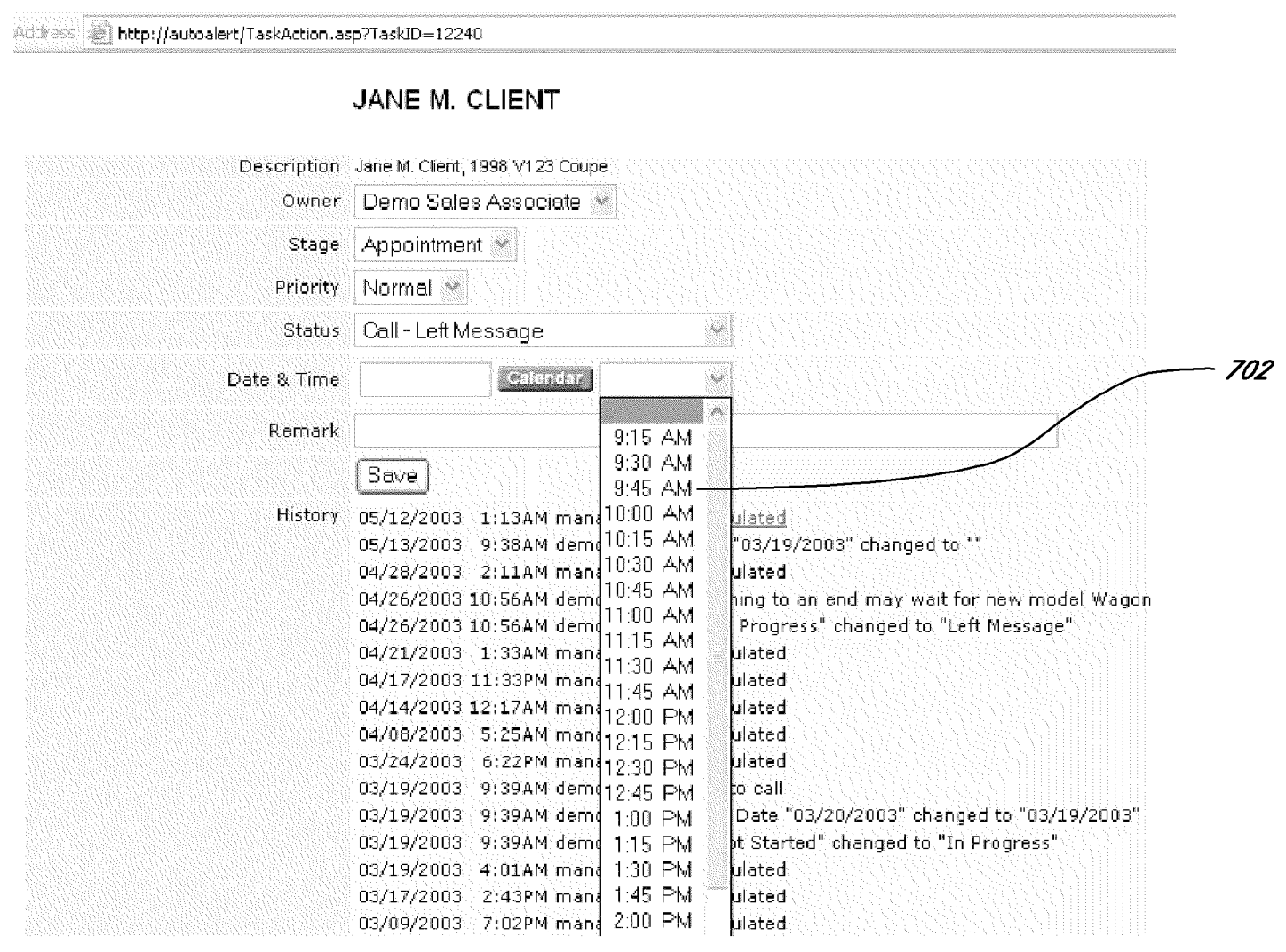
Figure 7B:
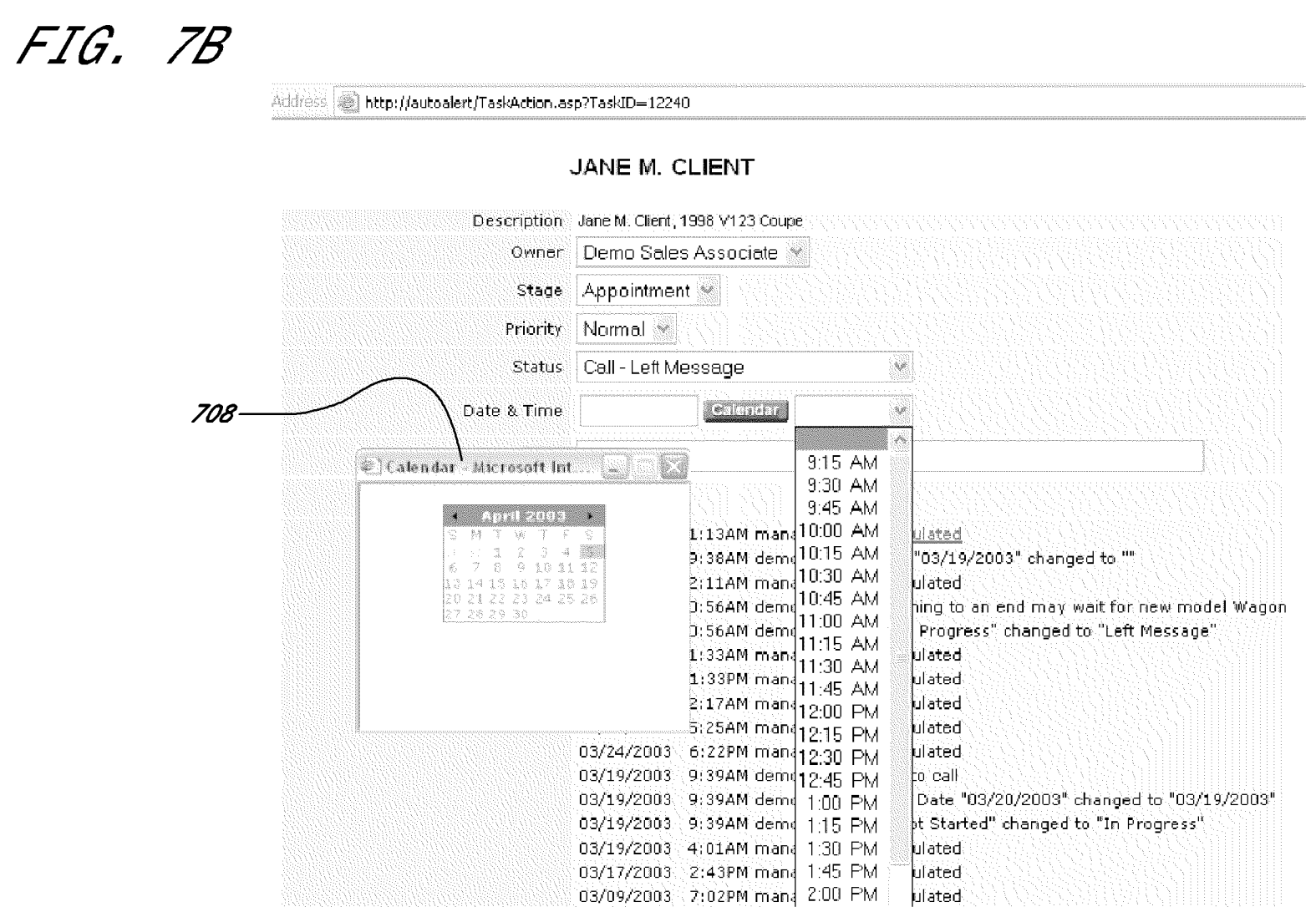

FIG. 4 illustrates an embodiment of the display shown in FIG. 3 in which the hyperlink 402 is selected. In response to the selection of hyperlink 402, a contact management view 500 is displayed as illustrated in FIG. 5. Text 501 identifies the name of client associated with hyperlink 402. The client name and vehicle descriptor is also shown in text 502. Listbox 503 displays the owner of the entry (e.g., a salesperson assigned to the client). Listbox 504 indicates the current stage in the contact management process. In one embodiment, a user may select a stage and save the newly selected stage in the system. Listbox 505 indicates a priority associated with the contact management process. In one embodiment, a user may select a priority and save the newly selected priority in the system. Priorities may advantageously indicate whether specific contact must take place, should take place, or is not needed. In one embodiment, an icon, text, or the like (not shown) is advantageously displayed adjacent entries 304 (FIG. 3) to indicate an associated priority. Any suitable icon, color, or text may be used to indicate different priorities. In one embodiment, a different colored icon is associated with each priority. Listbox 506 indicates a status associated with the contact management process. For example, the user may record contact management-related actions taken for the client by selecting a particular status from the list box 506, which displays a list of selectable statuses 601 (FIG. 6). In one embodiment, a user may select a status and save the newly selected status in the system. A status may indicate, for example, that the salesperson called the client and left a message, called the client and set an appointment, or the like. Field 507 allows text to be entered and subsequently stored for display in history list 508. Selection of listbox 510 allows a user to select a time from list 702 (FIG. 7A). Selection button 512 allows a user to select a date displayed in a calendar view 708 (FIG. 7B), where selection of a date from the calendar view 708 causes the date to appear in field 514. The user may also enter a date directly into field 514. The dates and times may be advantageously used to schedule future activities such as a future call, or an appointment set. The history log may advantageously record a user's use of the contact management screen, list what deal sheet calculations and generations the system has performed, and show any saved remarks. In one embodiment, newly generated contact management entries are associated with a "new" stage indication. A salesperson may advantageously use view 500 to track contact with the client through various contact stages, to document appointments made, and schedule future contacts. In one embodiment, a status change will advantageously be recorded in history section 508. In one embodiment, when the save button is selected, the information from view 500 is logged into the history section as a separate line showing the date the entries were made along with the information entered.

FIG. 8 illustrates an embodiment of the contact management view from FIG. 5 in which remarks are entered the field 507 and then stored in the history view. When a view button 802 is selected, a deal sheet view 902 (FIG. 9) is displayed. When a print button 803 is selected, a deal sheet formatted for printing is displayed.

FIG. 9 illustrates the deal sheet 902. A deal sheet may include some or all of the data displayed in deal sheet or any other suitable data. Thus, a deal sheet showing a different set of data is shown in FIG. 9. For example, FIG. 10 illustrates a view of a deal sheet highlighting the client's current transaction. Although a particular presentation is illustrated in FIG. 9, a deal sheet may use any suitable presentation and, thus, may be configured to show the data in a variety of ways, whether similar to or not similar to that shown in FIG. 9. A user may browse from a displayed deal sheet to the contact management view (FIG. 11). For example, after calling a client and discussing the displayed deal sheet, a salesperson may wish to access the contract management view to update the current status of the contact management process.

Figure 12:
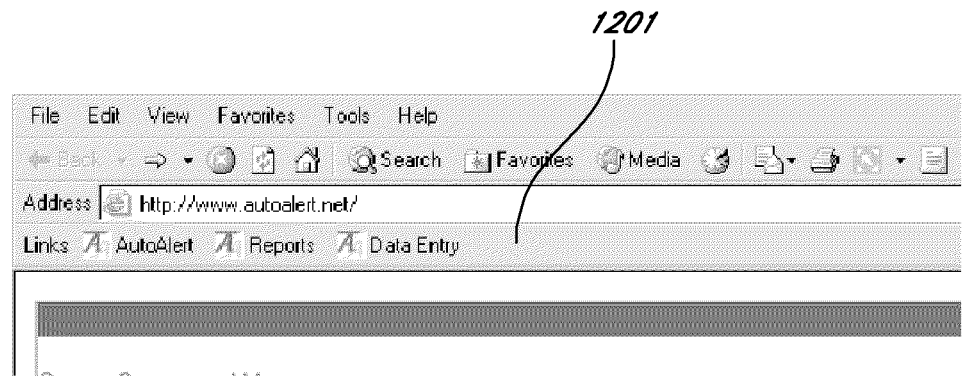
Figure 13:
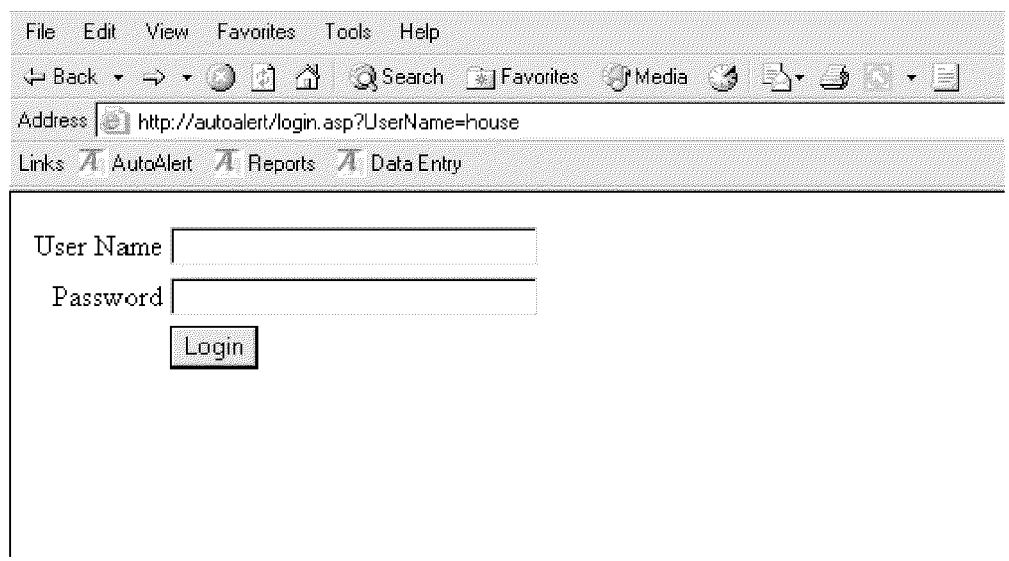
Figure 14:
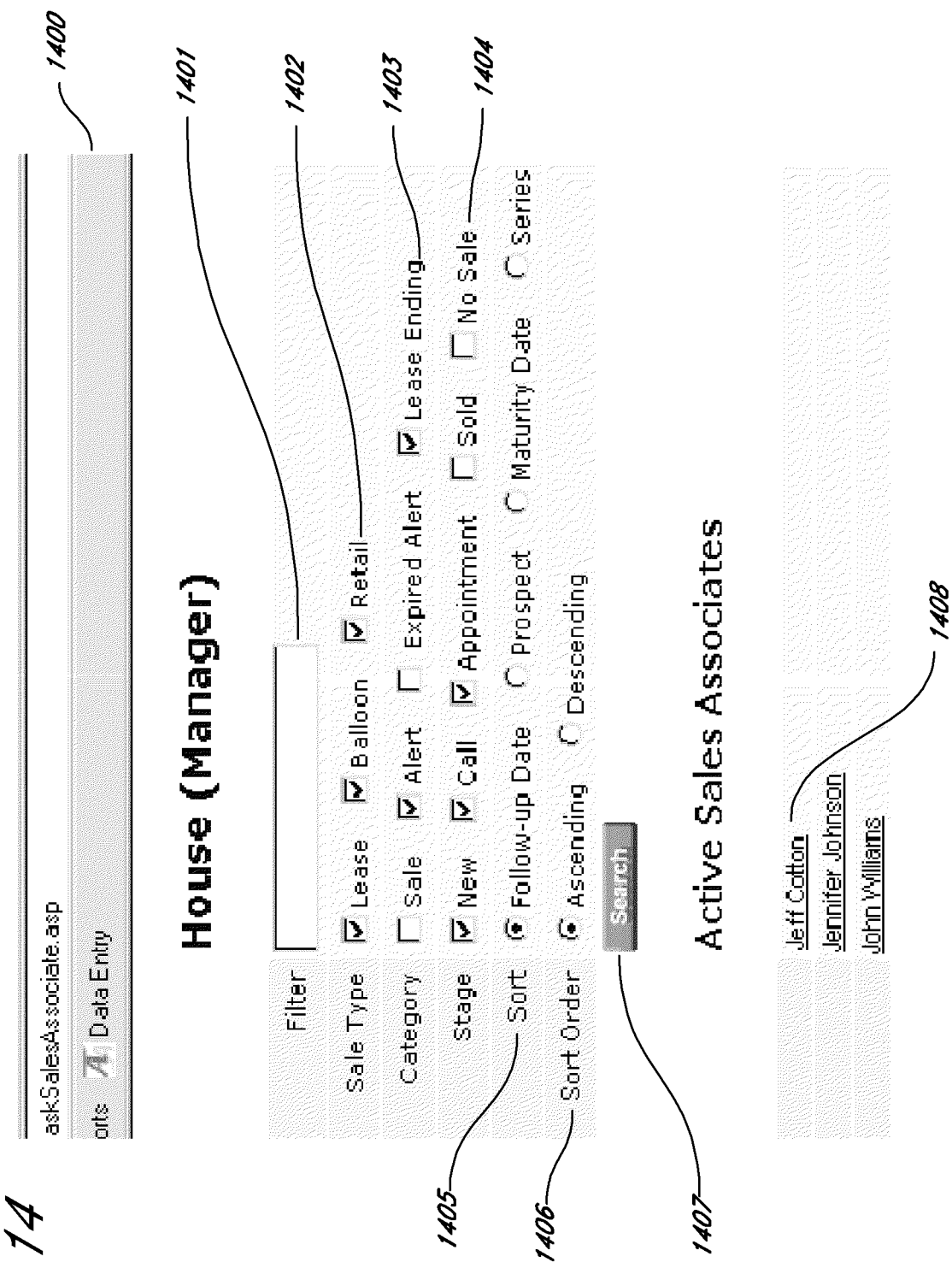

FIG. 12 illustrates an internet browser that has buttons 1201 advantageously used to access functions in various embodiments. FIG. 13 illustrates an initial log in screen in which a user enters a username and password into fields 1201 to gain authorized access to the system. When the user accesses the system, an initial view 1400 is advantageously displayed as illustrated in FIG. 14. The view 1400 advantageously displays the name of the person associated with the username and password. In the instance illustrated in FIG. 14, the person is a manager.

Figures 15A, 15B:
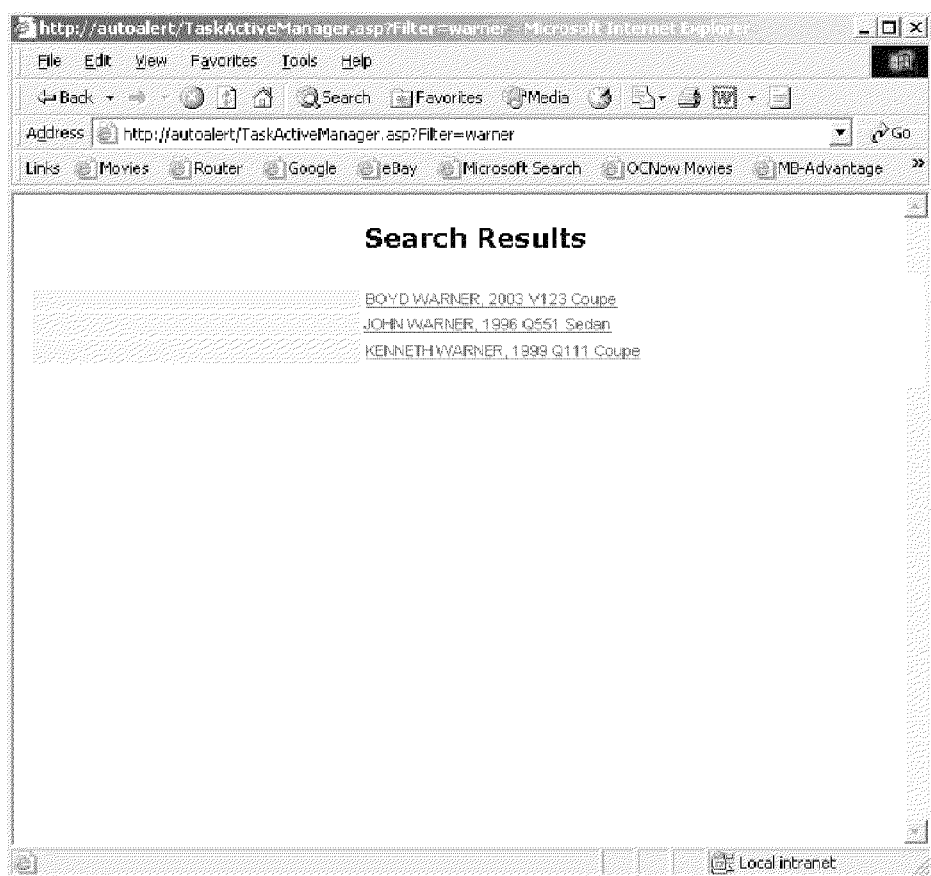

Using the view 1400, the manager may customize the data displayed in view by filtering data, sorting data, ordering data, ranking data, or any suitable combination thereof. Although particular parameters are illustrated in FIG. 14, any suitable parameter in the system may be used as a reference for customization. Entering one or more words into field 1401 may be used to limit the displayed data to those including those words. For example, if the user wanted to see only entries associated with a particular car name, model, make, or year, the user could enter some or all of those into field 1401. Similarly, to view entries associated with a client having a particular name, the user could enter the name into field 1401. Selecting one or more of checkboxes 1402 may be used to limit the displayed data to a particular combination of sale or transaction types associated with a client, such as a lease, a retail sale, a balloon, or the like. Selecting one or more of checkboxes 1403 may be used to limit the displayed contact management entries to a category of deal sheets associated with a client, such as a sale, an alert, an expired alert, a lease ending, or the like. Selecting one or more of checkboxes 1404 may be used to limit the displayed contact management entries to those at one or more particular stages in the contact management process, such as where the entry is new, where a telephone call has been made, where an appointment has been made, where a sale occurred, where no sale occurred, or any other stage suitable for managing contacts with persons. For example, the user can see all of the new deal sheets calculated, those that are scheduled to receive a call, appointments set, and so on. Selecting the sort radio buttons 1405 may be used to sort the data in a variety of ways such as follow up date, by prospect or client, by maturity date as in when the term of the purchase or lease will expire, and by series of vehicle. Selecting radio buttons 1406 may be used to view the data in ascending or descending order. After configuring the filtering, sorting, and ordering functions, the search button 1407 may be selected to see data associated with the selected the parameters. For example, FIG. 15A illustrates an example of search criteria, including a particular client name, and FIG. 15B illustrates the results of that search. In one embodiment, to view data associated with a particular salesperson, a hyperlink (e.g., hyperlink 1408) is selected. The hyperlink may advantageously display the name of the salesperson.

Figure 16:
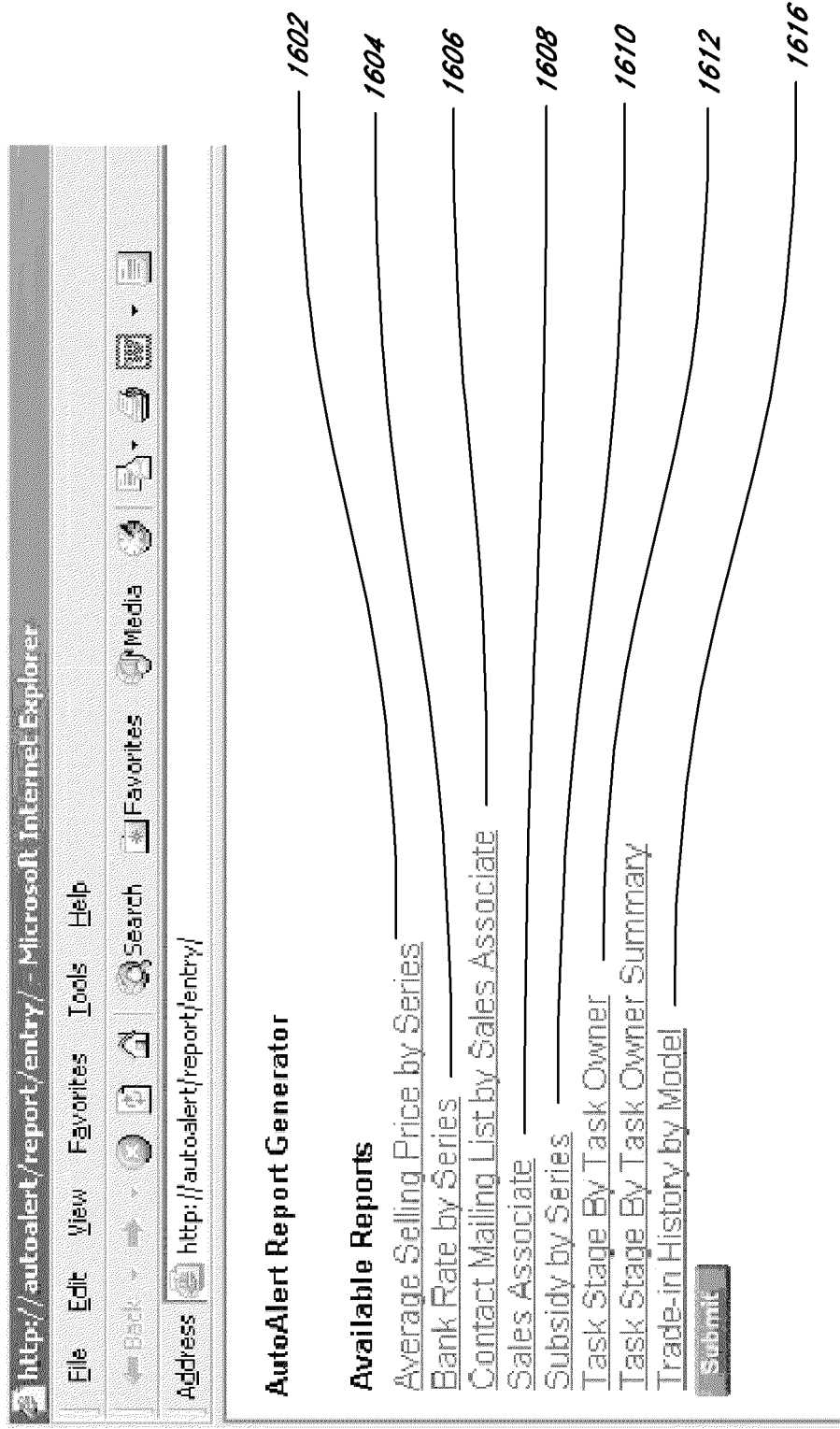
Figure 17:
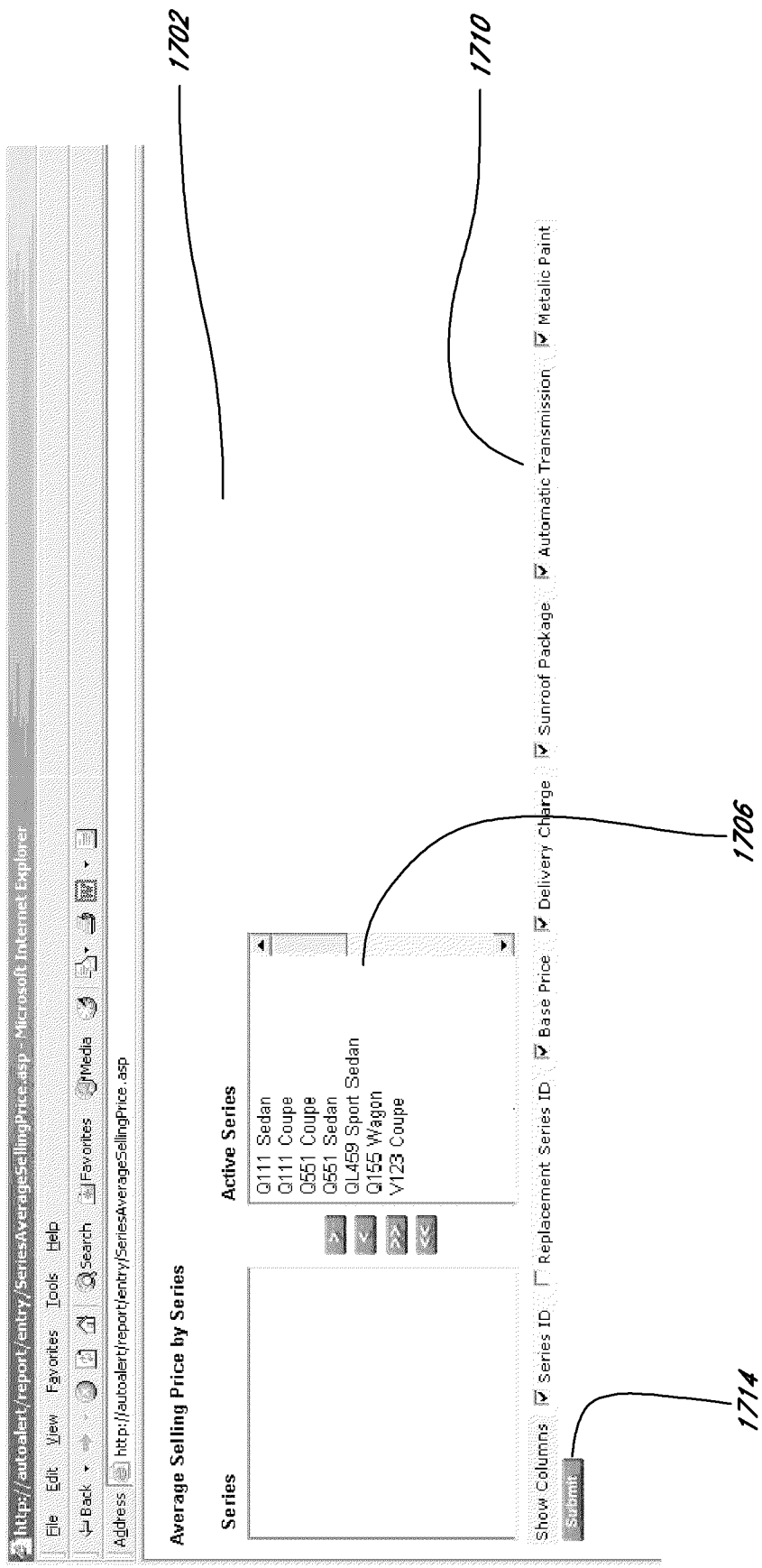

Any screens suitable for performing administrative functions may be used in connection with the system. These screens may be used to maintain and manage information used to perform the calculations within the system. For example, FIG. 16 illustrates a reports generator screen. Selecting hyperlink 1602 opens an average selling price screen 1701.

Using screen 1702, the user may view a display of costs associated with some or all of a set of car models. In one embodiment, the set comprises a set of available car models offered by a particular car dealership (e.g., list 1706). The "active series" designation indicates the series which may be displayed in the display of costs. To move one or more series from one series box to the other, the series may be selected and the appropriate single-arrow button pressed. The double-arrows buttons are for selecting and moving all items from one series box to the other. Checkboxes 1710 may be used to select the data to be displayed, including but not limited to a series or model identifier, a replacement series identifier, a base price, a delivery charge, a sunroof package, automatic transmission, metallic paint, other costs associated with the financing or price of automotive-related features, or any other suitable costs. A submit button 1714 is selected to display the data in a report 1802 (FIG. 18), which may advantageously be used to evaluate the average selling price information the system uses to calculate the deal sheets. In one embodiment, the average selling price information the system uses to calculate the deal sheets may be edited or entered manually. Accordingly, the report 1802 advantageously allows a person to review the average selling price information used by the system determine whether to edit that information.

Figure 19:
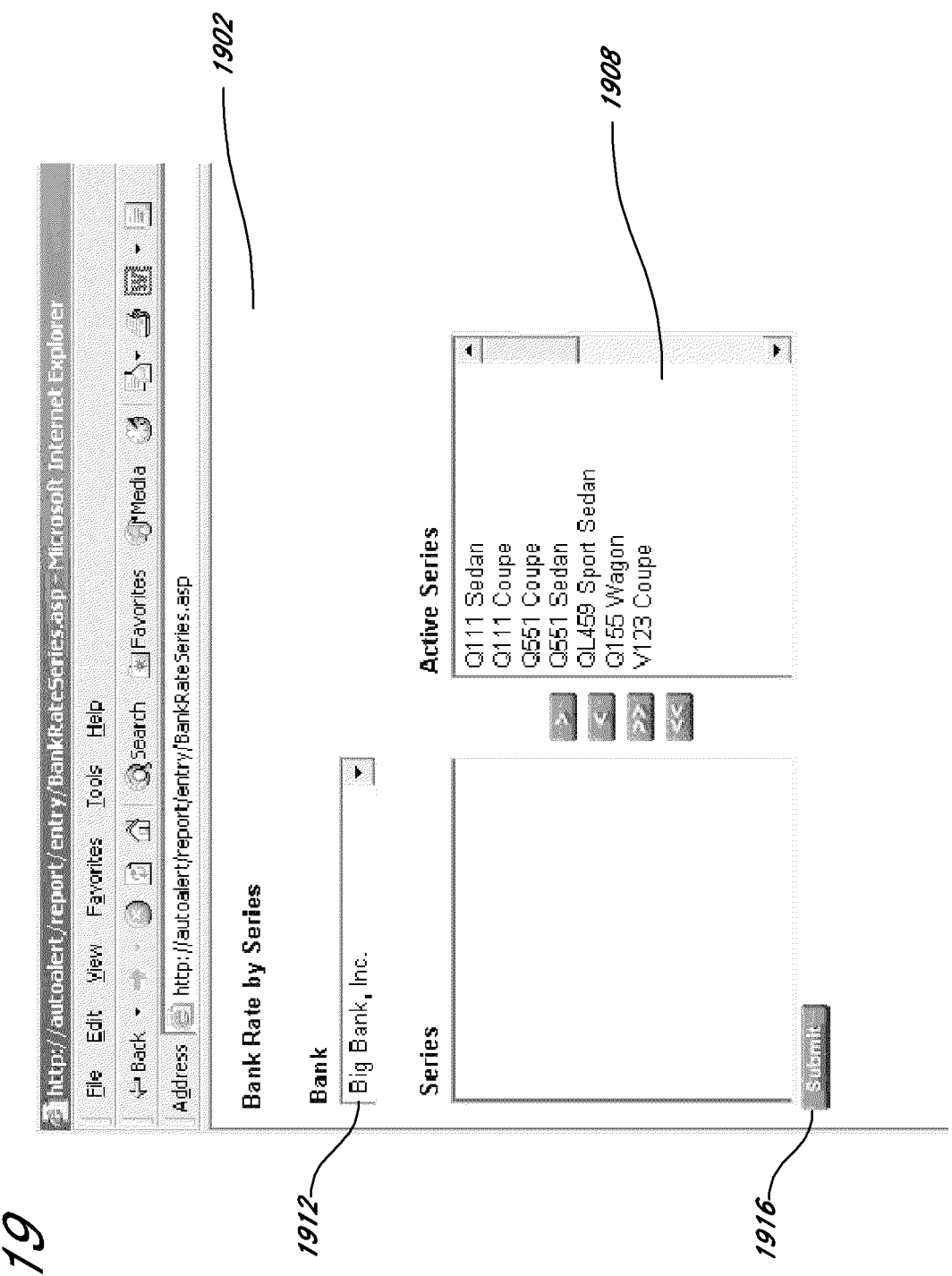

Referring to FIG. 16, selecting hyperlink 1604 opens a bank rate screen 1902 (FIG. 19). Using screen 1902, the user may view a display of financing rates associated with some or all of a set of car models. The "active series" designation indicate the series which may be displayed in the display of financing rates. To move one or more series from one series box to the other, the series may be selected and the appropriate single-arrow button pressed. The double-arrows buttons are for selecting and moving all items from one series box to the other. In one embodiment, the set comprises a set of available car models offered by a particular car dealership (e.g., list 1908). In one embodiment, the user may limit the financing rates displayed to those rates offered by one or more financial institutions. For example, listbox 1912 may be used to select a financial institution. In response to selecting button 1916 A submit button 1912 is selected to display the data in a report 2002 (FIG. 20), which may advantageously evaluate the financing rates used in the system. The report 2002 advantageously may include financing rate information, including a model identifier, the duration of the term, a money factor, a residual percentage, and MRM. A model identifier may be advantageously used to associate a rate residual with a particular model because rates and residuals may vary by model. The duration of the term is the length of the agreement. The money factor comprises a leasing interest rate or APR of the lease. The residual percentage comprises the portion of the original selling price that the financing company expects the product to be worth at the end of the lease or purchase. MRM is a maximum residual amount used that may be used for calculating payoffs.

Figure 21:
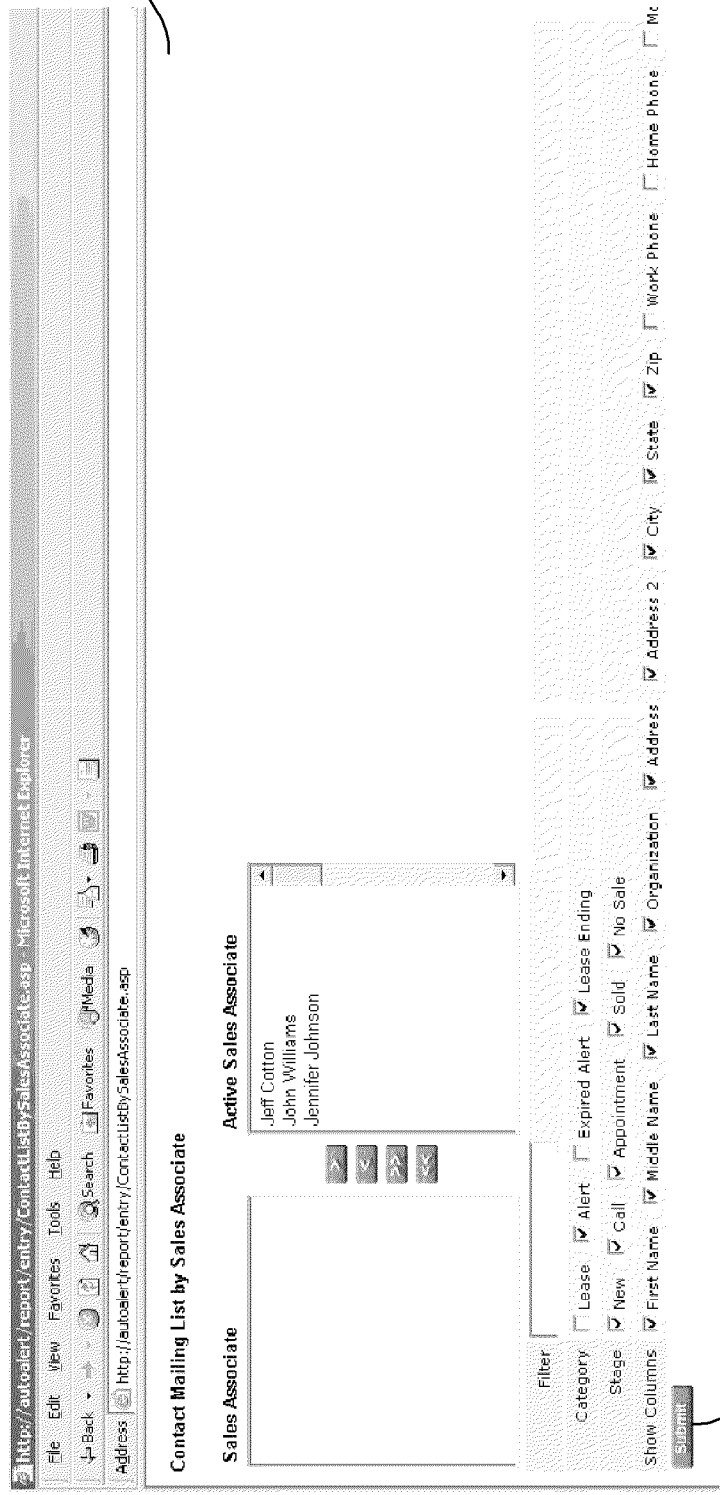

Referring to FIG. 16, selecting hyperlink 1606 opens a mailing list screen 2102 (FIG. 21). Using screen 2102, the user may view a display of client-related, contact information associated with some or all of a set of clients. In an embodiment where sets of clients are associated with one or more salespersons, the display of the client-related, contact information may be displayed for one or more selected salespersons. The "active sales associate" designation indicate the sales associates which may be displayed in the display of the client-related, contact information. To move one or more sales associates from one sales associates box to the other, the sales associates may be selected and the appropriate single-arrow button pressed. The double-arrows buttons are for selecting and moving all items from one sales associates box to the other. Selecting one or more checkboxes may limit the column-displayed, client-related, contact information to particular parameters, including but not limited to names, organization name, addresses, city, state, zip, home telephone, work telephone, mobile telephone, or the like. Selecting one or more checkboxes may limit the displayed client-related contact information to a category of deal sheets associated with a client, such as a sale, an alert, an expired alert, a lease ending, or the like. Selecting one or more checkboxes may limit the displayed client-related contact information to those at one or more particular stages in the contact management process, such as where the entry is new, where a telephone call has been made, where an appointment has been made, where a sale occurred, where no sale occurred, or any other stage suitable for managing contacts with persons. A submit button 2116 is selected to display the data in a report 2202 (FIG. 22), which may advantageously to view list of the client-related, contact information.

Figure 23:
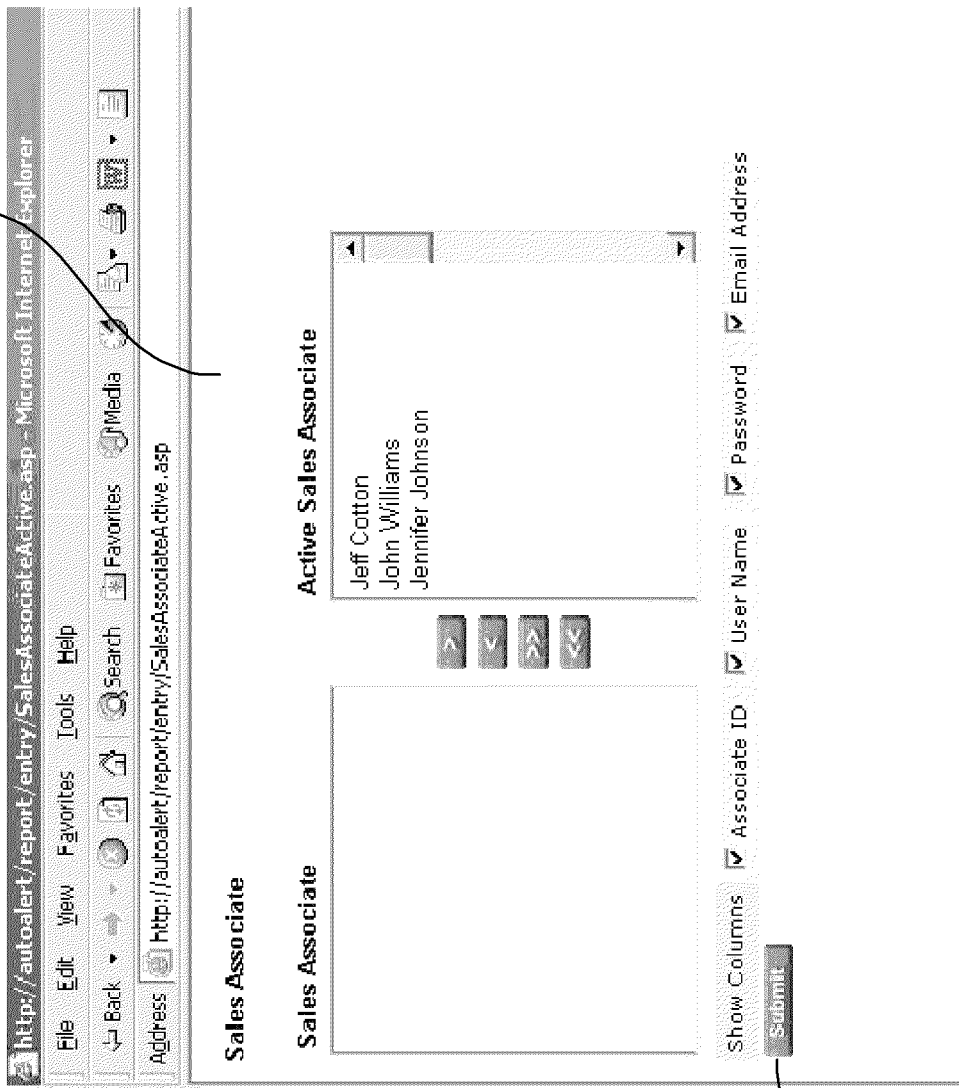

Referring to FIG. 16, selecting hyperlink 1608 opens a salesperson screen 2302 (FIG. 23). Using screen 2302, the user may view a display of information associated with some or all of a set of salespersons. Selecting one or more checkboxes may limit the column-displayed salesperson information, which may include but is not limited to a salesperson identifier, a username, a password, an email address, or the like. A submit button 2316 is selected to display the data in a report 2402 (FIG. 24), which may advantageously to review a display of the salesperson information.

Figure 25:
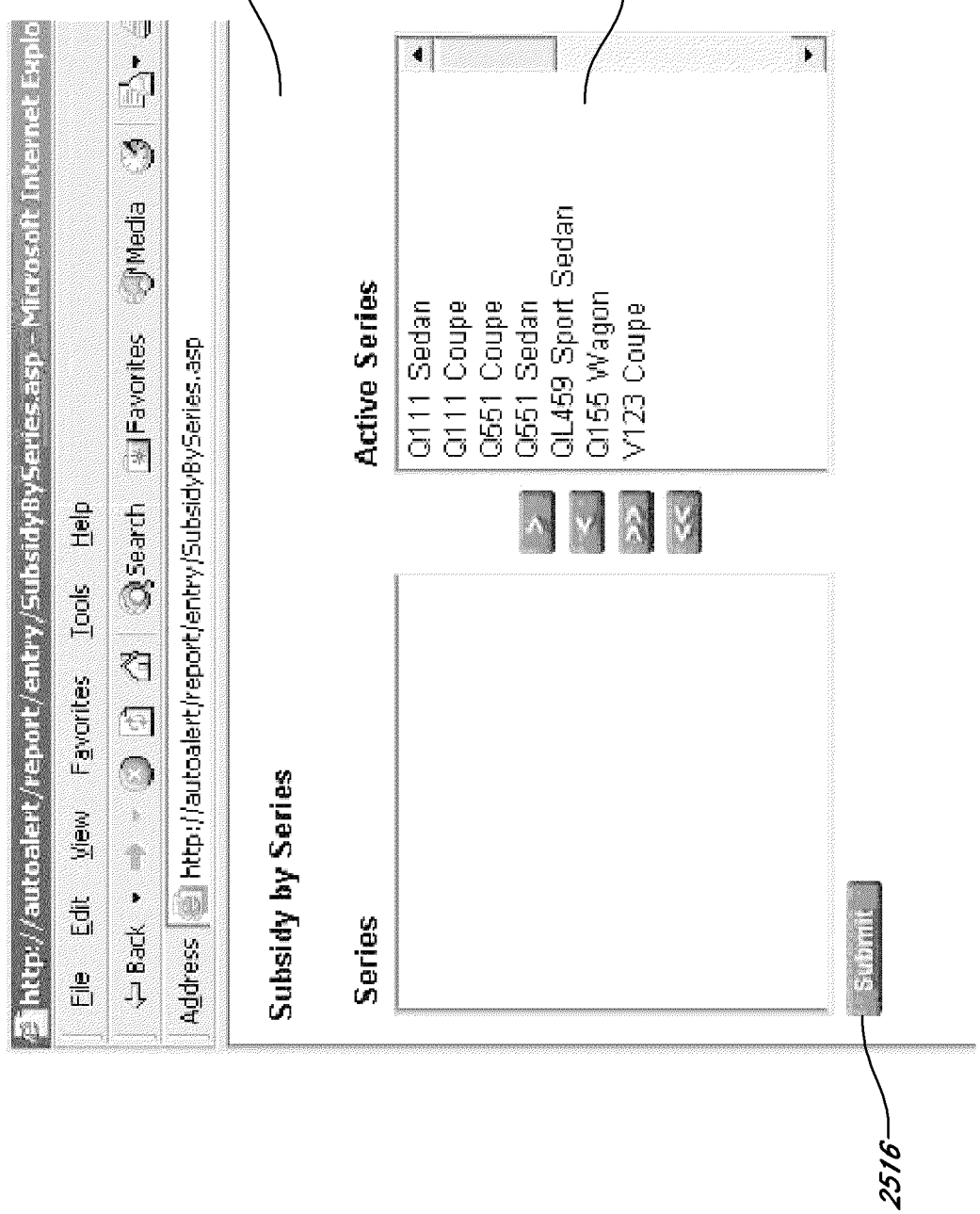

Referring to FIG. 16, selecting hyperlink 1610 opens a subsidy screen 2502 (FIG. 25). Using screen 2502, the user may view a display of information associated with subsidies (e.g., rebates, discounts, promotions, or the like) associated with some or all of a set of car models. The "active series" designation indicate the series which may be displayed in the display of financing rates. To move one or more series from one series box to the other, the series may be selected and the appropriate single-arrow button pressed. The double-arrows buttons are for selecting and moving all items from one series box to the other. In one embodiment, the set comprises a set of available car models offered by a particular car dealership (e.g., list 2508). A submit button 2516 is selected to display the data in a report 2602 (FIG. 26), which may advantageously to assess one or more models and any associated subsidies. In one embodiment, the system uses the subsidies to create deal sheets.

Figure 27:
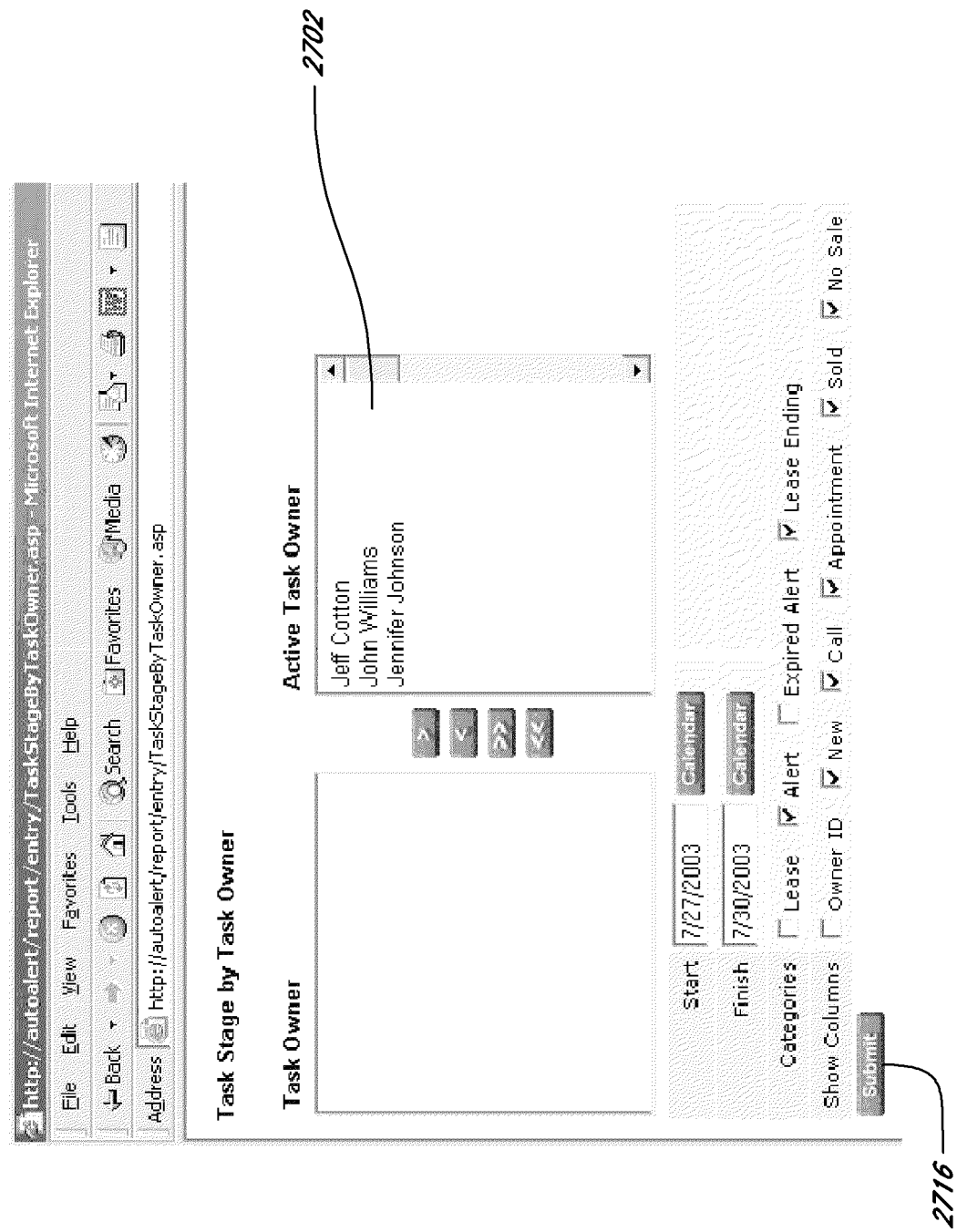
Figure 28:
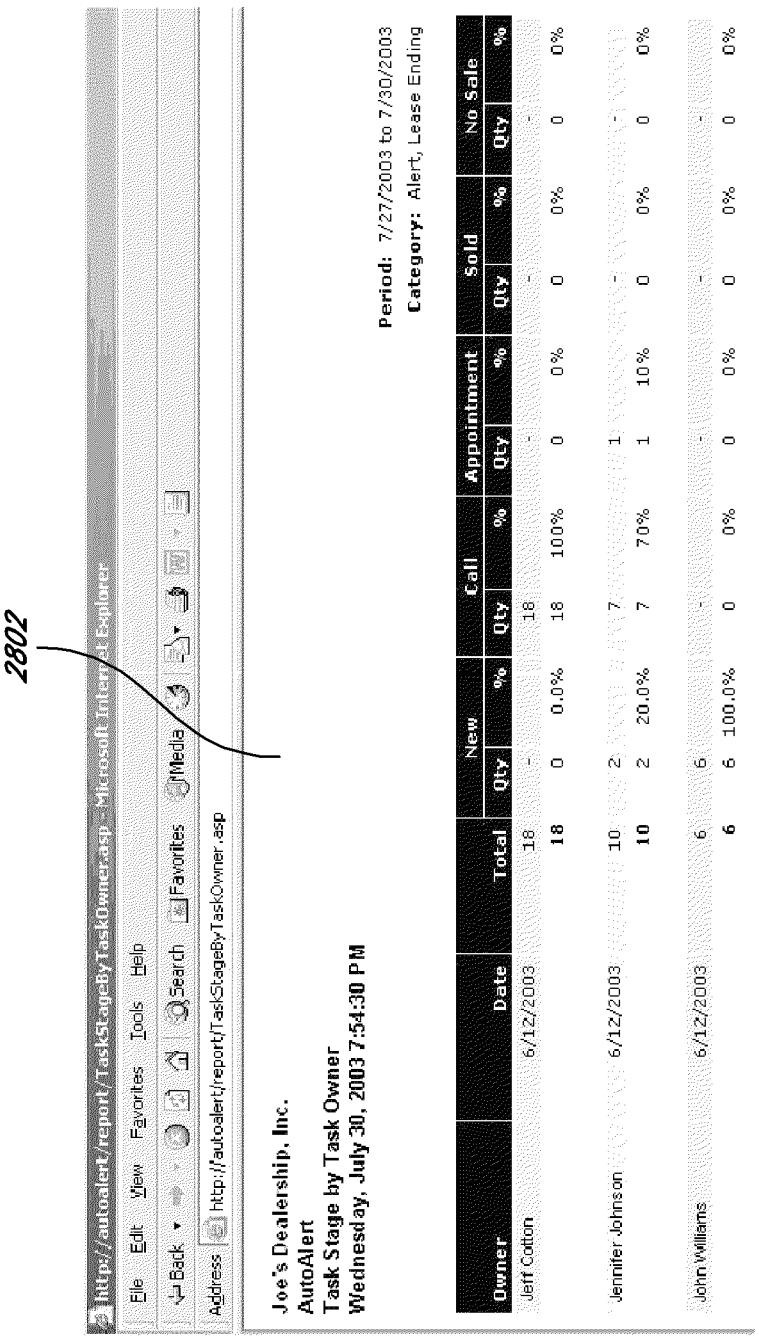

Referring to FIG. 16, selecting hyperlink 1612 opens a task stage by task owner screen 2702 (FIG. 27). Using screen 2702, the user may view a display of contact management task information associated with some or all of a set of task owners (e.g., a salesperson). In an embodiment where set tasks are associated with one or more salespersons, the display of the task information may be displayed for one or more selected salespersons. The "active sales associate" designation indicate the sales associates which may be displayed in the display of the client-related, contact information. To move one or more sales associates from one sales associates box to the other, the sales associates may be selected and the appropriate single-arrow button pressed. The double-arrows buttons are for selecting and moving all items from one sales associates box to the other. Selecting one or more checkboxes may limit the task information to a category of deal sheets, such as a sale, an alert, an expired alert, a lease ending, or the like. Selecting one or more checkboxes may limit the task information columns displayed to those at one or more particular stages in the contact management process, such as where the entry is new, where a telephone call has been made, where an appointment has been made, where a sale occurred, where no sale occurred, or any other stage suitable for managing contacts with persons. In an embodiment where the task information is associated with a particular date, a range of one or more dates may be entered into one or more of the start field and finish field using any suitable method, including but not limited to manual entry or using calendar buttons in a manner substantially similar to that described above with respect to calendar view 708 (FIG. 7B) and field 514 (FIG. 5). A submit button 2716 is selected to display the task information in a report 2802 (FIG. 28). As illustrated in FIG. 28, report 2802 advantageously displays each selected salesperson with a total number of tasks for the sales person, a subtotal of tasks at each particular stage for the sales person, and an associated percentage relative to the total number of tasks for the particular stage and sales person. In one embodiment, report 2802 may include totals by any suitable group, including by division, type of sales, organization, or the like.

Figure 29:
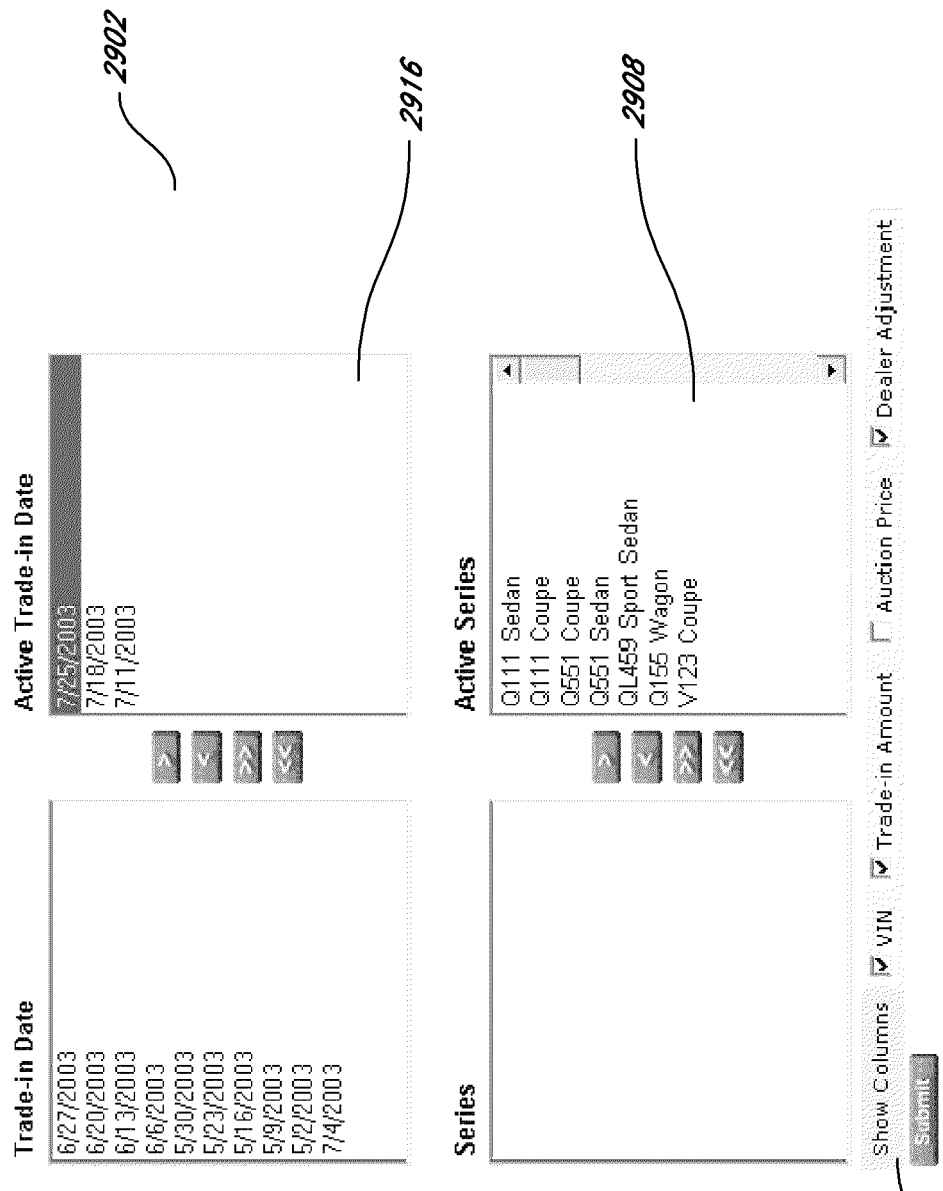

Referring to FIG. 16, selecting hyperlink 1616 opens a trade-in history screen 2902 (FIG. 29). Using screen 2902, the user may view a history of trade-in values associated with some or all of a set of car models. The "active series" designation indicate the series which may be displayed in the display of financing rates. To move one or more series from one series box to the other, the series may be selected and the appropriate single-arrow button pressed. The double-arrows buttons are for selecting and moving all items from one series box to the other. In one embodiment, the set of car models comprises a set of car models accepted as a trade-in by a particular car dealership (e.g., list 2908). The user may view a history of trade-in values associated with some or all of a set of dates. The "active trade-in date" designation indicate the trade-in dates which may be displayed in the display of financing rates. To move one or more trade-in dates from one trade-in dates box to the other, the trade-in dates may be selected and the appropriate single-arrow button pressed. The double-arrows buttons are for selecting and moving all items from one trade-in dates box to the other. In one embodiment, the set of dates comprises a set of dates on which a particular car dealership accepted particular models accepted as a trade-in (e.g., list 2916). Selecting one or more checkboxes may limit the column-displayed trade-in information, which may include but is not limited to a vehicle identification number, the trade-in amount, an auction price, and a dealer adjustment. The dealer adjustments are those figures where the dealer can actually make changes to the average trade in value. These values are subsequently put into and become part of the calculations. A submit button 2924 is selected to display the + information in a report 3002 (FIG. 30), which may be used to evaluate the trade-in values used by the system. In one embodiment, a trade-in value, adjustment, or other parameter value associated with a particular current product may be manually altered (e.g., receive user input) to customize that parameter value. In one embodiment, any parameter value associated with a particular replacement product may be manually altered (e.g., receive user input) to customize that parameter value.

FIG. 31 illustrates an embodiment wherein money factor, residual percentage, or both may be altered for one or more replacement products and for one or more suitable replacement agreement terms (e.g., 36 months, 48 months, 60 months, or the like). Accordingly, a person may enter suitable values to update such values in the system. In one embodiment, these changes are advantageously reflected in view 2002 (FIG. 20).

Figure 26:
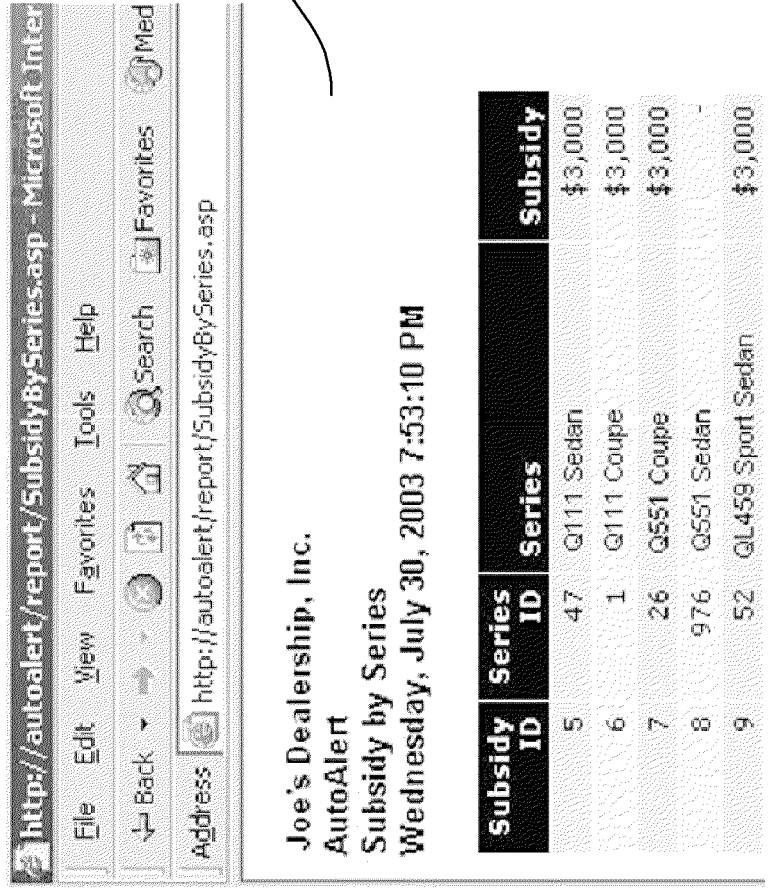
Figure 32:
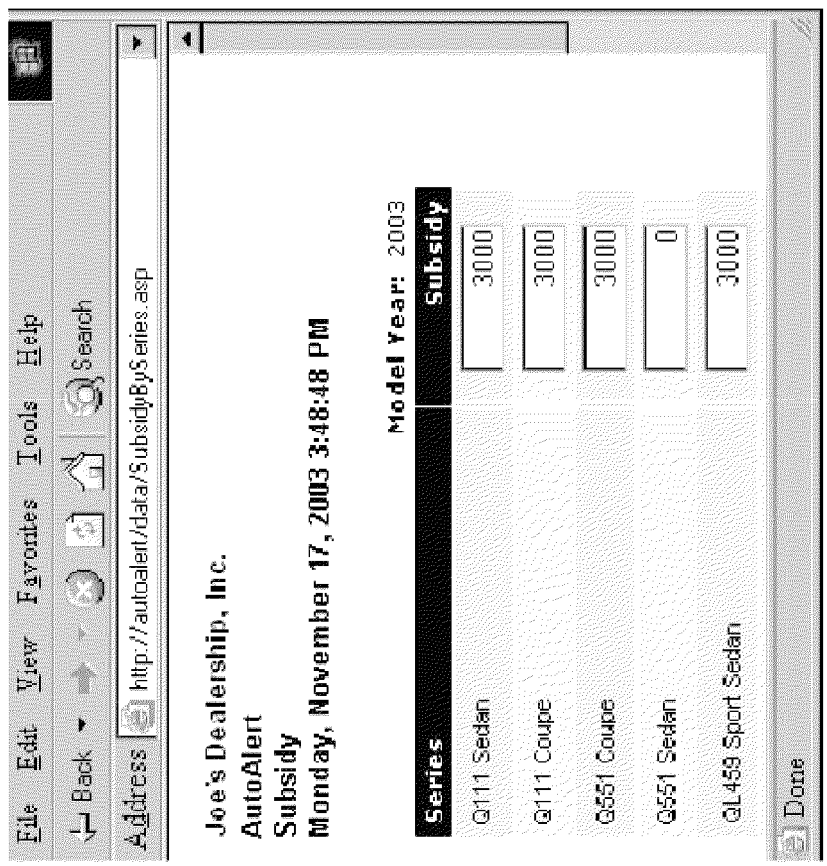

FIG. 32 illustrates an embodiment wherein money factor, residual percentage, both may be altered for one or more replacement products. Accordingly, a person may enter suitable values to update such values in the system. In one embodiment, these changes are advantageously reflected in view 2602 (FIG. 26).

FIG. 33 illustrates a display of contact management related activities for one or more accounts (e.g., a house account, a salesperson account, or the like), a group of one or more accounts, or both.

Figure 34:
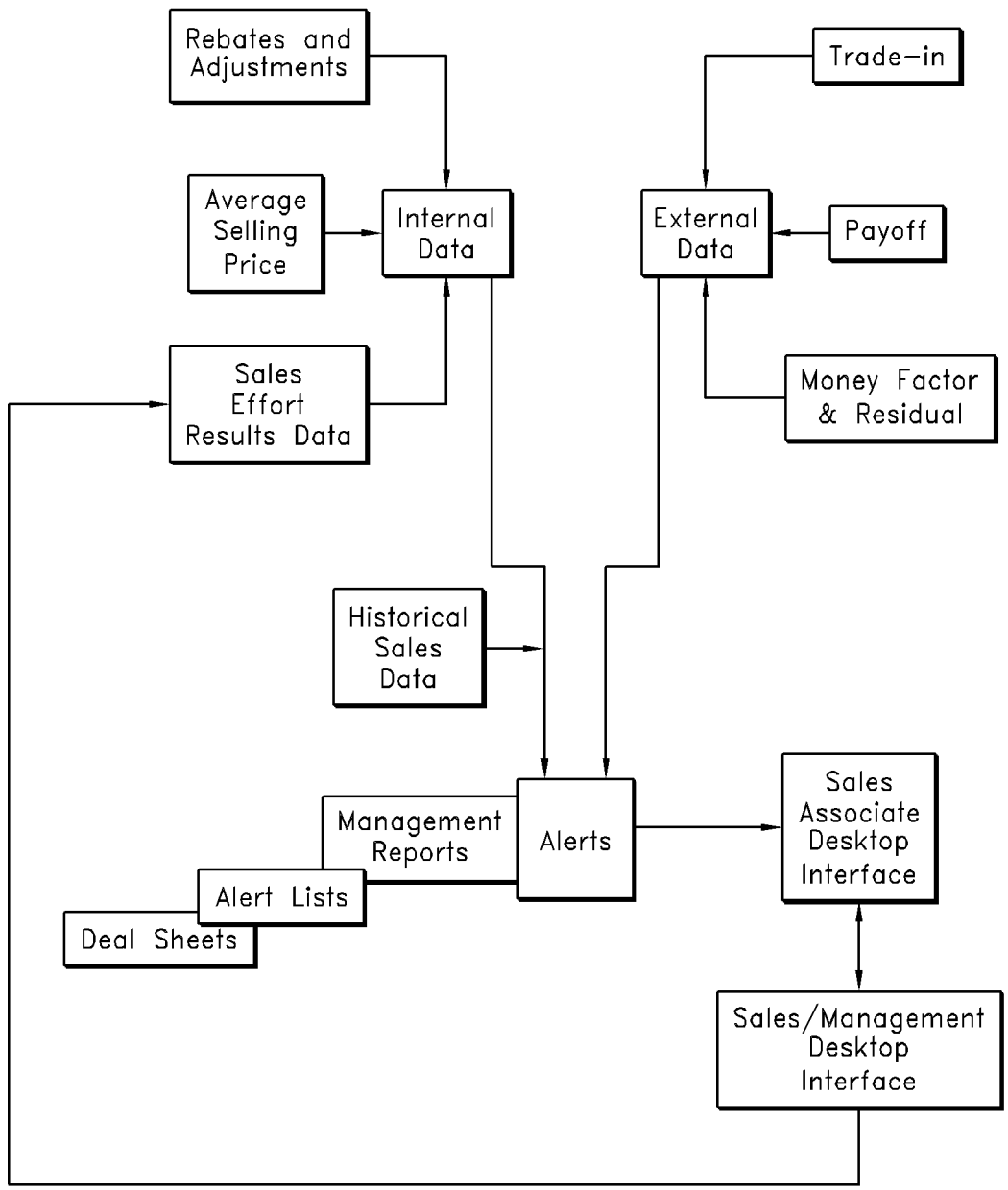
FIG. 34 is a block diagram illustrating how, in one embodiment of a financial alert generation system, internal data, external data, and historical data are used to generate one or more alerts.

FIG. 34 illustrates one embodiment in which internal data, external data, and historical data are used to generate one or more alerts. The external data comprises trade-in data, payoff amount data, money factor data, and residual data. The internal data comprises rebates and adjustments, average selling price data, and sales effort results data. Management reports, alert lists, and deal sheets are advantageously provided. Further, a sales associate may access the system via a sales associate interface and a manager may access the system from an interface.

FIG. 35 illustrates an embodiment of a deal sheet. As illustrated in FIG. 35, deal sheet may have one, two, three, or more types of agreements (e.g., lease, balloon, retail purchase, or the like). Further, different types of agreements may have the same or different sets of parameters displayed in the deal sheet.

In one embodiment, a server computer collects information advantageously used to assess the potential replacement agreement, including but not limited to automobile trade-in values. The server computer may reside in any suitable location, including but not limited to a location remote from a dealership.

In one embodiment, when a client with a current agreement visits a dealership, information sufficient to identify the client is provided to the system. For example, in one embodiment, the current product's vehicle identification number is entered into the system. In response, a deal sheet or an alert sheet associated with the client's current agreement may advantageously be created. In one embodiment, a notification is automatically sent to one or more persons at the dealership. Thus, persons at a dealership may proactively offer the client with potential replacement agreements. For example, in one embodiment, when a client visits a dealership for car maintenance, a car maintenance system may automatically communicate with the system to generate a notification to a salesperson.

In some embodiments, a replacement product may comprise one or more automobiles among the dealership's new or pre owned inventory. a new car offered by a manufacturer, or an automobile from any other suitable provider.

In some instances, the lease or contract-ending customers may advantageously be directed to a contract-ending specialist who can adjust the parameters on the remaining months left.

In one embodiment, a manager or sales representative may advantageously adjust the rebates and finance parameters to change when a deal sheet is considered an alert. Thus, a person may try various scenarios and view the results. For example, if an automobile dealership is considering a $1,000 rebate for a certain model of automobile, a manager could enter the $1,000 rebate into the system and then evaluate the number of new alerts generated by this rebate. Similarly, the manager could view the results from altering the interest rate, money factor, or any other suitable parameter associated with an alert.

In one embodiment, the alerts will be integrated into an enterprise software system that tracks client-customer contact, facilitates outreach, facilitates follow through, or the like. For example, in one embodiment, the alerts are integrated into a Customer Relationship Manager system that will function with one or more aspects of the daily working of an automotive dealership to include sales representatives, business development centers, call centers, lease termination departments, managers, finance departments and service departments. Thus, interaction with various aspects of these systems may advantageously trigger a notification of a potential replacement contract. For example, when a call center receives a call from the client, the call center's system would preferably access the alert aspects of the system and, if an alert was associated with the client, the call center's system would be automatically notified. In one embodiment, a person may be notified of new alerts, lease endings, or the like via a pop-up screen, an email, or the like. In one embodiment, a person may be notified of new alerts, lease endings, or the like via a wireless transmitter (e.g., PDA, cellular phone), a wired transmission (e.g., telephone), or any suitable method. Any suitable person may receive such notifications.

In some embodiments, the system uses internal data, external data, or both. In one embodiment, the internal data comprises rebates, adjustments, average selling prices, historical sales data. In one embodiment, the external data comprises trade-in values, payoff values, money factors, and residual. In one embodiment, alerts are provided to any suitable person, including but not limited to outbound marketers (e.g., telephone or the like), salespersons, managers, or the like.

In some embodiments, additional fees (e.g., license fee, bank acquisition fee, or the like) may be required in addition to the replacement product payments. In some embodiments, the payments calculated for a replacement product includes fees (e.g., delivery charge, fuel-economy tax) related to the replacement agreement. The replacement product may have any suitable combination of features financed in its payment. In one embodiment, the replacement product includes a set of predetermined features. In one embodiment, a set of predetermined features includes automatic transmission, sunroof package, and metallic paint.

In one embodiment, a current product is associated in the system with one or more replacement products. Accordingly, when the system executes a process to generate a deal sheet, the system determines the one or more replacement products associated with the current product and displays a deal sheet for those one or more replacement products. Associations may be made in any suitable manner, including but not limited to a database, a data file, or the like. In one embodiment, a particular make, model, and year of an automobile may be associated with one or more other combinations of make, model, and year. In this embodiment, when the system executes a process to generate a deal sheet, the system identifies the make, model, and year of the current product and display a deal sheet with associated combinations of make, model, and year. In one embodiment, these associations are entered manually into the system for general use (e.g., a manager determines that customers generally would accept particular types of replacement products for certain types of current products). Any suitable way of determining what replacement products to display may be used. For example, where a client requests a particular make, model, and year, the system may advantageously receive that particular make, model, and year and display a corresponding deal sheet. Although automobiles may be categorized using make, model, series, class, year, or the like, any suitable category, classification, or grouping of automobile may be used to create associations for a client's current automobile and a replacement automobile. Further, for current products or replacement products, any category, classification, or grouping may be used to association current products with replacement products.

In one embodiment, when the system executes a process to generate a deal sheet (e.g., for an alert), the system identifies one or more replacement products associated with the current product and determines whether a payment associated with the replacement agreements is less than or equal to a certain threshold percentage value relative to a payment associated with the current agreement. For example, in one embodiment where the threshold percentage value is 10 percent, if a client leases a first automobile at $500 a month and a second associated automobile is available for lease at $550 a month, the system would generate an alert because the second automobile's payment is within 10%. Any suitable threshold percentage value may be used. In one embodiment, the threshold value is 5%. The threshold percentage value may be between and including 3% and 10%. Of course, the threshold percentage value may be at or about any suitable value. Further, this comparison of payments may be used to generate an alert alone, in combination with associations among products within the system, or in combination with any other suitable parameters. Further, alerts may be generated without reference to a comparison of payments.

In one embodiment, a local distributor tracks the identity of a person that sold the client the current product, and the system uses that information to route one or more alerts related to that client's current product to the person. In one embodiment, any suitable person may receive an alert.

As will be apparent to a skilled artisan in light of the foregoing disclosure, the system disclosed herein perform a number of useful processes for alerting a dealership when a customer can be offered a new and advantageous lease or other financial arrangement. Advantageously, providing such information to a dealership in a timely fashion can drive a significant number of sales and leasing arrangements for a dealership. Accordingly, embodiments as described herein allow for the automated performance of a number of processes that can significantly increase dealership profits. Embodiments of such processes are described below with regard to FIGS. 36 through 38.

Figure 36:
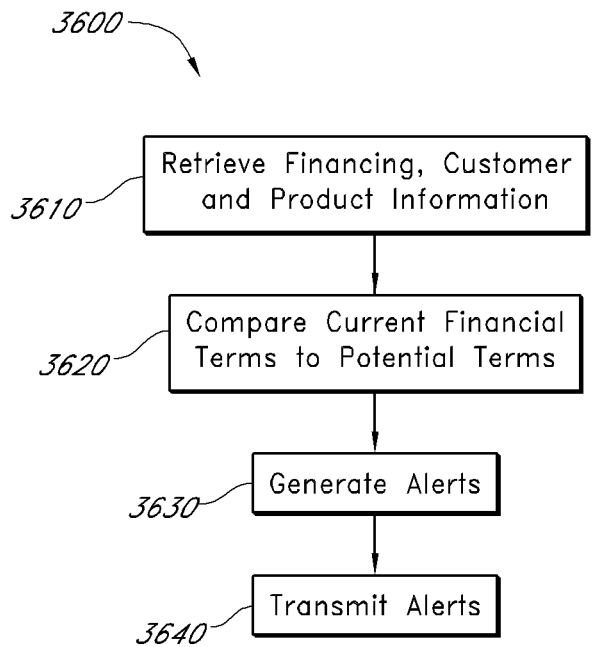
FIG. 36 is a flowchart that illustrates a process of alerting a dealership when a customer can be offered a new lease or other financial arrangement, as performed by one embodiment of a financial terms alert generation system.

FIG. 36 illustrates a process of alerting a dealership when a customer can be offered a new lease or other financial arrangement. Such a process 3600 commences with a block 3610. In the block 3610, the process 3600 retrieves customer information, financing information, and product information. Preferably, such customer information and financing information includes information about any leases or other financial arrangements that each customer is already involved in, along with information about financial arrangements currently available from financial institutions. Accordingly, such information provides a basis for allowing the process 3600 to compare current financial arrangements with potential financial arrangements to determine whether a customer can switch to an advantageous financial arrangement. In one embodiment, an automated information retrieval module, such as the information retrieval module 3930 of FIG. 39, automatically retrieves the customer and financial information from various electronic sources, such as, for example, public and private web pages, databases maintained by a dealership, external databases, and the like. A number of techniques for automatically retrieving such information are known to skilled artisans and can be employed to implement the information retrieval module 3930.

In a block 3620, the process 3600 compares each customer's current financial terms with potential financial terms being offered by financial institutions. Preferably, the comparison block 3620 takes into account all available financial variables that affect whether a customer can advantageously switch financial arrangements, including, for example, interest rates, payoff periods, amount due on the current financial arrangement, any dealer or manufacturer incentives currently available, and the like. The foregoing list of financial variables is exemplary and non-exhaustive; a skilled artisan will appreciate, in light of this disclosure, other financial variables that are relevant, under some circumstances, for determining whether a customer can advantageously switch financial arrangements. In one embodiment, a financial terms comparison module, such as the financial terms comparison module 3935 of FIG. 39, performs the processing of the block 3620.

In a block 3630, the process 3600 generates, based on the comparison of the block 3620, a number of alerts to inform a dealership that a customer can advantageously switch financial arrangements. In one embodiment, the process 3600 generates an alert whenever the difference between the amount that a customer will pay for a new but comparable financial arrangement as compared to the customer's current financial arrangement is below a threshold value. For example, in one embodiment, the process 3600 generates an alert whenever the difference in payment amount is less 10%, such that, for example, an alert is generated when a new payment amount would be $540 and a current payment amount is $500. Alternatively, the process 3600 can be configured to generate an alert only when the difference between a new payment amount and a current payment amount is negative; that is, when the new payment amount is less than the current payment amount. A skilled artisan will appreciate, in light of this disclosure, that a wide variety of thresholds can be set depending on the particular types of sales opportunities that a dealer wants to know about. In one embodiment, the processing of the block 3630 is performed by the financial terms comparison module 3935. Alternatively, as will be apparent to a skilled artisan, the processing of the block 3630 can be performed by a separate module, such as, for example, an alert generation module.

In a block 3640, the process 3600 transmits the generated alerts to a dealership. Advantageously, the transmission of alerts informs the dealership of sales opportunities that may provide to the dealership a significant opportunity to boost profits. As will be apparent from the description of the system provided above, the alerts can be transmitted by email, pager, web page, database record, fax, or any other known method of transmitting electronic data. In one embodiment, the processing of the block 3640 is performed by an alert transmission module, such as, for example, the alert transmission module 3940 of FIG. 39.

Though additional blocks are not illustrated by FIG. 36, it will be apparent to a skilled artisan in light of this disclosure that the dealer can invoke additional processing of the alerts once the dealer has received the alerts. For example, the dealer can invoke the contact management and task management functions as have been described herein. Accordingly, in addition to alerting the dealer, embodiments of the system can perform a number of processes for managing alerts. Advantageously, such alert management provides dealers an effective way to follow up with each alert in a way that maximized the dealer's chances to convert an alert of a potential sale into an actual sale.

Figure 37:
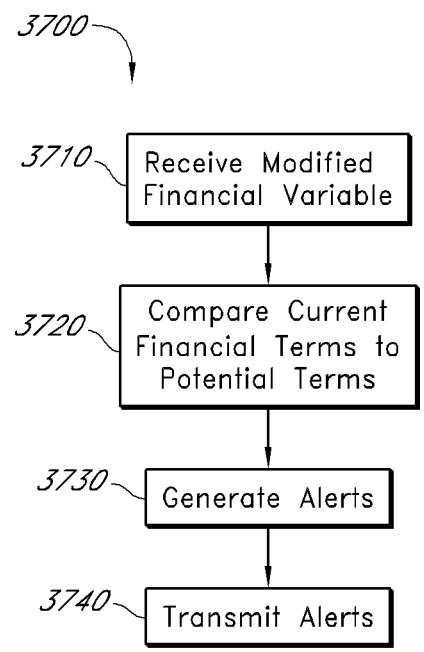
FIG. 37 is a flowchart that illustrates another embodiment of a process of alerting a dealership when a customer can be offered a new lease or other financial arrangement, as performed by one embodiment of a financial terms alert generation system.

FIG. 37 illustrates another embodiment of a process of alerting a dealership when a customer can be offered a new lease or other financial arrangement. In this embodiment, in a block 3710, the process 3700 receives at least one modified financial variable. For example, in one embodiment, the process 3700 may receive a financial variable that indicates that a dealer rebate has increased from $500 to $1,000.

Based on the new information, the process 3700 executes much of the same processing that was explained with regard to FIG. 36 in order to generate alerts that take into account the newly entered information. Advantageously, therefore, the process 3700 can be used by a dealer to answer questions such as "How many customers could be switched to a new financial arrangement if we increase the dealer incentive to $1,000?" In one embodiment, the modified financial variables received in the block 3710 are received by an automated process such as the information retrieval module 3930. In another embodiment, the modified variables are entered manually using a data entry module, such as, for example, the data entry module 3925 of FIG. 39. Advantageously, allowing for manual entry allows for great flexibility in allowing a dealership to change variables over which the dealership has control in order to determine whether new sales opportunities can be generated.

As indicated, the process 3700 performs much of the same processing that is performed by the process 3600. In a block 3720, the process 3700 compares current financial terms to potential financial terms, substantially as explained with respect to the block 3620. In a block 3730, the process 3700 generates alerts, substantially as explained with respect to the block 3630. In a block 3740, the process 3700 transmits the alerts, substantially as explained with respect to the block 3640.

Figure 38:
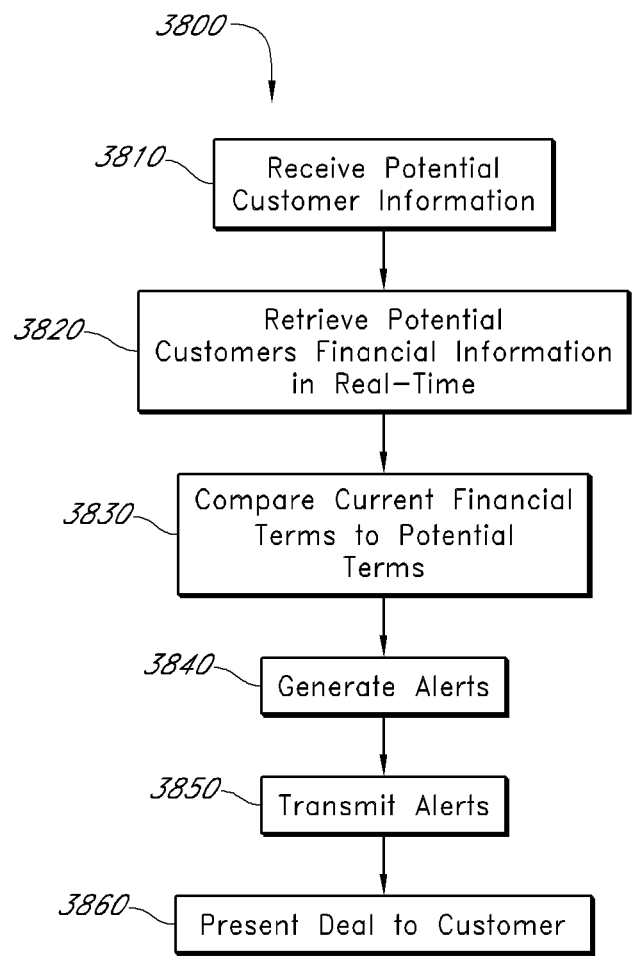
FIG. 38 is a flowchart that illustrates process for detecting and presenting a deal to a customer in real-time, as performed by one embodiment of a financial terms alert generation system.

Advantageously, one embodiment of the system can be used to determine, in real time, whether a deal can be presented to a customer, while the customer is, for example, in a dealership showroom. FIG. 38 illustrates such a process for detecting and presenting a deal to a customer in real-time. The process 3800 commences, in a block 3810, to receive a potential customer identification. In one embodiment, a potential customer identification, such as, for example, a customer number, can be entered manually into the system using the data entry module 3925. In a block 3820, the process 3800 retrieves the potential customer's financial information in real-time. In a block 3830, the process 3800 compares the current financial terms of the financial arrangements associated with the identified potential customer with potential financial terms for comparable financial arrangements, substantially as explained with regard to the block 3620. In a block 3840, the process 3800 generates alerts, substantially as explained with regard to the block 3630. In a block 3850, the process 3800 transmits the alerts, substantially as explained with regard to the block 3640. In a block 3860, the dealership uses the transmitted alert to present a deal to the potential customer. Advantageously, the entire process 3800 occurs while the potential customer is still in the presence of the dealer, giving the dealer a higher probability to derive increased sales based on the alerts.

Figure 39:
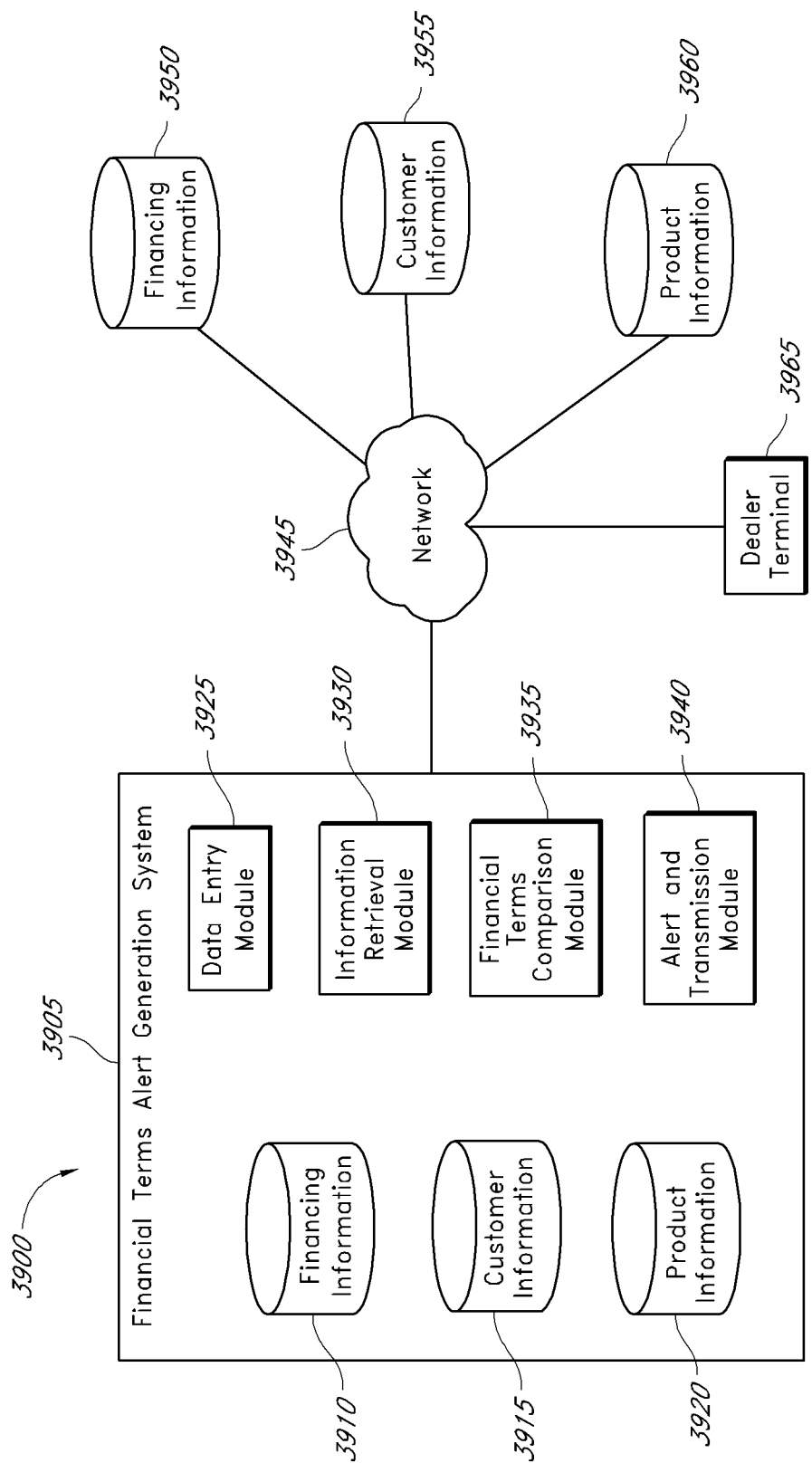
FIG. 39 is a block diagram that illustrates one embodiment of a financial terms alert generation system attached to a computer network.

FIG. 39 illustrates a financial terms alert generation system attached to a computer network, according to one embodiment of the system described herein. A financial terms alert generation system 3905 comprises financing information 3910, customer information 3915, product information 3920, a data entry module 3925, an information retrieval module 3930, a financial terms comparison module 3935, and an alert transmission module 3940. The financial terms alert generation system 3905 is preferably connected, via a computer network 3945, to external financing information 3950, external customer information 3955, external product information 3960, and at least one dealer terminal 3965. In some embodiments, the financing information 3910, customer information 3915, and product information 3920 does not exist permanently within the financial terms alert generation system, but is retrieved from external sources 3950, 3955, and 3960, as needed. In other embodiments, at least portions of the financing information 3910, the customer information 3915, and product information 3920 is stored permanently within the financial terms alert generation system 3905 to provide local storage and caching of data. A skilled artisan will appreciate, in light of this disclosure, that the illustrated storage and modules can be distributed across multiple network hosts rather than being centralized in one location.

In one embodiment, the data entry module 3925 is configured to receive input from a user to enter or modify data stored in the financing information 3910, the customer information 3915, the product information 3920, the external financing information 3950, the external customer information 3955, or the external product information 3960. In general, the data entry module 3925 is not used for a large percentage of data entry, because the information retrieval module 3930 generally automatically retrieves information from sources available on the network 3945. However, advantageously the data entry module 3925 provides a manual tool for entering data for cases in which a user desires to fine tune the information stored in the databases. For example, in certain cases, a dealership may have special incentive programs that are not captured in sources available on the network 3945, and a dealer may want to manually enter data that takes such special incentive programs into account.

In one embodiment, the information retrieval module 3930 is configured to automatically retrieve information about products, customers, and financing from sources available on the network 3945, such as, for example, from the external financing information 3950, the external customer information 3955, and the external product information 3960. Upon retrieving such information from sources available on the network 3945, the information retrieval module 3930 makes the information available to the financial terms alert generation system 3905, such that the system 3905 can use the information in order to perform the calculations necessary to determine whether a customer can advantageously enter a new lease or purchase transaction. For example, in one embodiment, the information retrieval module 3930 stores the retrieved information in local storage accessible to the financial terms alert generation system 3905, such as by storing the information in the financing information 3910, the customer information 3915, and the product information 3920. Alternatively or additionally, the information retrieval module 3930 can store the information in memory rather than in local storage. A skilled artisan will appreciate, in light of this disclosure, a variety of techniques for retrieving information from sources available on the network 3945, including, for example, by scraping public websites. In light of these known techniques, a skilled artisan will readily understand, in light of this disclosure, how to implement the information retrieval module 3930.

Figure 40:
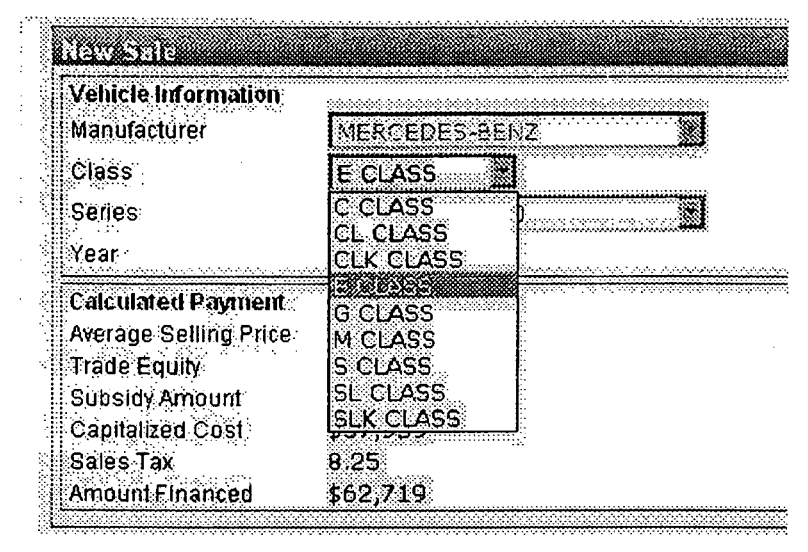

As previously described, embodiments of the system and method described herein determine when a customer is able to enter into a new financial arrangement under financial terms that are favorable to the customer. In many cases, financial terms that are favorable to a customer are those in which the customer will pay less under a new arrangement than under an old arrangement. However, in certain cases, a customer may find terms favorable to the customer even when the customer will pay more under the new arrangement. For example, in certain cases, a customer may want to "buy up," or purchase a product with a higher level of quality of luxury. Accordingly, embodiments of the system and method described herein allow a dealer to determine financial arrangements that are available to a customer in such a "buy up" situation. In certain embodiments, for example, a dealer selects, using, for example, a pull-down menu, a class of products that a customer potentially desires to buy. For example, with respect to cars, a dealer may select a model of car, such as a Mercedes-Benz C class, or a Mercedes-Benz E class. FIG. 40 illustrates an example screen shot in which a dealer may make such a selection. Upon receiving such a selection, embodiments of the system determine new financial arrangements that are available to the customer for that class of product. Advantageously, the dealer can use such information to present the customer with an offer to "buy up" to a higher quality product.

Similarly, embodiments of the system and method allow a dealer to select a lower class of product to find out about opportunities for the customer to "buy down," or purchase a lower class product in order to save money. In certain embodiments, such "buy up" or "buy down" inquiries are limited to products from the same manufacturer as a product that the customer currently owns or is leasing. In other embodiments, such "buy up" or "buy down" inquiries can include manufacturers that are different from the manufacturer of a product that the customer currently owns or is leasing.

Advantageously, by automatically retrieving a large amount of information relating to products, customers, and financing, the information retrieval module 3930 contributes to the ability of the financial terms alert generation system 3905 to generate a large amount of alerts regarding financing opportunities in a timely fashion such that dealers can be informed of such opportunities in time to convert many such opportunities into sales. Advantageously, the automation provided by the information retrieval module 3930 also allows for periodic alert generation based on up-to-date information. Accordingly, the financial terms alert generation system 3905 can generate alerts whenever new information is retrieved by the information retrieval module 3930 that affects whether customers are able to advantageously enter a new lease or purchase transaction.

In one embodiment, the financial terms comparison module 3935 performs comparisons and calculations necessary to determine whether a customer is able to advantageously enter a new lease or purchase transaction. In one mode of operation, the financial terms comparison module 3935 performs batch comparisons periodically. In another mode of operation, the financial terms comparison module 3935 performs batch comparisons whenever new information is added to any one or more of the financing information 3910, the customer information 3915, or the product information 3920. In another mode of operation, the financial terms comparison module 3935 performs a comparison for a particular identified customer and returns results of such a comparison in real time. When operating in this mode, the financial terms comparison module 3935 can advantageously lead to the generation of an alert in real time while, for example, a customer is in a dealership showroom. Advantageously, the financial terms comparison module 3935, in one embodiment, is configured to be able to perform comparisons and calculations in any one or more of the above-described modes of operation, such that the most advantageous mode of operation under the circumstances can be chosen.

Preferably, the financial terms comparison module 3935 compares each customer's current financial arrangements with potential financial arrangements for similar products in order to determine whether a replacement arrangement can be entered into on more favorable or almost as favorable terms. To perform such calculations and comparisons, the financial terms comparison module 3935 employs the comparison method steps and calculation formulas as are described herein above. Upon performing the calculations and comparisons, the financial terms comparison module 3935 generates information for an alert to a customer whenever a favorable replacement financial arrangement can be had.

In one embodiment, the alert transmission module 3940 receives alert information generated by the financial terms comparison module 3935 and transmits the alerts to a dealer. In one embodiment, the alert transmission module 3940 transmits the alerts to a dealer terminal 3965 via email. Alternatively or additionally, the alert transmission module 3940 can be configured to transmit alerts via pager, telephone, fax transmission, a webpage accessible to the dealer terminal 3965, or any other known mechanism for communicating information using electronic devices. In one embodiment, the alert transmission module 3965 is configured to transmit an alert to the dealer terminal 3965 in real time, such that the dealer receives the alert, for example, while a customer is still in a dealership showroom. Such real time alert generation and transmission can be advantageously employed to generate an alert for each customer that comes into a dealership's service department. That is, whenever, the customer brings a product to be serviced, the dealership can quickly run a comparison and generate any alerts, as applicable, to determine whether the customer can advantageously enter into a new lease or purchase transaction. If the customer can enter into such a transaction under favorable terms, the dealer can use the information from the alert to make an offer to the customer while the customer is in the service department. Advantageously, this usage of the financial terms alert generation system 3905 can lead to a substantial increase in sales, as it has been found that at any given time, approximately eight percent of customers can enter new loans or leases on favorable terms. Advantageously, the financial terms alert generation system 3905 identifies a large percentage of those customers that can enter new loans or leases on favorable terms.

Although the system is disclosed with reference to preferred embodiments, the invention is not limited to the preferred embodiments only. Rather, a skilled artisan will recognize from the disclosure herein a wide number of alternatives for the system. Unless indicated otherwise, it may be assumed that the process steps described herein are implemented within one or more modules, including logic embodied in hardware or firmware, or a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. The software modules may be executed by one or more general purpose computers. The software modules may be stored on or within any suitable computer-readable medium. The data described herein may be stored in one or more suitable mediums, including but not limited to a computer-readable medium. The data described herein may be stored in one or more suitable formats, including but not limited to a data file, a database, an expert system, or the like.

Although the foregoing invention has been described in terms of certain preferred embodiments, other embodiments will be apparent to those of ordinary skill in the art from the disclosure herein. For example, although described in the context of automobiles, any good or service associated with a series of one or more payments may be used with embodiments of the invention. Thus, any good or service, whether related to automobiles or unrelated to automobiles, is contemplated. Accordingly, the concepts represented herein may apply to any consumer or commercial good that is financed or leased over time, such as aircraft, heavy equipment, high tech equipment, or the like. Further, although particular make, models, and other automobile-specific information is described, any make, model, or other information may be used. Also, any use related to vehicles or unrelated to vehicles may be used. Additionally, other combinations, omissions, substitutions and modifications will be apparent to the skilled artisan in view of the disclosure herein. Accordingly, the present invention is not limited to the preferred embodiments. Rather, the claims that follow define the invention.

What is claimed is:

1. A computing system comprising:
    a network interface coupled to a data network, the network interface configured to repeatedly receive packet flows from an application interface;
    a computer processor;
    one or more non-transitory computer readable storage mediums;
    instructions configured to be executed by the computer processor, the program instructions, when executed by the computer processor, configured to:
        receive, via the network interface, a plurality of available-vehicle identifiers corresponding to a plurality of dealership vehicles;
        receive, via the network interface, a plurality of vehicle attributes corresponding to the plurality of dealership vehicles and to currently-owned vehicles;
        identify from among the available-vehicle identifiers a replacement-vehicle identifier having a vehicle attribute that matches a corresponding vehicle attribute of an owned-vehicle identifier corresponding to a currently-owned vehicle;
        determine, based on the plurality of vehicle attributes corresponding to the plurality of currently-owned vehicles, a current trade-in value associated with the currently-owned vehicle;
        based at least in part on the determined current trade-in value and a monthly transaction amount associated with the currently-owned vehicle, determine that a threshold condition is satisfied;
        determine, based on the determination that the threshold condition is satisfied, a new monthly transaction amount;
        automatically transmit an electronic alert comprising:
            the owned-vehicle identifier,
            the monthly transaction amount and the trade-in value associated with the currently-owned vehicle, and
            the replacement-vehicle identifier, and
            a new monthly transaction amount that satisfies on the threshold condition; and
        generate a visual interface comprising the electronic alert and including at least one deal sheet view that arranges all of the following into a simultaneously-viewable screen for display to a user:
            the owned-vehicle identifier, including a vehicle year and vehicle identification number (VIN), and contact information of a specific vehicle owner that qualifies as deal prospect under the threshold condition;
            the owned-vehicle identifier for that vehicle owner, including the vehicle's year and vehicle identification number;
            existing term associated with the currently-owned vehicle, the existing term comprising monthly payments on the existing vehicle;
            the replacement-vehicle identifier, including a model and year; and
            the prospective term comprising monthly payments on the replacement vehicle.

2. The computing system of claim 1, wherein the program instructions, when executed by the computer processor, are further configured to:
    use the replacement-vehicle identifier to determine a prospective term for a prospective new payment arrangement and replacement vehicle for each specific vehicle owner, based on at least the replacement-vehicle identifier and the determined trade-in value of the currently-owned vehicle, wherein the prospective term represents a prospective monthly payment,
    accept a prospective term threshold condition input and use it to qualify the currently-owned vehicle as a deal prospect only when a corresponding prospective term satisfies the threshold condition, and
    apply the threshold condition by identifying when the prospective monthly payment is less than, equal to, or within a particular range above an existing monthly payment.

3. The computing system of claim 1, wherein the program instructions are executed automatically during non-business hours on a periodic basis.

4. The computing system of claim 1, wherein the electronic notification is configured to be read by a terminal configured for managing the electronic notification, wherein managing the electronic notification involves assigning the electronic notification for handling, associating a task with the electronic notification, assigning a status to the electronic notification, or a combination thereof.

5. The computing system of claim 1, wherein determining the trade-in value comprises using updated data from the network interface, the updated data including data relating to prospective financial agreements for specific vehicle owners.

6. The computing system of claim 5, the data relating to prospective financial agreements representing available rebates, discounts, dealer incentives, or financing terms relating to the available vehicle identifiers, or a combination thereof.

7. The computing system of claim 1, the program instructions further configured to determine and present additional prospective terms associated with a plurality of different prospective financing periods, each of which uses the identified replacement vehicle identifier, the determined trade-in value, and the determined trade equity for the specific vehicle owner.

8. The computing system of claim 1, wherein generating the visual interface comprises displaying:
the current trade-in value associated with the currently-owned vehicle;
multiple options for the prospective monthly payment on the replacement vehicle, each option corresponding to a different loan duration.

9. The computing system of claim 8, the visual interface further configured to display the multiple options juxtaposed in the same view with each other and also provide the difference between each option and a current monthly payment on the currently-owned vehicle.

10. The computing system of claim 8, wherein the visual interface is configured to receive a user input for the prospective term threshold condition.

11. The computing system of claim 2, wherein the program instructions are further configured to calculate an expiration date for the prospective term and update the visual interface to include this expiration.

12. The computing system of claim 11, wherein the program instructions are further configured to cause the computer processor to calculate the expiration date by determining that the threshold condition is met due to a particular incentive input and provide an expiration date that corresponds to the end of that incentive.

13. The computing system of claim 11, wherein the program instructions are further configured allow, via the visual interface, automotive dealer personnel to sort names of specific vehicle owners according to the expiration date.

14. The computing system of claim 11, wherein generating the visual alert system comprises:
automatically associating visual icons with contact information for the specific vehicle owners to facilitate outreach; and
accepting input from a user by displaying interactive hyperlink controls within the visual alert system allowing a user to interact with the visual alert system to cause a screen to instantaneously switch from a contact management view to a deal sheet view.

15. The computing system of claim 1, wherein the program instructions are further configured to cause the computer processor to automatically determine an estimated trade value by using the vehicle identification number, the make, model, and year of the existing vehicle, and the date the existing vehicle was obtained by the specific vehicle owner.

16. The computing system of claim 1, wherein the program instructions are further configured to cause the computer processor to automatically determine:
an estimated trade value from a database of third-party industry valuation data, and
a price of the replacement vehicle based on rate information automatically obtained from one or more external databases.

17. An analysis system for automobiles comprising:
a database of records of vehicle transactions, the records including, for each vehicle transaction:
a vehicle recipient of a vehicle in the vehicle transaction and that vehicle recipient's identifying information;
a vehicle identification number of the vehicle;
an estimated trade value of the vehicle; and
an estimated payoff amount of the vehicle;
a non-transitory computer processor;
computer-readable instructions, the instructions, when executed by the computer processor, configured to:
automatically determine for each of the past vehicle recipients a suggested vehicle;
determine a net trade-in equity, wherein the trade-in equity may be either negative equity or positive equity;
determining the differences to determine if at least one of them meets a criterion to identify the customer for outreach because a new favorable deal proposal has been identified to get that customer into an upgraded vehicle comprising at least one of the new suggested vehicles;
the computer system being configured to adjust at least one changed financing data parameter for suggested new vehicles; and
iteratively analyzing whether the at least one changed financing parameter increases the number of customers who can favorably get into an upgraded new suggested vehicle;
the computer system thereby identifying new revenue opportunities from the past customers that are candidates for new vehicle transactions, even when those candidates are not shopping for a new vehicle, and, for each candidate, identifying at least one specific and available new favorable deal proposal relating to a specific new suggested vehicle; and
a visual alert system for notifying dealership personnel of the new revenue opportunities automatically identified by the computer system by collecting and, for each specific and available proposal, displaying specific proposed transaction details to an automobile marketer to assist in marketing outreach to the candidates;
the visual alert system configured to allow a user to select what is displayed and control the system to instantaneously switch between views;
the visual alert system including at least one deal sheet view that arranges all of the following into a simultaneously-viewable screen for display to a user to facilitate outreach regarding the specific new suggested vehicle to each candidate customer:
the candidate customer's contact information;
the candidate customer's previously sold vehicle, its year, and its vehicle identification number;
the candidate customer's current payment;
the estimated trade value of the previously sold vehicle, the estimated payoff amount of the previously sold vehicle, and the net trade-in equity;
the new specific suggested vehicle and its year; and
multiple options for the new proposed payment under the different loan durations, arranged side by side;
each new proposed payment juxtaposed with the difference between it and the customers current payment.

18. The data mining and analysis system of claim 17, wherein the computer system is further configured to automatically identify new favorable deal proposals, and the visual alert system is further configured to notify automotive dealer personnel of related new revenue opportunities, for each of the following categories:
a smart payment/alert category, where a customer has a significant number of payments left on the previously sold vehicle, but qualifies for the new suggested vehicle at a new proposed payment that is lower than or slightly above the customer's current payment; and
an end of term/lease ending category where a customer is approaching the end of their lease term and has fewer payments left on the previously sold vehicle.

19. The data mining and analysis system of claim 18, wherein the computer system is further configured to automatically identify new favorable deal proposals, and the visual alert system is further configured to notify automotive dealer personnel of related new revenue opportunities, for at least one additional category in addition to the smart payment/alert category and the end of term/lease ending category.

20. The data mining and analysis system of claim 19, wherein the smart payment/alert category comprises automatic identification of new favorable deal proposals for upgraded vehicles where the associated payment is within a range selectable by the user through accessing a control visible on a screen of the visual alert system.

21. The data mining and analysis system of claim 20, wherein the smart payment/alert category comprises automatic identification of new favorable deal proposals for upgraded vehicles where the range of the associated payment is selectable to be no higher than a threshold percentage above a client's current payment, such that new favorable deal proposals and candidates are identified even when new proposed payments would be slightly higher than the customers current payment.

\* \* \* \* \*